United States Patent
Lim et al.

(10) Patent No.: US 10,708,595 B2
(45) Date of Patent: Jul. 7, 2020

(54) METHOD FOR ENCODING AND DECODING QUANTIZED MATRIX AND APPARATUS USING SAME

(71) Applicant: ELECTRONICS AND TELECOMMUNICATIONS RESEARCH INSTITUTE, Daejeon (KR)

(72) Inventors: Sung Chang Lim, Daejeon (KR); Hui Yong Kim, Daejeon (KR); Jin Ho Lee, Daejeon (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/376,492

(22) Filed: Apr. 5, 2019

(65) Prior Publication Data

US 2019/0238850 A1  Aug. 1, 2019

Related U.S. Application Data

(63) Continuation of application No. 15/792,086, filed on Oct. 24, 2017, now Pat. No. 10,306,228, which is a (Continued)

(30) Foreign Application Priority Data

Jan. 20, 2012 (KR) ........................ 10-2012-0006564
Feb. 6, 2012 (KR) ........................ 10-2012-0011672
(Continued)

(51) Int. Cl.
*H04N 7/12* (2006.01)
*H04N 19/126* (2014.01)
(Continued)

(52) U.S. Cl.
CPC ......... *H04N 19/126* (2014.11); *H04N 19/159* (2014.11); *H04N 19/196* (2014.11);
(Continued)

(58) Field of Classification Search
CPC .... H04N 19/126; H04N 19/196; H04N 19/50; H04N 19/159; H04N 19/61;
(Continued)

(56) References Cited

U.S. PATENT DOCUMENTS 9,648,316 B2   5/2017  Tanaka et al.
2006/0177143 A1 8/2006  Winger
(Continued)

FOREIGN PATENT DOCUMENTS

CN   101558651 A   10/2009
JP   2001-519551 A  10/2001
(Continued)

OTHER PUBLICATIONS

Lim, S. et al., "Non-CE4 Subtest 2: Improvement on quantization matrix signaling," 8.sup.th Meeting of Joint Collaborative Team on Video Coding (JCT-VC), held in San Jose, CA, USA, Feb. 1-10, 2012, document No. JCTVC-H0237 (7 pages in English).
(Continued)

*Primary Examiner* — Richard T Torrente
(74) *Attorney, Agent, or Firm* — Michael Best & Friedrich LLP

(57) ABSTRACT

The present invention relates to a method for encoding and decoding a quantized matrix and an apparatus using same, the method for encoding a quantized matrix according to the present invention comprising the steps of: determining a quantization matrix to be used for quantization and quantizing; determining the prediction method used for the quantization of the quantization matrix; and encoding quantization matrix information on the basis of the determined
(Continued)

prediction method, wherein the prediction method can be either a prediction method between coefficients in the quantization matrix or a duplicate of the quantization matrix.

7 Claims, 8 Drawing Sheets

Related U.S. Application Data continuation of application No. 14/373,270, filed as application No. PCT/KR2013/000493 on Jan. 21, 2013, now Pat. No. 9,866,839.

(30) Foreign Application Priority Data

| | | |
|---|---|---|
| Feb. 9, 2012 | (KR) | ........................ 10-2012-0013462 |
| Feb. 10, 2012 | (KR) | ........................ 10-2012-0013996 |
| Apr. 16, 2012 | (KR) | ........................ 10-2012-0038971 |
| Jan. 21, 2013 | (KR) | ........................ 10-2013-0006736 |

(51) Int. Cl.

| | |
|---|---|
| H04N 19/159 | (2014.01) |
| H04N 19/61 | (2014.01) |
| H04N 19/196 | (2014.01) |
| H04N 19/70 | (2014.01) |
| H04N 19/50 | (2014.01) |
| H04N 19/463 | (2014.01) |
| H04N 19/176 | (2014.01) |

(52) U.S. Cl.
CPC ......... *H04N 19/198* (2014.11); *H04N 19/463* (2014.11); *H04N 19/50* (2014.11); *H04N 19/61* (2014.11); *H04N 19/70* (2014.11); *H04N 19/176* (2014.11)

(58) Field of Classification Search
CPC .... H04N 19/198; H04N 19/70; H04N 19/463; H04N 19/176; H04N 19/105; H04N 19/60; H04N 19/10; H04N 19/00; H04N 19/124; H04N 19/13
See application file for complete search history.

(56) References Cited

U.S. PATENT DOCUMENTS

| | | |
|---|---|---|
| 2008/0205528 A1 | 8/2008 | Song et al. |
| 2010/0086028 A1 | 4/2010 | Tanizawa et al. |
| 2010/0316120 A1 | 12/2010 | Abe et al. |
| 2012/0140815 A1* | 6/2012 | Zhou .................... H04N 19/117 375/240.03 |
| 2013/0114695 A1* | 5/2013 | Joshi .................... H04N 19/463 375/240.03 |
| 2015/0334396 A1 | 11/2015 | Lim et al. |
| 2018/0048905 A1 | 2/2018 | Lim et al. |

FOREIGN PATENT DOCUMENTS

| | | |
|---|---|---|
| JP | 2016-129356 A | 7/2016 |
| JP | 2016-136732 A | 7/2016 |
| KR | 1994-0003199 A | 2/1994 |
| KR | 10-2004-0065406 A | 7/2004 |
| KR | 10-2011-0041977 A | 4/2011 |
| WO | 99/18565 A2 | 4/1999 |
| WO | 2012/108237 A1 | 8/2012 |
| WO | 2013/129617 A1 | 9/2013 |
| WO | 2013/129618 A1 | 9/2013 |

OTHER PUBLICATIONS

Chen, Y et al., "Quantization matrices in fragmented APS," 7. Joint Collaborative Team on Video Coding ISO/IEC JTC1/SC29/WG11 and ITU-T SG. 16) JCT-VC Meeting, 98. MPEG, held in Geneva, CH on Nov. 21-30, 2011, document No. JCTVC-G658 (3 pages).
Lim, S et al., "Simplification on default quantization matrix signaling," 9th Meeting of Joint Collaborative Team on Video Coding, held in Geneva, CH on Apr. 27-May 7, 2012, document No. JCTVC-I0101 (7 pages).
Tanaka, J. et al., "Quantization Matrix for HEVC," 5.sup.th Meeting of Joint Collaborative Team on Video Coding (JCT-VC) of ITU-T SG16 WP3 and ISO/IEC JTC1/SC29/WG11, held in Geneva, Switzerland on Mar. 16-23, 2011 (25 pages in English).
Wenger, S. et al., "APS syntax and semantics, and parameter set extension syntax," 7.sup.th Meeting of Joint Collaborative Team on Video Coding (JCT-VC) of ITU-T SG16 WP3 and ISO/IEC JTC1/SC29/WG11, held in Geneva, Switzerland on Nov. 21-30, 2011 (20 pages in English).
Bross, B. et al., "WD5: Working Draft 5 of High-Efficiency Video Coding," 7.sup.th Meeting of Joint Collaborative Team on Video Coding (JCT-VC) of ITU-T SG16 WP3 and ISO/IEC JTC1/SC29/WG11, held in Geneva, Switzerland on Nov. 21-30, 2011 (5 pages in English).
Japanese Office Action dated Sep. 1, 2015 in counterpart Japanese Application No. 2014-553264 (7 pages in Japanese).
Rajan Joshi et al, "Compression and signaling of quantizer matrices", Joint Collaborative Team on Video Coding (JCT-VC) of ITU-T SG16 WP3 and ISO/IEC JTC1/SC29/WG11, 7th Meeting: Geneva, CH, Nov. 21-30, 2011.
Korean Office Action issued by the Korean Intellectual Property Office dated Aug. 5, 2015 in corresponding Korean Application No. 10-2013-0006736. ( 4 Pages in Korean).
Korean Office Action issued by the Korean Intellectual Propery Office dated Oct. 30, 2014 in corresponding Korean Application No. 10-2014-0087706. (4 Pages).
International Search Report dated Apr. 22, 2013 in counterpart PCT Application No. PCT/KR2013/000493 (13 pages in Korean, with English language translation).
Yoshitaka Morigami et al., "Improvement of Scaling List," Proceedings from the 9th Meeting of the Joint Collaborative Team on Video Coding (JCT-VC) of ITU-T SG 16 WP and ISO/IEC JTC 1/SC 29/WG 11, held in Geneva, CH on Apr. 27-May 7, 2012, Document No. JCTVC-I0059 (pp. 1-6).
Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, 7th Meeting: Geneva, CH, Nov. 21-30, 2011 (228 pages).
Tanaka et al., "Enhancement of quantification matrix coding for HEVC," Joint Collaborative Team on Video Coding (JCT-VC) of ITU-T SG16 WP3 and ISO/IEC JTC1/SC29/WG11, 6th Meeting held in Torino, IT, Jul. 14-22, 2011, Document No. JCTVC-F475, 12 pages.
Morigamo et al., "CE4 subtest 2.1: Enhancements of HEVC quantization matrix," Joint Collaborative Team on Video Coding (JCT-VC) of ITU-T SG16 WP3 and ISO/IEC JTC1/SC29/WG11, 8th Meeting held in San Jose, CA, Feb. 1-10, 2012, Document No. JCTVC-H0230, 9 pages.

* cited by examiner

METHOD FOR ENCODING AND DECODING QUANTIZED MATRIX AND APPARATUS USING SAME

CROSS-REFERENCE TO RELATED APPLICATIONS

This application is a continuation of application Ser. No. 15/792,086, having a filing date of Oct. 24, 2017, which is a continuation of application Ser. No. 14/373,270 having a 371(c) date of Jul. 18, 2014, now U.S. Pat. No. 9,866,839, which is a U.S. national stage application of International Application No. PCT/KR2013/000493 filed on Jan. 21, 2013, which claims the benefit of Korean Patent Application No. 10-2012-0006564, filed on Jan. 20, 2012, Korean Patent Application No. 10-2012-0011672, filed on Feb. 6, 2012, Korean Patent Application No. 10-2012-0013462, filed on Feb. 9, 2012, Korean Patent Application No. 10-2012-0013996, filed on Feb. 10, 2012, Korean Patent Application No. 10-2012-0038971, filed on Apr. 16, 2012, and Korean Patent Application No. 10-2013-0006736, filed on Jan. 21, 2013, in the Korean Intellectual Property Office, the entire disclosures of which are incorporated herein by reference for all purposes.

TECHNICAL FIELD

The present invention relates to image coding and decoding technology and, more particularly, to methods and apparatuses for coding and decoding a quantization matrix.

BACKGROUND ART

Broadcast service having High Definition (HD) resolution has recently been expanded worldwide as well as locally. Accordingly, lots of users have become accustomed to an image having high resolution and high picture quality, and lots of institutes spur the development of the next-generation image device.

As there is a growing interest in Ultra High Definition (UHD) having resolution four times higher than HDTV as well as HDTV, there a need for a compression technique for an image having higher resolution and higher picture quality.

For image compression, information about the pixels of a current picture can be coded by prediction. For example, an inter-prediction technique in which a pixel value included in a current picture is predicted from a temporally previous and/or a temporally subsequent picture and an intra-prediction technique in which a pixel value included in a current picture is predicted using information about pixels within the current picture can be used.

Furthermore, coding efficiency can be improved and the amount of transmission information can be reduced using entropy coding technology in which a short sign is assigned to a symbol having high frequency of appearance and a long sign is assigned to a symbol having low frequency of appearance.

In this case, a method of performing the quantization of a transform coefficient for a residual block generated by prediction more effectively is problematic.

DISCLOSURE

Technical Problem

An object of the present invention is to provide a method and apparatus for restricting quantization matrix coding/decoding based on the size of a transform block that is available.

Another object of the present invention is to provide coding/decoding methods and apparatuses, wherein a default quantization matrix and a non-default quantization matrix can be mixed and used according to the size of each transform block or the type of quantization matrix within a sequence, a picture, or a slice.

Yet another object of the present invention is to provide coding/decoding methods and apparatuses, wherein a default quantization matrix is used based on a reference quantization matrix ID.

Further yet another object of the present invention is to provide coding/decoding methods and apparatuses, which increase coding efficiency by performing the prediction of a quantization matrix only when a reference quantization matrix is present.

Further yet another object of the present invention is to provide a method and apparatus for effectively performing prediction and coding/decoding on a DC matrix coefficient.

Further yet another object of the present invention is to provide coding/decoding methods and apparatuses for performing the prediction of a quantization matrix from a quantization matrix having the same size as a quantization matrix when coding/decoding are performed.

Further yet another object of the present invention is to provide a method and apparatus for performing prediction and coding/decoding based on the first coefficient within a quantization matrix.

Technical Solution

An embodiment of the present invention provides a method of coding a quantization matrix, including determining and quantizing a quantization matrix to be used in quantization, determining a prediction method of the quantization matrix used in the quantization, and coding information about the quantization matrix in accordance with the determined prediction method, wherein the prediction method may be any one of a method of predicting an inter-coefficient prediction method within the quantization matrix and a copying of the quantization matrix.

Another embodiment of the present invention provides a method of decoding a quantization matrix, including determining a prediction method of a quantization matrix to be used in dequantization and decoding the quantization matrix to be used in dequantization in accordance with the determined prediction method, wherein the prediction method of the quantization matrix may be any one of an inter-coefficient prediction method within the quantization matrix and a copying of the quantization matrix.

Advantageous Effects

In accordance with the present invention, coding efficiency can be improved and the degree of complexity of calculation can be reduced by restricting the coding of a quantization matrix based on the size of a transform block that is available.

In accordance with the present invention, coding efficiency can be improved and the degree of freedom when a coder selects a quantization matrix can be increased by mixing and using a default quantization matrix and a non-default quantization matrix according to the size of each transform block or the type of quantization matrix within a sequence, a picture, or a slice.

In accordance with the present invention, coding efficiency can be improved, the degree of complexity of calculation can be reduced, and the degree of freedom when a coder selects a quantization matrix can be increased by coding/decoding information about whether a default quantization matrix will be used or not based on a reference quantization matrix ID or performing the prediction of a quantization matrix only when a reference quantization matrix is present.

In accordance with the present invention, coding efficiency can be improved, the degree of complexity of calculation can be reduced, and the degree of freedom when a coder selects a quantization matrix can be increased by predicting and coding/decoding a DC matrix coefficient or performing the prediction of a quantization matrix from a quantization matrix having the same size as a quantization matrix when coding/decoding are performed.

Furthermore, in accordance with the present invention, coding efficiency can be improved and the degree of complexity of calculation can be reduced by coding/decoding the first coefficient within a quantization matrix using a coefficient value that frequently occurs.

MODE FOR INVENTION

Figure 1:
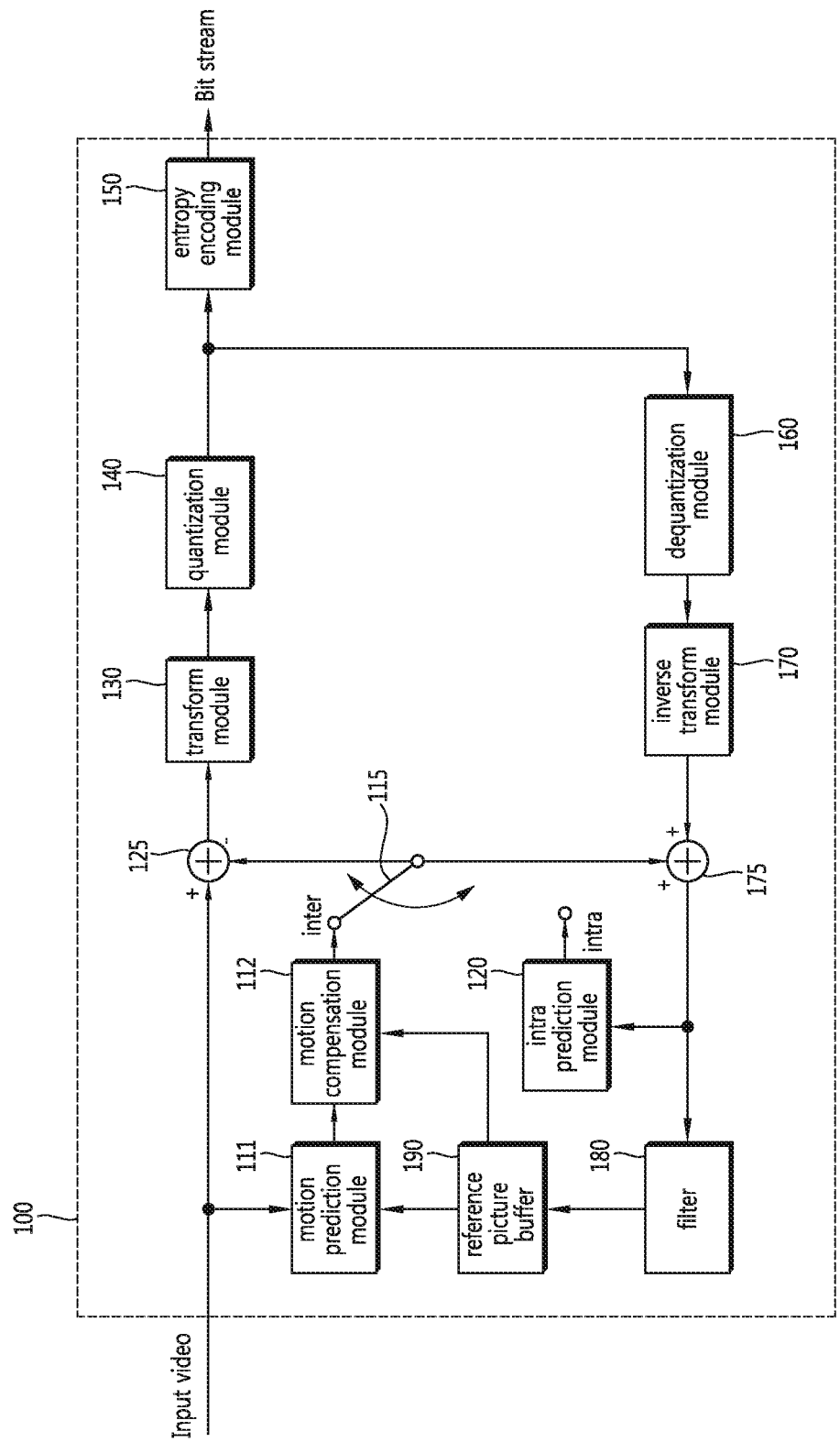
FIG. 1 is a block diagram showing a construction according to an embodiment of an image coding apparatus in which the present invention is applied.

Hereinafter, embodiments of the present invention are described in detail with reference to the accompanying drawings. Furthermore, in describing the embodiments of the present invention, a detailed description of the known functions and constitutions will be omitted if it is deemed to make the gist of the present invention unnecessarily vague.

In this specification, when it is said that one element is "connected", "combined", or "coupled" with the other element, the one element may be directly connected or coupled with the other element, but it should also be understood that a third element may be "connected", "combined", or "coupled" between the two elements. Furthermore, in this specification, contents describing that a specific element is "included (or comprised)" does not mean that elements other than the specific element are excluded, but means that additional elements may be included in an implementation of the present invention or the scope of the technical spirit of the present invention.

Terms, such as the "first" and the "second", may be used to describe a variety of elements, but the elements are not limited to the terms. The terms are used to distinguish one element from the other element. For example, a first element may be named a second element and likewise a second element may be named a first element without departing from the scope of the present invention.

Furthermore, elements described in the embodiments of the present invention are independently shown in order to indicate different and characteristic functions, and it does not mean that each of the elements consists of separate hardware or a piece of software module. That is, the elements are arranged, for convenience of description, and at least two of the elements may be combined to form one element or one element may be divided into a plurality of elements and the plurality of elements may perform functions. An embodiment in which the elements are combined or each of the elements is divided is included in the scope of the present invention without departing from the essence of the present invention.

Furthermore, in the present invention, some elements may not be essential elements for performing essential functions, but may be optional elements for improving only performance. The present invention may be implemented using only the essential elements for implementing the essence of the present invention other than the elements used to improve only performance, and a structure including only the essential elements other than the optional elements used to improve only performance are included in the scope of the present invention.

First, terms used in this specification are described in brief for for convenience of description and in order to help understaing the invention.

A unit means the unit of image coding and decoding. In other words, in image coding/decoding, a coding unit or a decoding unit refers to a partitioned unit when one image is subdivided and coded or decoded. The unit is also called a block, a macro block, a coding unit, a prediction unit, a transform unit, a coding block, a prediction block, a transform block or the like. One unit can be partitioned into smaller lower units.

A transform unit is a basic unit in performing the coding/decoding of a residual block, such as transform, inverse transform, quantization, dequantization, and transform coefficient coding/decoding. One transform unit can be partitioned into a plurality of smaller transform units. Furthermore, the transform unit can be used as the same meaning as a transform block. A form that includes a syntax element related to a transform block for luma and chroma signals may be called a transform unit.

A quantization matrix means a matrix that is used in a quantization or inverse-quantization process in order to improve the subjective picture quality or objective picture quality of an image. The quantization matrix is also called a scaling list. And the inverse-quantization process is identical to the dequantization process.

A quantization matrix used in quantization/dequantization may be transmitted in the form of a bit stream, and a default matrix already included in a coder and/or a decoder may be used as a quantization matrix. Information about a quantization matrix can be transmitted in a lump according to the size of each quantization matrix or the size of a transform block in which a quantization matrix is applied through a Sequence Parameter Set (SPS) or a Picture Parameter Set (PPS). For example, 4×4 quantization matrices for a 4×4 transform block can be transmitted, 8×8 matrices for an 8×8 transform block can be transmitted, 16×16 matrices for a 16×16 transform block can be transmitted, and 32×32 matrices for a 32×32 transform block can be transmitted.

A quantization matrix applied to a current block may be (1) obtained by copying a quantization matrix having the same size and (2) generated by prediction from a previous matrix coefficient within the quantization matrix. A matrix having the same size may be a quantization matrix that has been previously coded or decoded or used, a reference quantization matrix, or a default quantization matrix. Or, a matrix having the same size may be selectively determined by a combination including at least two of a quantization matrix that has been previously coded or decoded or used, a reference quantization matrix, and a default quantization matrix.

A parameter set corresponds to information about the header of a structure within a bit stream and has a meaning that commonly denotes a sequence parameter set, a picture parameter set, a adaptation parameter set, etc.

A quantization parameter is a value used in quantization and dequantization and may be a value mapped to a quantization step size.

A default matrix can mean a specific quantization matrix that has been previousy defined in a coder and/or a decoder. A default quantization matrix to be described later in this specification can be used as the same meaning as a default matrix. A non-default matrix can mean a quantization matrix that has not been previously defined in a coder and/or a decoder and that is transmitted from a coder to a decoder, that is, that is transmitted/received by a user. A non-default quantization matrix to be describe later in this specification can be used as the same meaning as a non-default matrix.

FIG. 1 is a block diagram showing a construction according to an embodiment of an image coding apparatus in which the present invention is applied.

Referring to FIG. 1, the image coding apparatus 100 includes a motion prediction module 111, a motion compensation module 112, an intra-prediction module 120, a switch 115, a subtractor 125, a transform module 130, a quantization module 140, an entropy coding module 150, an dequantization (inverse quantization) module 160, an inverse transform module 170, an adder 175, a filter module 180, and a reference image buffer 190.

The image coding apparatus 100 can perform coding on an input image in intra-mode or inter-mode and output a bit stream. Intra-prediction means intra-frame prediction, and inter-prediction means inter-frame prediction. In the case of intra-mode, the switch 115 can be switched to intra-mode. In the case of inter-mode, the switch 115 can be switched to inter-mode. After generating a prediction block for the input block of the input image, the image coding apparatus 100 can code a difference between the input block and a prediction block. Here, the input image can mean the original image.

In the case of intra-mode, the intra-prediction module 120 can generate a prediction block by performing spatial prediction based on the pixel value of an already coded block that neighbors a current block.

In the case of inter-mode, the motion prediction module 111 can search a reference image, stored in the reference image buffer 190, for a region that is best well matched with the input block in a motion prediction process and obtain a motion vector based on the retrieved region. The motion compensation module 112 can generate the prediction block by performing motion compensation using the motion vector. Here, the motion vector is a 2-dimensional vector used in inter-prediction, and the motion vector can indicate an offset between the current block and a block within the reference image.

The subtractor 125 can generate a residual block based on a difference between the input block and the generated prediction block. The transform module 130 can output a transform coefficient by performing transform on the residual block. Next, the quantization module 140 can output a quantized coefficient by quantizing the received transform coefficient using at least one of a quantization parameter and a quantization matrix. Here, the quantization matrix can be inputted to a coder, and it can be determined that the inputted quantization matrix is used in the coder.

The entropy coding module 150 can output a bit stream by performing entropy coding based on values calculated by the quantization module 140 or a coding parameter value, etc. calculated in the coding process. If entropy coding is applied, symbols can be represented by assigning a small number of bits to a symbol having a high occurrence probability and a large number of bits to a symbol having a low occurrence probability in order to reduce the size of a bit stream for coding symbols to be coded. Accordingly, the compression performance of image coding can be increased by entropy coding. The entropy coding module 150 can use coding methods, such as exponential Golomb coding, Context-Adaptive Variable Length Coding (CAVLC), and Context-Adaptive Binary Arithmetic Coding (CABAC), for the entropy coding.

The image coding apparatus (hereinafter called a coder) in accordance with the embodiment of FIG. 1 performs inter-prediction coding, that is, inter-frame prediction coding, and thus a currently coded image needs to be decoded and stored in order to be used as a reference image. Accordingly, a quantized coefficient is subjected to dequantization by the dequantization module 160 and subjected to inverse transform by the inverse transform module 170. The inverse-quantized and inverse-transformed coefficient becomes a reconstructed residual block, and the reconstructed residual block is added to the prediction block through the adder 175, thereby generating a reconstructed block.

The reconstructed block experiences the filter module 180. The filter module 180 can apply one or more of a deblocking filter, a Sample Adaptive Offset (SAO), and an Adaptive Loop Filter (ALF) to the reconstructed block or a reconstructed picture. The filter module 180 may also be called an in-loop filter. The deblocking filter can remove the distortion of a block that has occurred at the boundary of blocks. The SAO can add a proper offset value to a pixel value in order to compensate for a coding error. The ALF can perform filtering based on a value obtained by comparing a reconstructed image with the original image. The reconstructed block that has experienced the filter module 180 can be stored in the reference image buffer 190.

Figure 2:
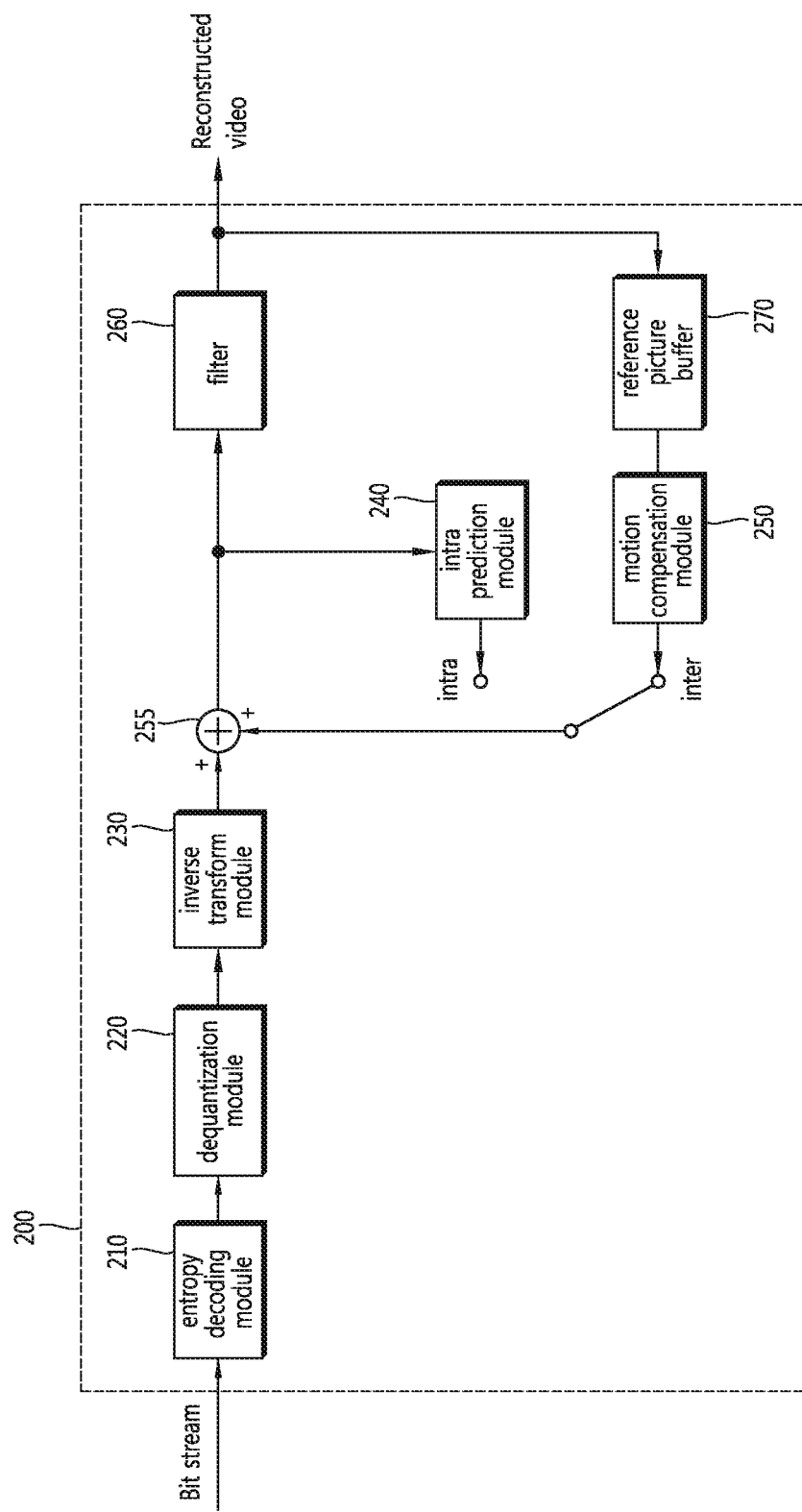
FIG. 2 is a block diagram showing a construction according to an embodiment of an image decoding apparatus in which the present invention is applied.

FIG. 2 is a block diagram showing a construction according to an embodiment of an image decoding apparatus in which the present invention is applied.

Referring to FIG. 2, the image decoding apparatus 200 includes an entropy decoding module 210, an dequantization (inverse quantization) module 220, an inverse transform module 230, an intra-prediction module 240, a motion compensation module 250, an adder 255, a filter module 260, and a reference image buffer 270.

The image decoding apparatus 200 can receive a bit stream outputted from a coder, perform decoding on the bit stream in intra-mode or inter-mode, and output a reconstructed image. In the case of intra-mode, a switch can be switched to intra-mode. In the case of inter-mode, the switch can be switched to inter-mode. The image decoding apparatus 200 can obtain a reconstructed residual block from a received bit stream, generate a prediction block, and generate a reconstructed block by adding the reconstructed residual block to a prediction block.

The entropy decoding module 210 can generate symbols including a symbol having a quantized coefficient form by performing entropy decoding on an input bit stream according to a probability distribution. An entropy decoding method is similar to the above-described entropy coding method.

If the entropy decoding method is applied, symbols can be represented by assigning a small number of bits to a symbol having a high occurrence probability and a large number of bits to a symbol having a low occurrence probability in order to reduce the size of a bit stream for each symbol.

A quantized coefficient can be subject to dequantization by the dequantization module 220 based on a quantization parameter and can be subject to inverse transform by the inverse transform module 230. As a result of the dequantization/inverse transform of the quantized coefficient, a reconstructed residual block can be generated.

A quantization matrix used in dequantization is also called a scaling list. The dequantization module 220 can generate an inverse-quantized coefficient by applying a quantization matrix to a quantized coefficient.

Here, the dequantization module 220 can perform dequantization in response to quantization applied by a coder. For example, the dequantization module 220 can perform dequantization by applying a quantization matrix, applied by a coder, to a quantized coefficient inversely.

A quantization matrix used in dequantization by the image decoding apparatus 200 (hereinafter called a decoder) may be received from a bit stream, and a default matrix already included in a coder and/or a decoder may be used as a quantization matrix. Information about a quantization matrix that is transmitted can be received in a lump according to the size of each quantization matrix or the size of a transform block to which a quantization matrix through a sequence parameter set or a picture parameter set. For example, 4×4 quantization matrices for a 4×4 transform block can be received, 8×8 matrices for an 8×8 transform block can be received, 16×16 matrices for a 16×16 transform block can be received, and 32×32 matrices for a 32×32 transform block can be received.

In the case of intra-mode, the intra-prediction module 240 can generate a prediction block by performing spatial prediciton using the pixel value of an already decoded block that neighbors a current block. In the case of inter-mode, the motion compensation module 250 can generate a prediction block by performing motion compensation by using a motion vector and a reference image stored in the reference image buffer 270.

A reconstructed residual block and a prediction block are added together by the adder 255, and the added block can experience the filter module 260. The filter module 260 can apply one or more of a deblocking filter, an SAO, and an ALF to a reconstructed block or a reconstructed picture. The filter module 260 can output a reconstructed image, that is, a restored image. The reconstructed image can be stored in the reference image buffer 270 and used in inter-prediction.

Meanwhile, block partition information can include information about the depth of a unit. The depth information can indicate the number of times that a unit is partitioned and/or a degree that a unit is partitioned.

Figure 3:
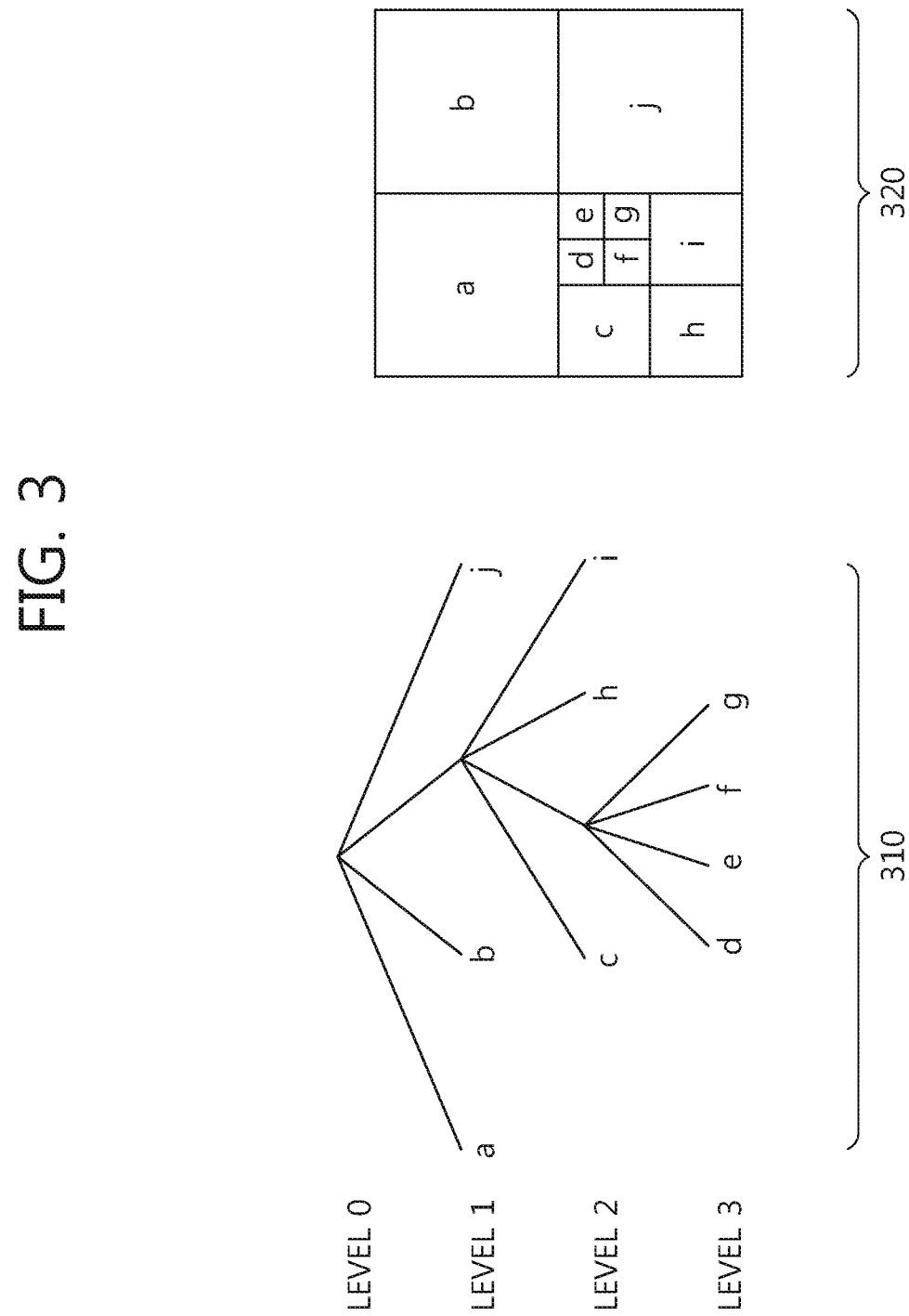
FIG. 3 is a conceptual diagram schematically illustrating an embodiment in which one unit is partitioned into a plurality of lower units.

FIG. 3 is a conceptual diagram schematically illustrating an embodiment in which one unit is partitioned into a plurality of lower units.

One unit or block can be hierarchically partitioned based on a tree structure with depth information. Each of partitioned lower unit can have depth information. The depth information may include information about the size of a lower unit because it indicates the number of times that a unit is partitioned and/or a degree that a unit is partitioned.

Referring to 310 of FIG. 3, the highest node may be called a root node, and the highest node can have the smallest depth value. Here, the highest node can have a depth of a level 0 and can indicate the first unit that has not been partitioned.

A lower node having a depth of a level 1 can indicate a unit partitioned from the first unit once, and a lower node having a depth of a level 2 can indicate a unit partitioned from the first unit twice. For example, in 320 of FIG. 3, a unit 'a' corresponding to a node 'a' is a unit partitioned from the first unit once, and the unit 'a' can have a depth of the level 1.

A leaf node of a level 3 can indicate a unit partitioned from the first unit three times. For example, in 320 of FIG. 3, a unit 'd' corresponding to a node 'd' is a unit partitioned from the first unit three times, and the unit 'd' can have a depth of the level 3. Accordingly, a leaf node of the level 3, that is, the lowest node, can have the deepest depth.

Schematic coding/decoding methods have been described so far. Quantization matrix coding/decoding methods used in the quantization and inverse-quantization processes of coding/decoding processes have a great influence on coding efficiency like other processes of coding/decoding. Accordingly, it is necessary to improve quantization/dequantization by taking coding efficiency into consideration.

More particularly, conventionally, a quantization matrix for all transforms is coded/decoded by not taking a minimum size and a maximum size of a transform unit that are available into consideration. Furthermore, conventionally, a quantization matrix is applied in a lump without mixing and using a default matrix and a non-default matrix according to the size of a transform or the type of quantization matrix within a sequence, a picture, or a slice. Accoridngly, there are disadvantages in that the degree of freedom when the coder selects a quantization matrix is low and coding efficiency is low because a default matrix that does not need to be coded/decoded must be coded and transmitted.

As described above, in accordance with conventional methods, in applying a quantization matrix, the degree of freedom and coding efficiency are low and the degree of complexity is high.

In order to solve the problems, a method of effectively using a quantization matrix needs to be taken into consideration in order to improve coding efficiency and reduce the degree of complexity in quantization/dequantization.

Figure 4:
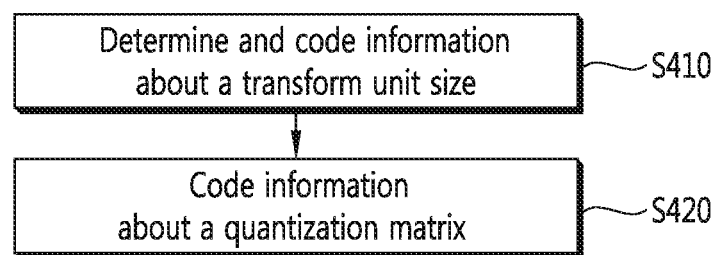
FIG. 4 is a flowchart schematically illustrating an image coding method in accordance with the present invention.

FIG. 4 is a flowchart schematically illustrating an image coding method in accordance with the present invention.

Referring to FIG. 4, the coder determines information about the size of the transform unit of a current sequence or picture and codes the information at step S410.

The information about the size of the transform unit means at least one of a minimum size and a maximum size of the transform unit. The coder can determine a minimum size and a maximum size of the transform unit when coding an image.

For example, the coder can determine a minimum size of a square transform unit as a 4×4 block or can determine a maximum size of the square transform unit as a 32×32 block. Furthermore, the coder may determine a minimum size and a maximum size of a square transform unit as a 4×4 block and a 32×32 block, respectively. The coder can perform coding according to the minimum size and the maximum size of the square transform unit.

The coder can perform entropy coding on the determined information about the size of the transform unit for a bit stream. For example, the coder can code the determined information about the size of the transform unit into a parameter set within a bit stream.

As described above, information about the size of a transform unit refers to information about at least one of a minimum size and a maximum size of the transform unit. Accordingly, the coder can code information about a minimum size and a maximum size of the transform unit into the bit stream as information about the size of the transform unit. Here, the maximum size of the transform unit can be specified using a difference value between the maximum size of the transform and the minimum size of the transform unit.

Table 1 schematically shows an example of information about the size of a transform unit that has been entropy-coded into the sequence parameter set of a bit stream.

TABLE 1

| | Descriptor |
|---|---|
| seq_parameter_set_rbsp( ) { | |
| ... | |
|    log2_min_transform_block_size_minus2 | ue(v) |
|    log2_diff_max_min_transform_block_size | ue(v) |
| ... | |
| } | |

As in the syntax element illustrated in Table 1, after calculating Log 2MinTrafoSize by applying a Log 2 function to a minimum horizontal or vertical size of a square transform unit, the coder can specify a value obtained by subtracting 2 from Log 2MinTrafoSize by using log 2_min_transform_block_size_minus2. Furthermore, after calculating Log 2MaxTrafoSize by applying a Log 2 function to a maximum horizontal or vertical size of a square transform unit, the coder can specify a difference value between Log 2MaxTrafoSize and Log 2MinTrafoSize by using log 2_diff_ max_min_transform_block_size. The coder can code log 2_min_transform_block_size_minus2 and log 2_diff_max_min_transform_block_size, that is, a syntax element, into a bit stream and send the resulting bit stream to the decoder. In other words, the coder can code values indicated by log 2_min_transform_block_size_minus2 and log 2_diff_max_min_transform_block_size and send the coded values in the form of a bit stream.

The coder can code information about a quantization matrix at step S420. The coder codes information about a quantization matrix, including one or more of (1) information about whether the quantization matrix has been used or not, (2) information about whether the quantization matrix is present or not, (3) information about whether the quantization matrix has been coded or not and whether a default matrix has been used or not, (4) a prediction coding method and type of the quantization matrix, (5) a reference quantization matrix ID (identifier), and (6) a difference value between the coefficient value of a quantization matrix that has been previously coded and the coefficient value of a quantization matrix to be coded within the quantization matrix.

Here, the coder may code the information about the quantization matrix based on the information about the size of the transform unit.

Hereinafter, a method of coding information about a quantization matrix is described in detail with reference to the figures and the following tables.

Information about a quantization matrix indicates a method determined or used by the coder. For example, the coder can determine whether or not to use a quantization matrix and can code information about whether the quantization matrix has been used or not into a parameter set. Accordingly, the coded information about whether the quantization matrix has been used or not indicates whether the quantization matrix determined by the coder has been used or not.

Table 2 shows an example in which information about whether a quantization matrix has been used or not is coded into a sequence parameter.

TABLE 2

| | Descriptor |
|---|---|
| seq_parameter_set_rbsp( ) { | |
| ... | |
|    scaling_list_enabled_flag | u(1) |
| ... | |
| } | |

As in the syntax of Table 2, the coder can code scaling_list_enabled_flag, that is, information about whether a quantization matrix has been used or not, into a sequence parameter set and send the coded information to the decoder. When a value of scaling_list_enabled_flag is 1, it can indicate that the quantization matrix is used in the dequantization/scaling of a transform coefficient for all sequences. When a value of scaling_list_enabled_flag is 0, it can indicate that the quantization matrix is not used in the dequantization/scaling of a transform coefficient. Here, the syntax can mean a syntax element.

After determining whether a quantization matrix is present or not, the coder can code information about whether the quantization matrix is present or not into a parameter set.

Table 3 shows an example in which information about whether a quantization matrix is present or not is coded into a parameter set.

TABLE 3

| | Descriptor |
|---|---|
| aps_rbsp( ) { | |
| ... | |
|    aps_scaling_list_data_present_flag | u(1) |
|    if( aps_scaling_list_data_present_flag ) | |
|      scaling_list_param( ) | |
| ... | |
| } | |

As in the syntax example of Table 3, the coder can code aps_scaling_list_data_present_flag, that is, information about whether a quantization matrix is present or not, into a parameter set. In Table 3, an example in which information about whether a quantization matrix is present or not is coded into an adaptation parameter set has been illustrated, but the present invention is not limited thereto. For example, the coder may code information about whether a quantization matrix is present or not into another parameter set.

In Table 3, when a value of aps_scaling_list_data_present_flag is 1, it indicates that the quantization matrix is present in the adaptation parameter set. When a value of aps_scaling_list_data_present_flag is 0, it indicates that the quantization matrix is not present in the adaptation parameter set. If a value of scaling_list_enabled_flag is 1 and a value of aps_scaling_list_data_present_flag is 0, it can mean that a default matrix is used when dequantization is performed. Furthermore, information about whether a quantization matrix is present or not can be present in different parameter sets. For example, if sps_scaling_list_data_present_flag indicative of whether a quantization matrix is present or not in a sequence and pps_scaling_list_data_present_flag indicative of whether a quantization matrix is present or not in a picture are used, when a value of sps_scaling_list_data_present_flag is 1 and a value of pps_scaling_list_data_present_flag is 0, a quantization matrix corresponding to the sequence can be used when quantization/dequantization are performed. That is, if a quantization matrix is transmitted through several parameter sets and a quantization matrix is not present in some parameter sets, a quantization matrix that is present or present in an active parameter set can be used when quantization/dequantization are performed. The above contents can also be applied to contents in which information about whether a quantization matrix is present or not is coded/decoded, from among embodiments to be described later.

After determining whether or not to code a quantization matrix and whether or not to use a default matrix, the coder can code information about whether the quantization matrix has been coded or not and whether the default matrix has been used or not into a parameter set.

Table 4 shows an example in which information about whether a quantization matrix has been coded or not and whether a default matrix has been used or not is coded into a parameter set.

TABLE 4

| | Descriptor |
|---|---|
| scaling_list_param( ) { | |
|   use_default_scaling_list_flag | u(1) |
|   if( !use_default_scaling_list_flag ) | |
|     for( SizeID = 0; SizeID < 4; SizeID++ ) | |
|       for( MatrixID = 0; MatrixID < (SizeID = = 3) ? 2:6; MatrixID++ ) { | |
|         pred_mode_flag | u(1) |
|         if( !pred_mode_flag ) | |
|           pred_matrix_id_delta | ue(v) |
|         else | |
|           scaling_list( QuantMatrix[ SizeID ][ MatrixID ], ( 1 << ( 4 + ( SizeID << 1 ) ) ) ) | |
|       } | |
| } | |

As in the example of Table 4, the coder can code use_default_scaling_list_flag, that is, information about whether a quantization matrix has been coded or not and whether a default matrix has been used or not, into an adaptation parameter set. When a value of use_default_scaling_list_flag is 1, the quantization matrix is not coded and thus the coefficient values of all quantization matrices are determined to be the same as the coefficient values of a default matrix defined in the coder and/or the decoder. When a value of use_default_scaling_list_flag is 0, the quantization matrix is coded and a default matrix defined in the coder and/or the decoder is not used.

Table 4 illustrates an example in which use_default_scaling_list_flag is coded into an adaptation parameter set. This is only an example for convenience of description. In some embodiments, use_default_scaling_list_flag may be coded into another parameter set.

Information about a quantization matrix may be determined by taking the size of a transform unit or the size of a transform block, coding mode, and a color component into consideration. Furthermore, information about a quantization matrix can indicate whether corresponding information is luma component (Y, luma) or a chroma component (Cb, Cr, chroma).

For example, the coder can determine at least one of the coding of a quantization matrix, whether or not to use a default matrix, and a prediction coding method by using SizeID, that is, information corresponding to the size of a quantization matrix, and MatrixID, that is, information corresponding to the type of quantization matrix. Here, SizeID may be interpreted as information about a quantization matrix corresponding to the size of a transform unit or information about a quantization matrix corresponding to the size of a transform block. Furthermore, SizeID used in this specification is identical with sizeID and sizeId, and MatrixID is identical with matrixID and matrixId.

Here, the coder may use a table stored therein and/or a table stored in the decoder.

Table 5 shows an example of a table that is used to indicate the size of a transform block or the size of a quantization matrix corresponding to a transform block.

TABLE 5

| SizeID VALUE | SIZE OF TRANSFORM UNIT (SIZE OF QUANTIZATION MATRIX) |
|---|---|
| 0 | 4 × 4 |
| 1 | 8 × 8 |
| 2 | 16 × 16 |
| 3 | 32 × 32 |

In the example of Table 5, the SizeID value specifies the size of a transform unit, the size of a transform block, or the size of a quantization matrix.

Table 6 shows an example of a table for coding mode of a block in which a quantization matrix is used and the type of quantization matrix mapped to a color component.

TABLE 6

| MatrixID value | Type of coding mode | Component |
|---|---|---|
| Meaning of MatrixID (SizeID < 3) | | |
| 0 | Intra-frame coding | Y |
| 1 | Intra-frame coding | Cb |
| 2 | Intra-frame coding | Cr |
| 3 | Inter-frame coding | Y |
| 4 | Inter-frame coding | Cb |
| 5 | Inter-frame coding | Cr |
| Meaning of MatrixID (SizeID == 3) | | |
| 0 | Intra-frame coding | Y |
| 1 | Inter-frame coding | Y |

In the example of Table 6, the MatrixID value may indicate coding mode used in a quantization matrix and the type of quantization matrix that specifies a color component Here, coding mode can mean prediction mode.

Tables 7 and 8 are examples of default quantization matrix tables that are used to specify a default quantization matrix based on SizeID and MatrixID determined in Tables 5 and 6. Here, each of values within the tables means a value specified by ScalingList[SizeID][MatrixID][i].

TABLE 7

| | i | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| ScalingList[0][0 ... 2][ i ] | 16 | 16 | 16 | 16 | 16 | 16 | 16 | 16 | 16 | 16 | 16 | 16 | 16 | 16 | 16 | 16 |
| ScalingList[0][3 ... 5][ i ] | 16 | 16 | 16 | 16 | 16 | 16 | 16 | 16 | 16 | 16 | 16 | 16 | 16 | 16 | 16 | 16 |

TABLE 8

| | i | | | | | | | | | | | | | | | |
|---|---|---|---|---|---|---|---|---|---|---|---|---|---|---|---|---|
| | 0 | 1 | 2 | 3 | 4 | 5 | 6 | 8 | 7 | 9 | 10 | 11 | 12 | 13 | 14 | 15 |
| ScalingList[1 ... 2][0 ... 2][ i ] ScalingList[3][0][ i ] | 16 | 16 | 16 | 16 | 16 | 16 | 16 | 16 | 16 | 16 | 17 | 16 | 17 | 16 | 17 | 18 |
| ScalingList[1 ... 2][3 ... 5][ i ] ScalingList[3][1][ i ] | 16 | 16 | 16 | 16 | 16 | 16 | 16 | 16 | 16 | 16 | 17 | 17 | 17 | 17 | 17 | 18 |
| | i - 16 | | | | | | | | | | | | | | | |
| | 0 | 1 | 2 | 3 | 4 | 5 | 6 | 8 | 7 | 9 | 10 | 11 | 12 | 13 | 14 | 15 |
| ScalingList[1 ... 2][0 ... 2][ i ] ScalingList[3][0][ i ] | 17 | 18 | 18 | 17 | 18 | 21 | 19 | 20 | 21 | 20 | 19 | 21 | 24 | 22 | 22 | 24 |
| ScalingList[1 ... 2][3 ... 5][ i ] ScalingList[3][1][ i ] | 18 | 18 | 18 | 18 | 18 | 20 | 20 | 20 | 20 | 20 | 20 | 20 | 24 | 24 | 24 | 24 |
| | i - 32 | | | | | | | | | | | | | | | |
| | 0 | 1 | 2 | 3 | 4 | 5 | 6 | 8 | 7 | 9 | 10 | 11 | 12 | 13 | 14 | 15 |
| ScalingList[1 ... 2][0 ... 2][ i ] ScalingList[3][0][ i ] | 24 | 22 | 22 | 24 | 25 | 25 | 27 | 30 | 27 | 25 | 25 | 29 | 31 | 35 | 35 | 31 |
| ScalingList[1 ... 2][3 ... 5][ i ] ScalingList[3][1][ i ] | 24 | 24 | 24 | 24 | 25 | 25 | 25 | 25 | 25 | 25 | 25 | 28 | 28 | 28 | 28 | 28 |
| | i - 48 | | | | | | | | | | | | | | | |
| | 0 | 1 | 2 | 3 | 4 | 5 | 6 | 8 | 7 | 9 | 10 | 11 | 12 | 13 | 14 | 15 |
| ScalingList[1 ... 2][0 ... 2][ i ] ScalingList[3][0][ i ] | 29 | 36 | 41 | 44 | 41 | 36 | 47 | 54 | 54 | 47 | 65 | 70 | 65 | 88 | 88 | 115 |
| ScalingList[1 ... 2][3 ... 5][ i ] ScalingList[3][1][ i ] | 28 | 33 | 33 | 33 | 33 | 33 | 41 | 41 | 41 | 41 | 54 | 54 | 54 | 71 | 71 | 91 |

Table 7 relates to a default quantization matrix in which an SizeID value is 0 (i.e., a 4×4 block), and Table 8 relates to default quantization matrice in which SizeID values are 1 (i.e., an 8×8 block), 2 (i.e., a 16×16 block), and 3 (i.e., a 32×32 block). In Tables 7 and 8, the SizeID and MatrixID values are values specified in Tables 5 and 6.

In Tables 7 and 8, 'i' specifies the location of each coefficient within a quantization matrix. In the case of a quantization matrix, for example, in the case of a quantization matrix for a 16×16 block or a 32×32 block, quantization matrix values for all the 16×16 block and the 32×32 block are not specified, but a quantization matrix coefficient for only an 8×8 block may be specified and unspecified quantization matrix coefficients may be derived based on the 8×8 block value and used. Table 8 shows an example in which a default quantization matrix is specified for every 8×8 block. A quantization matrix coefficient for a 16×16 block or a 32×32 block can be interpolated and derived from quantization matrices stored for every 8×8 block or can be derived in a specific way. If a 16×16-size or 32×32-size quantization matrix is derived from an 8×8-size quantization matrix through interpolation, not an interpolated value is not used, but an additional value can be used as a quantization matrix coefficient at a DC location.

Meanwhile, if a quantization matrix is not used by taking a minimum size and a maximum size of a transform unit that are available into consideration, a quantization matrix for a transform unit having all sizes must be coded. In this case, coding efficiency can be deteriorated, and the degree of complexity of calculation can be increased.

In order to solve the problems, the coder can code information about a quantization matrix by taking the size of a transform unit into consideration. For example, the coder can limit SizeID based on a minimum size and a maximum size, from among pieces of information about the size of a transform unit.

The coder can perform one or more of the coding of a quantization matrix, the coding of information about whether a default matrix has been used or not, and the coding of information about the type of prediction coding method by using a limited SizeID.

Table 9 shows an example of a syntax structure that is used when the coding of a quantization matrix is performed by limiting SizeID.

TABLE 9

| | Descriptor |
|---|---|
| scaling_list_param( ) { | |
|   use_default_scaling_list_flag | u(l) |
|   if( !use_default_scaling_list_flag ) | |
|     for( SizeID = Log2MinTrafoSize−2; | |
|     SizeID < Log2MaxTrafoSize−1; SizeID++ ) | |
|       for( MatrixID = 0; MatrixID < (SizeID = = 3) ? 2:6; MatrixID++ ) { | |
|         pred_mode_flag | u(l) |
|         if( !pred_mode_flag ) | |
|           pred_matrix_id_delta | ue(v) |
|         else | |
|           scaling_list( QuantMatrix[ SizeID ][ MatrixID ], ( 1 << ( 4 + ( SizeID << 1) ) ) ) | |
|       } | |
| } | |

As in the example of Table 9, the coder can limit SizeID based on a minimum size and a maximum size, from among pieces of information about the size of a transform unit, and perform one or more of the coding of a quantization matrix, the coding of information about whether a default matrix has been used or not, and the coding of information about the type of prediction coding method on specific transform unit sizes.

For example, when a value of Log 2MinTrafoSize is 3 and a value of Log 2MaxTrafoSize of 4, the coder can perform one or more of the coding of a quantization matrix corresponding to an 8×8 transform unit to a 16×16 transform unit, the coding of information about whether a default matrix has been used or not, and the coding of information about the type of prediction coding method.

Meanwhile, in the example of Table 9, use_default_scaling_list_flag may not be coded.

Furthermore, the coder can restrict SizeID based on a difference value between a maximum size and a minimum value, from among pieces of information about the size of a transform unit, and perform one or more of the coding of a quantization matrix, the coding of information about whether a default matrix has been used or not, and the coding of information about the type of prediction coding method.

Table 10 schematically shows an example of a syntax structure that is used to code pieces of information about a quantization matrix by restricting SizeID based on a difference value between a maximum size and a minimum value, from among pieces of information about the size of a transform unit.

TABLE 10

| | Descriptor |
|---|---|
| scaling_list_param( ) { | |
|   use_default_scaling_list_flag | u(l) |
|   if( !use_default_scaling_list_flag ) | |
|     for( SizeID = 0; SizeID < Log2MaxTrafoSize−Log2MinTrafoSize+1; SizeID++ ) | |
|       for( MatrixID = 0; MatrixID < ((SizeID+Log2MinTrafoSize−2) = = 3) ? 2:6; MatrixID++ ) { | |
|         pred_mode_flag | u(l) |
|         if( !pred_mode_flag ) | |
|           pred_matrix_id_delta | ue(v) |
|         else | |
|           scaling_list( QuantMatrix[ SizeID+Log2MinTrafoSize−2 ][ MatrixID ], ( 1 << ( 4 + ((SizeID+Log2MinTrafoSize−2) << 1) ) ) ) | |
|       } | |
| } | |

In the syntax example of Table 10, SizeID is restricted based on a difference value between a maximum size and a minimum value, from among pieces of information about the size of a transform unit. The coder can restrict SizeID based on a difference value between a maximum size and a minimum value, from among pieces of information about the size of a transform unit, and can code one or more of information about a quantization matrix, information about whether a default matrix has been used or not, and information about the type of prediction coding method only on a range of the size of a specific transform unit based on the restricted SizeID.

In the example of Table 10, when a value of Log 2MinTrafoSize is 3 and a value of Log 2MaxTrafoSize is 4, one or more of the coding of a quantization matrix corresponding to an 8×8 transform unit to a 16×16 transform unit, the coding of information about whether a default matrix has been used or not, and the coding of information about the type of prediction coding method can be performed.

Here, a difference value between Log 2MaxTrafoSize and Log 2MinTrafoSize is a difference value between a maximum size and a minimum value of a transform unit and can be identical with log 2_diff_max_min_transform_block_size. Furthermore, Log 2MinTrafoSize−2 can be identical with log 2_min_transform_block_size_minus2.

In the example of Table 10, use_default_scaling_list_flag may not be coded.

Meanwhile, if a default matrix and a non-default matrix are not mixed and used according to the size of each transform block (or unit) or the type of quantization matrix within a sequence, a picture, or a slice, the degree of freedom when the coder selects a quantization matrix is lowered. For example, in order to use a default matrix for a transform block having a specific size within a slice and a non-default matrix for another transform block having a specific size within the slice, the default matrices must be coded and transmitted to the decoder. As a result, coding efficiency is deteriorated.

In order to mix and use a default matrix and a non-default matrix according to each transform size or the type of quantization matrix within a sequence, a picture, or a slice, the coder can code information about whether a quantization matrix has been coded or not and information about whether a default matrix has been used or not into a parameter set based on SizeID.

Table 11 shows an example of a syntax structure that can be used when information about a quantization matrix is coded based on SizeID.

TABLE 11

| | Descriptor |
|---|---|
| scaling_list_param( ) { | |
|   use_default_scaling_list_flag | u(l) |
|   if( !use_default_scaling_list_flag ) { | |
|     for( SizeID = 0; SizeID < 4; SizeID++ ) { | |
|       sid_use_default_scaling_list_flag[SizeID][MatrixID] | u(l) |
|       if (!sid_use_default_scaling_list_flag[SizeID][MatrixID] ) { | |
|         for( MatrixID = 0; MatrixID < (SizeID = = 3) ? 2:6; MatrixID++ ) { | |
|           pred_mode_flag | u(l) |
|           if( !pred_mode_flag ) | |
|             pred_matrix_id_delta | ue(v) |

TABLE 11-continued

| | Descriptor |
|---|---|
|     else<br>      scaling_list(<br>      QuantMatrix[ SizeID ][ MatrixID ],<br>      ( 1 << ( 4 + ( SizeID << 1) ) ) )<br>   }<br>  }<br> }<br>} | |

As in the example of Table 11, the coder can code sid_use_default_scaling_list_flag[SizeID][MatrixID], that is, information about whether a quantization matrix has been coded or not and whether a default matrix has been used or not, into an adaptation parameter set based on SizeID. MatrixID indicates the type of specific quantization matrix as in Table 6.

When a value of sid_use_default_scaling_list_flag [SizeID][MatrixID] is 1, a quantization matrix corresponding to SizeID is not coded and the coefficient values of a quantization matrix corresponding to SizeID can be determined to be the same as the coefficient values of a default matrix defined in the coder and/or the decoder. When a value of sid_use_default_scaling_list_flag[SizeID][MatrixID] is 0, a quantization matrix corresponding to SizeID is coded, and a default matrix defined in the coder and/or the decoder may not be used in a quantization matrix corresponding to SizeID.

In the example of Table 11, use_default_scaling_list_flag may not be coded.

Furthermore, the coder can code information about whether a quantization matrix has been coded or not and whether a default matrix has been used or not into a parameter set based on MatrixID.

Table 12 schematically shows an example of a syntax structure that can be used when information about a quantization matrix is coded using MatrixID.

TABLE 12

| | Descriptor |
|---|---|
| scaling_list_param( ) {<br>  use_default_scaling_list_flag<br>  if( !use_default_scaling_list_flag)<br>    for( SizeID = 0; SizeID < 4; SizeID++ )<br>      for( MatrixID = 0; MatrixID <<br>      (SizeID = = 3) ? 2:6; MatrixID++ ) {<br>        mid_use_default_scaling_list_flag[SizeID][MatrixID]<br>        if (!mid_use_default_scaling_list_flag[SizeID]<br>        [MatrixID]) {<br>          pred_mode_flag<br>          if( !pred_mode_flag )<br>            pred_matrix_id_delta<br>          else<br>            scaling_list( QuantMatrix[ SizeID ][ MatrixID ],<br>            ( 1 << ( 4 + ( SizeID << 1) ) ) )<br>        }<br>      }<br>  }<br>} | <br>u(1)<br><br><br><br><br>u(1)<br><br><br>u(1)<br><br>ue(v)<br><br><br><br><br><br> |

As in the example of Table 12, the coder can code mid_use_default_scaling_list_flag[SizeID][MatrixID], that is, information about whether a quantization matrix has been coded or not and whether a default matrix has been used or not, into an adaptation parameter set based on MatrixID.

When a value of mid_use_default_scaling_list_flag [SizeID][MatrixID] is 1, a quantization matrix corresponding to MatrixID is not coded and the coefficient values of a quantization matrix corresponding to MatrixID can be determined to be the same as the coefficient values of a default matrix defined in the coder and/or the decoder. When a value of mid_use_default_scaling_list_flag[SizeID][MatrixID] is 0, a quantization matrix corresponding to MatrixID is coded and a default matrix defined in the coder and/or the decoder is not used as a quantization matrix corresponding to MatrixID.

In the example of Table 12, use_default_scaling_list_flag may not be coded.

Furthermore, the coder can code information about whether a quantization matrix has been coded or not and whether a default matrix has been used or not into a parameter set based on SizeID and MatrixID.

Table 13 schematically shows an example of a syntax structure that can be used when information about a quantization matrix is coded using SizeID and MatrixID.

TABLE 13

| | Descriptor |
|---|---|
| scaling_list_param( ) {<br>  use_default_scaling_list_flag<br>  if( !use_default_scaling_list_flag )<br>    for( SizeID = 0; SizeID < 4; SizeID++ )<br>      for( MatrixID = 0; MatrixID <<br>      (SizeID = = 3) ? 2:6; MatrixID++ ) {<br>        sid_mid_use_default_scaling_list_flag[SizeID]<br>        [MatrixID]<br>        if (!sid_mid_use_default_scaling_list_flag[SizeID]<br>        [MatrixID]) {<br>          pred_mode_flag<br>          if( !pred_mode_flag )<br>            pred_matrix_id_delta<br>          else<br>            scaling_list( QuantMatrix[ SizeID ][ MatrixID ],<br>            ( 1 << ( 4 + ( SizeID << 1) ) ) )<br>        }<br>      }<br>} | <br>u(1)<br><br><br><br><br>u(1)<br><br><br><br>u(1)<br><br>ue(v)<br><br><br><br><br><br> |

As in the example of Table 13, the coder can code sid_mid_use_default_scaling_list_flag[SizeID][MatrixID], that is, information about whether a quantization matrix has been coded or not and whether a default matrix has been used or not, into an adaptation parameter set on based on SizeID and MatrixID.

When a value of sid_mid_use_default_scaling_list_flag [SizeID][MatrixID] is 1, a quantization matrix corresponding to SizeID and MatrixID is not coded and the coefficient values of a quantization matrix corresponding to SizeID and MatrixID can be determined to be the same as the coefficient values of a default matrix defined in the coder and/or the decoder.

When a value of sid_mid_use_default_scaling_list_flag [SizeID][MatrixID] is 0, a quantization matrix corresponding to SizeID and MatrixID is coded and a default matrix defined in the coder and/or the decoder is not used as a quantization matrix corresponding to SizeID and MatrixID.

In the example of Table 13, use_default_scaling_list_flag may not be coded.

Meanwhile, unlike in the example of Table 13, the coder can code information about whether a quantization matrix has been coded or not and whether a default matrix has been used or not into a parameter based on SizeID and MatrixID. The coder can restrict SizeID based on a minimum size and a maximum size, from among pieces of information about the size of a transform unit, and perform one or more of the coding of a quantization matrix, the coding of information about whether a default matrix has been used or not, and the coding of information about the type of prediction coding method based on the restricted SizeID.

Table 14 schematically shows an example of another syntax structure that can be used when information about a quantization matrix is coded by using SizeID and MatrixID.

TABLE 14

| | Descriptor |
|---|---|
| scaling_list_param( ) { | |
|   use_default_scaling_list_flag | u(l) |
|   if( !use_default_scaling_list_flag ) | |
|     for( SizeID = Log2MinTrafoSize-2; SizeID < Log2MaxTrafoSize-1; SizeID++ ) | |
|       for( MatrixID = 0; MatrixID < (SizeID = = 3) ? 2:6; MatrixID++) ) { | |
|         sid_mid_use_default_scaling_list_flag[SizeID][MatrixID] | u(l) |
|         if (!sid_mid_use_default_scaling_list_flag[SizeID][MatrixID]) { | |
|           ... | |
|         } | |
|       } | |
| } | |

In the example of Table 14, use_default_scaling_list_flag may not be coded.

Furthermore, the coder may restrict SizeID based on a difference value between a maximum size and a minimum value, from among pieces of information about a transform unit, and perform one or more of the coding of a quantization matrix, the coding of information about whether a default matrix has been used or not, and the coding of information about the type of prediction coding method.

Table 15 schematically shows an example of yet another syntax structure that can be used when information about a quantization matrix is coded by using SizeID and MatrixID.

TABLE 15

| | Descriptor |
|---|---|
| scaling_list_param( ) { | |
|   use_default_scaling_list_flag | u(l) |
|   if( !use_default_scaling_list_flag) | |
|     for( SizeID = 0; SizeID < Log2MaxTrafoSize-Log2MinTrafoSize+1;SizeID++ ) | |
|       for( MatrixID = 0; MatrixID < ((SizeID+Log2MinTrafoSize-2) = = 3) ? 2:6; MatrixID++ ) { | |
|         sid_mid_use_default_scaling_list_flag[SizeID][MatrixID] | u(l) |
|         if (!sid_mid_use_default_scaling_list_flag[SizeID][MatrixID]) { | |
|           ... | |
|         } | |
|       } | |
| } | |

In the example of Table 15, a difference value between Log 2MaxTrafoSize, specifying a maximum size of a transform unit, and Log 2MinTrafoSize, specifying a minimum size of the transform unit, is a difference value between a maximum size and a minimum value of the transform unit and is identical with log 2_diff_max_min_transform_block_size. Log 2MinTrafoSize-2 is identical with log 2_min_transform_block_size_minus2.

In the example of Table 15, the coder can code information about a quantization matrix has been coded or not and whether a default matrix has been used or not into a parameter based on SizeID and MatrixID restricted by Log 2MaxTrafoSize-Log 2MinTrafoSize+1.

In the example of Table 15, use_default_scaling_list_flag may not be coded.

Meanwhile, information about whether or not information about a quantization matrix is present in a parameter set to be coded or whether or not information about a quantization matrix will be updated may be coded into a parameter set and used in coding/decoding.

Table 16 schematically shows an example of a syntax structure that can be used when information about a quantization matrix is present or not is coded.

TABLE 16

| | Descriptor |
|---|---|
| scaling_list_param( ) { | |
|   use_default_scaling_list_flag | u(l) |
|   if( !use_default_scaling_list_flag) | |
|     for( SizeID = 0; SizeID < 4; SizeID++ ) | |
|       for( MatrixID = 0; MatrixID < (SizeID = = 3) ? 2:6; MatrixID++ ) { | |
|         scaling_list_update_flag[SizeID][MatrixID] | u(l) |
|         if(scaling_list_update_flag[SizeID][MatrixID]) { | |
|           sid_mid_use_default_scaling_list_flag[SizeID][MatrixID] | u(l) |
|           if (!sid_mid_use_default_scaling_list_flag[SizeID][MatrixID]) { | |
|             ... | |
|         } | |
|       } | |
|     } | |
| } | |

In the example of Table 16, the coder can specify whether or not information about a quantization matrix is present in a parameter to be coded by using a syntax element scaling_list_update_flag[SizeID][MatrixID].

For example, when a value of scaling_list_update_flag[SizeID][MatrixID] is 1, it can indicate that information about a quantization matrix corresponding to SizeID and MatrixID is present. When a value of scaling_list_update_flag[SizeID][MatrixID] is 1, it may indicate that information about a quantization matrix, corresponding to SizeID and MatrixID and previously coded, is updated into information about a quantization matrix corresponding to SizeID and MatrixID within a parameter set to be coded. The updating can mean that information about a quantization matrix that has been previously coded is replaced with information about a quantization matrix within a parameter set to be coded.

When a value of scaling_list_update_flag[SizeID][MatrixID] is 0, it can indicate that information about a quantization matrix corresponding to SizeID and MatrixID is not present. When a value of scaling_list_update_flag[SizeID][MatrixID] is 0, it may indicate that information about a coding matrix is not updated.

When a value of scaling_list_update_flag[SizeID][MatrixID] is 0, the decoder does not know that it has to perform dequantization on a quantized transform coefficient corresponding to SizeID and MatrixID by using information about what quantization matrix because information about a quantization matrix corresponding to SizeID and MatrixID is not present in a parameter set and information about the quantization matrix has not been coded. Accordingly, when a value of scaling_list_update_flag[SizeID][MatrixID] is 0, a quantization matrix corresponding to SizeID and MatrixID may mean that a default matrix is used or that a quantization matrix is not used because information about the quantization matrix corresponding to SizeID and MatrixID is not present.

In the example of Table 16, when a value of scaling_list_update_flag[SizeID][MatrixID] is 1 because scaling_list_update_flag[SizeID][MatrixID] is coded based on SizeID and MatrixID, the coder can code one or more of information about a quantization matrix, information about whether a default matrix has been used or not, and information about the type of prediction coding method.

When a value of scaling_list_update_flag[SizeID][MatrixID] is 0, the coder does not code one or more of information about a quantization matrix, information about whether a default matrix has been used or not, and information about the type of prediction coding method are not coded. That is, the coder may not code an unnecessary quantization matrix by using scaling_list_update_flag[SizeID][MatrixID].

Since a default matrix and a non-default matrix cannot be mixed and used for each transform size or the type of each quantization matrix within a sequence, a picture, or a slice by using only scaling_list_update_flag[SizeID][MatrixID], there is a disadvantage in that the degree of freedom when a coder selects a quantization matrix is low.

Accordingly, the coder can code sid_mid_use_default_scaling_list_flag[SizeID][MatrixID], that is, information about whether a quantization matrix has been coded or not and whether a default matrix has been used or not, into a parameter set based on SizeID and MatrixID.

For example, in the example of Table 16, when a value of sid_mid_use_default_scaling_list_flag[SizeID][MatrixID] is 1, a quantization matrix corresponding to SizeID and MatrixID is not coded and the coefficient values of the quantization matrix corresponding to SizeID and MatrixID can be determined to be the same as a default matrix coefficient values defined in the coder and/or the decoder. When a value of sid_mid_use_default_scaling_list_flag[SizeID][MatrixID] is 0, a quantization matrix corresponding to SizeID and MatrixID is coded and a default matrix defined in the coder and/or the decoder is not used as a quantization matrix corresponding to SizeID and MatrixID.

In the example of Table 16, use_default_scaling_list_flag may not be coded.

Furthermore, the coder can code information about whether a quantization matrix has been coded or not and whether a default matrix has been used or not into a parameter set based on SizeID and MatrixID. Furthermore, the coder may use scaling_list_update_flag[SizeID][MatrixID], that is, information indicating whether or not information about a quantization matrix will be updated into information about a quantization matrix, corresponding to SizeID and MatrixID, within a parameter to be coded.

Table 17 schematically shows an example of a syntax structure that can be used when information about a quantization matrix is coded based on SizeID and MatrixID as described above.

TABLE 17

| | Descriptor |
|---|---|
| scaling_list_param( ) { | |
|   use_default_scaling_list_flag | u(1) |
|   if( !use_default_scaling_list_flag ) | |
|     for( SizeID = 0; SizeID < 4; SizeID++ ) | |
|       for( MatrixID = 0; MatrixID < (SizeID = = 3) ? 2:6; MatrixID++ ) { | |
|         sid_mid_use_default_scaling_list_flag[SizeID][Matrix ID] | u(1) |
|         if(!sid_mid_use_default_scaling_list_flag[SizeID] | |

TABLE 17-continued

| | Descriptor |
|---|---|
| [MatrixID]) { | |
|   scaling_list_update_flag[SizeID][MatrixID] | u(1) |
|   if (scaling_list_update_flag[SizeID][MatrixID]) { | |
|     ... | |
|   } | |
| } | |
| } | |
| } | |

In the example of Table 17, when a value of sid_mid_use_default_scaling_list_flag[SizeID][MatrixID] is 0 and a value of scaling_list_update_flag[SizeID][MatrixID] is 0, a quantization matrix corresponding to SizeID and MatrixID is coded. A quantization matrix that has been previously coded, corresponding to SizeID and MatrixID, is not updated into a quantization matrix corresponding to SizeID and MatrixID within a parameter to be coded, and a quantization matrix that has been previously coded, corresponding to coded SizeID and MatrixID, is used without change.

Furthermore, when a value of sid_mid_use_default_scaling_list_flag[SizeID][MatrixID] is 0 and a value of scaling_list_update_flag[SizeID][MatrixID] is 1, a quantization matrix corresponding to SizeID and MatrixID is coded and a quantization matrix that has been previously coded, corresponding to SizeID and MatrixID, is updated into a quantization matrix corresponding to SizeID and MatrixID within a parameter to be coded.

Furthermore, when a value of sid_mid_use_default_scaling_list_flag[SizeID][MatrixID] is 1 and a value of scaling_list_update_flag[SizeID][MatrixID] is 0, a quantization matrix corresponding to SizeID and MatrixID is not coded and the coefficient values of a quantization matrix are determined to be identical with the coefficient values of a default matrix defined in the coder and/or the decoder. A quantization matrix that has been previously coded, corresponding to SizeID and MatrixID, is not updated into a quantization matrix corresponding to SizeID and MatrixID within a parameter to be coded, and the coder and the decoder use the quantization matrix that has been previously coded, corresponding to SizeID and MatrixID.

Furthermore, when a value of sid_mid_use_default_scaling_list_flag[SizeID][MatrixID] is 1 and a value of scaling_list_update_flag[SizeID][MatrixID] is also 1, a quantization matrix corresponding to SizeID and MatrixID is not coded and the coefficient values of a quantization matrix are determined to be identical with the coefficient values of a default matrix defined in the coder and/or the decoder. A quantization matrix that has been previously coded, corresponding to SizeID and MatrixID, is updated into a quantization matrix corresponding to SizeID and MatrixID within a parameter to be coded.

In the example of Table 17, use_default_scaling_list_flag may not be coded.

Furthermore, after determining the type of method of predicting and coding a quantization matrix, the coder can code information about the method of predicting and coding a quantization matrix into a parameter set.

Tables 18 and 19 schematically show examples of syntaxes that can be used when a method of predicting and coding a quantization matrix is coded into a parameter set.

TABLE 18

| | Descriptor |
|---|---|
| scaling_list_param( ) {<br>  use_default_scaling_list_flag<br>  if( !use_default_scaling_list_flag )<br>    for( SizeID = 0; SizeID < 4; SizeID++ )<br>      for( MatrixID = 0; MatrixID < (SizeID = = 3) ? 2:6;<br>      MatrixID++ ) {<br>        pred_mode_flag<br>        if( !pred_mode_flag )<br>          pred_matrix_id_delta<br>        else<br>          scaling_list( QuantMatrix[ SizeID ][ MatrixID ],<br>          ( 1 << ( 4 + ( SizeID << 1) ) ) )<br>      }<br>} | <br>u(1)<br><br><br><br><br>u(1)<br><br>ue(v) |

TABLE 19

| | Descriptor |
|---|---|
| scaling_list( ScalingList, coefNum ) {<br>  nextcoef = 8<br>  for( i=0; i<coefNum, i++ ) {<br>    delta_coef<br>    nextcoef = ( nextcoef + delta coef + 256 ) % 256<br>    ScalingList[ i ] = nextcoef<br>  }<br>} | <br><br><br>se(v) |

As in the example of Table 18, the coder can code pred_mode_flag, that is, information about a method of predicting and coding a quantization matrix, into an adaptation parameter set, scaling_list_pred_mode_flag to be described later in this specification can be interpreted as having the same meaning as pred_mode_flag.

For example, in the example of Table 18, when a value of pred_mode_flag is 1, the coder can code a quantization matrix in accordance with a Differential Pulse Code Modulation (DPCM) method and an exponential Golomb coding method. When a value of pred_mode_flag is 0, the coder can determine the coefficient values of quantization matrix to be coded so that they have the same values as the coefficient values of previously coded quantization matrix. Here, the coefficient values of the quantization matrices and the coefficient values of the previously coded quantization matrices can be value within different quantization matrices.

If a value of pred_mode_flag is 0, the coder can code information about the reference quantization matrix ID of a quantization matrix to be coded into a parameter set.

Accordingly, as in the example of Table 18, the coder can code pred_matrix_id_delta, that is, the reference quantization matrix ID of a quantization matrix to be coded, into an adaptation parameter set.

scaling_list_pred_matrix_id_delta to be described in this specification can be interpreted as having the same meaning as pred_matrix_id_delta. Here, the coder and the decoder can determine a value of RefMatrixID, indicating the reference quantization matrix of a quantization matrix to be coded, by using pred_matrix_id_delta and Equation 1.

RefMatrixID=MatrixID−(1+pred_matrix_id_delta)     <Equation 1>

If a method of predicting and coding a quantization matrix is a method of coding a quantization matrix in accordance with the DPCM and exponential Golomb coding methods, the coder can code a difference value between the coefficient value of a quantization matrix that has been previously coded and the coefficient value of a quantization matrix to be coded into a parameter set. Here, the coefficient value of the previously coded quantization matrix can be a coefficient value within the quantization matrix to be coded. That is, the coefficient value of the previously coded quantization matrix and the coefficient value of the quantization matrix to be coded can be values within the same quantization matrix.

Accordingly, as in the example of Table 19, the coder can code delta_coef, that is, a difference value between the coefficient value of the previously coded quantization matrix and the coefficient value of the quantization matrix to be coded, into an adaptation parameter set delta_coef to be described later in this specification can be interpreted as having the same meaning as scaling_list_delta_coef.

The coder can mix and use a default quantization matrix and a non-default quantization matrix within a sequence, a picture, or a slice by using the following method and can prevent an unnecessary quantization matrix from being transmitted.

If a method of predicting and coding a quantization matrix is a method of determining a default matrix so that the default matrix is identical with a quantization matrix that has already been included in the coder and previously coded (pred_mode_flag=0), the coder can code information about whether a default matrix has been used or not into a parameter set by using the reference quantization matrix ID of a quantization matrix to be coded.

For example, as in the example of Table 18, the coder can code pred_matrix_id_delta, that is, the reference quantization matrix ID of a quantization matrix to be coded, into a parameter set. Here, the coder and the decoder can determine RefMatrixID indicative of the reference quantization matrix of the quantization matrix to be coded or the default matrix by using pred_matrix_id_delta and Equation 2 and determine whether or not to use the default matrix.

RefMatrixID=MatrixID−pred_matrix_id_delta     <Equation 2>

In Equation 2, if an a value of RefMatrixID is identical with a MatrixID value, the coefficient values of a quantization matrix corresponding to SizeID and RefMatrixID are determined to be identical with the coefficient values of a default matrix defined in the coder and/or the decoder. Here, the default matrix means a default matrix specified by SizeID and RefMatrixID.

Furthermore, when a value of pred_matrix_id_delta is 0, a value of RefMatrixID becomes identical with an MatrixID value. If a value of RefMatrixID is not identical with an MatrixID value, the coder can determine a quantization matrix corresponding to RefMatrixID as the reference quantization matrix of a quantization matrix to be coded. In this case, the coder can determine the coefficient values of the quantization matrix to be coded so that they have the same values as the coefficient values of the reference quantization matrix.

If the size of a quantization matrix corresponding to SizeID is included in a minimum size and a maximum size of a transform unit that are available by the decoder, the reference quantization matrix of a quantization matrix to be coded and whether or not to use a default matrix can be determined by using the above method. If the size of a quantization matrix corresponding to SizeID is not included in a minimum size and a maximum size of a transform unit that are available by the decoder, a method of coding a quantization matrix corresponding to SizeID may not be determined to be the same as a default matrix. The determining processes can be performed when coding one or more of information about a quantization matrix, information about whether a default matrix has been used or not, and information about the type of prediction coding method based on SizeID and a difference value between a maximum size of a transform unit and a minimum size of a transform unit.

After determining whether or not to use a quantization matrix, the coder can code information about whether the quantization matrix has been used or not into a parameter set.

Table 20 schematically shows an example in which information about whether a quantization matrix has been used or not is coded into a parameter set.

TABLE 20

| | Descriptor |
|---|---|
| scaling_list_param( ) { | |
|   scaling_list_enable_flag | u(l) |
|   if( scaling_list_enable_flag ) | |
|     for( SizeID = 0; SizeID < 4; SizeID++ ) | |
|       for( MatrixID = 0; MatrixID < (SizeID = = 3) ? 2:6; MatrixID++ ) { | |
|         pred_mode_flag | u(l) |
|         if( !pred_mode_flag ) | |
|           pred_matrix_id_delta | ue(v) |
|         else | |
|           scaling_list( QuantMatrix[ SizeID ][ MatrixID ], ( 1 << ( 4 + ( SizeID << 1) ) ) ) | |
|       } | |
| } | |

As in the example of Table 20, the coder can code scaling_list_enable_flag, that is, information about whether a quantization matrix has been used or not, into a parameter set.

In the example of Table 20, when a value of scaling_list_enable_flag is 1, a quantization matrix, such as a default matrix or a non-default matrix, can be used in quantization/dequantization. When a value of scaling_list_enable_flag is 0, the quantization matrix is not used in quantization/dequantization or all coefficient values can use the same quantization matrix. Here, all the coefficient values can be 16.

Furthermore, if a method of predicting and coding a quantization matrix is a method of coding the quantization matrix in accordance with the DPCM and exponential Golomb coding methods, the coder can code a difference value between the coefficient value of a quantization matrix that has been previously coded and the coefficient value of a quantization matrix to be coded into a parameter set. Here, the coefficient value of the previously coded quantization matrix can be a coefficient value within the quantization matrix to be coded. That is, the coefficient value of the previously coded quantization matrix and the coefficient value of the quantization matrix to be coded can be values within the same quantization matrix.

Table 21 schematically shows an example of a syntax structure that can be used when information about a quantization matrix is coded by using a difference value between the coefficient value of a quantization matrix that has been previously coded and the coefficient value of a quantization matrix to be coded.

TABLE 21

| | Descriptor |
|---|---|
| scaling_list( ScalingList, coefNum ) { | |
|   nextcoef = 8 | u(l) |

TABLE 21-continued

| | Descriptor |
|---|---|
|   for( i=0; i < coefNum, i++ ) { | |
|     scaling_list_delta_coef | se(v) |
|     nextcoef = ( nextcoef + delta_coef + 256 ) % 256 | |
|     if ( useDefaultScalingMatrixFlag = (i = = 0 && nextcoef = = 0 ) ) | |
|       break; | |
|     ScalingList[ i ] = nextcoef | |
|   } | |
| } | |

In the example of Table 21, delta_coef, that is, a difference value between the coefficient value of the quantization matrix that has been previously coded and the coefficient value of the quantization matrix to be coded, is coded into the parameter set.

In the example of Table 21, the coefficient value of the quantization matrix can be calculated using Equation 3.

$$\text{Nextcoef}=(\text{nextcoef}+\text{delta\_coef}+256)\% \, 256 \qquad \text{<Equation 3>}$$

If nextcoef, that is, the coefficient value of the quantization matrix calculated using Equation 3, is identical with (1) a specific value and is (2) the first value of the quantization matrix, the coefficient values of the quantization matrix can be determined to be identical with the coefficient values of a default matrix defined in the coder and/or the decoder.

That is, if a value of nextcoef is identical with (1) a specific value and is (2) the first value of a quantization matrix, the corresponding quantization matrix can be used as a default matrix.

Here, the specific value can be 0. Furthermore, the default matrix can be a default matrix corresponding to SizeID and MatrixID. Accordingly, if nextcoef, that is, the coefficient value of a quantization matrix, is identical with 0 and the coefficient value of a quantization matrix corresponds to the first value of the quantization matrix, the coding of a difference value between the corresponding quantization matrix and the quantization matrix can be stopped.

If a method of predicting and coding a quantization matrix is a method of coding a quantization matrix in accordance with the DPCM and exponential Golomb coding methods, the coder can code a difference value between the coefficient value of a quantization matrix that has been previously coded and the coefficient value of a quantization matrix to be coded into a parameter set. Here, the coefficient value of the quantization matrix that has been previously coded can be a coefficient value within the quantization matrix to be coded. That is, the coefficient value of the quantization matrix that has been previously coded and the coefficient value of the quantization matrix to be coded can be values within the same quantization matrix.

Table 22 schematically shows an example of a syntax structure when a difference between the coefficient value of a quantization matrix that has been previously coded and the coefficient value of a quantization matrix to be coded is used.

TABLE 22

| | Descriptor |
|---|---|
| scaling_list( scalingList, sizeID, matrixID ) { | |
|   nextcoef = 8 | u(l) |
|   coefNum = Min( 64, (1 << ( 4 + ( sizeID << 1) ) ) ) | |
|   UseDefaultScalingMatrix = 0 | |
|   if( sizeID > 1 ) { | |
|     scaling_list_dc_coef_minus8[ sizeID − 2 ][ matrixID ] | se(v) |
|     if( scaling_list_dc_coef_minus8[ sizeID − 2 ] | |

TABLE 22-continued

| | Descriptor |
|---|---|
| ```
        [ matrixID ] + 8 = = 0 )
         UseDefaultScalingMatrixFlag = 1
    }
    if( UseDefaultScalingMatrixFlag == 0 ) {
      for( i=0, i < coefNum, i++) {
         delta_coef
         nextcoef = ( nextcoef + delta_coef + 256 ) % 256
         if( sizeID < 2) {
           useDefaultScalingMatrixFlag = (i = = 0 &&
           nextcoef = = 0 )
           if( useDefaultScalingMatrixFlag )
              Break
         }
         scalingList[ i ] = nextcoef
      }
    }
  }
}
``` | se(v) |

In the example of Table 22, delta_coef, that is, a difference value between the coefficient value of a quantization matrix that has been previously coded and the coefficient value of a quantization matrix to be coded, is coded into a parameter set. In the example of Table 22, if nextcoef, that is, the coefficient value of a quantization matrix calculated using Equation 3, is identical with a specific value and is the first value of the quantization matrix, the coefficient values of the quantization matrix can be determined to be identical with the coefficient values of a default matrix defined in the coder and/or the decoder.

That is, if a value of nextcoef is identical with (1) a specific value and is (2) the first value of a quantization matrix, the quantization matrix can be used as a default matrix. Here, the specific value can be 0, and the coefficient value of the quantization matrix calculated using Equation 3 can be the coefficient value of a quantization matrix having a quantization matrix size or a transform size of 4×4 and 8×8.

Furthermore, the first value of the quantization matrix can be a value that uses scaling_list_dc_coef_minus8, and the specific value may be a value corresponding to scaling_list_dc_coef_minus8+8.

Here, scaling_list_dc_coef_minus8 can mean the first value of a quantization matrix having a 16×16 size or a quantization matrix having a 32×32 size. That is, scaling_list_dc_coef_minus8 may mean the coefficient value of a quantization matrix for a DC matrix coefficient and may mean a DC matrix coefficient. In this specification, a DC matrix coefficient is present within a quantization matrix used when dequantization is performed, and the DC matrix coefficient can mean a quantization matrix coefficient for a DC transform coefficient within a transform block.

For example, when sizeID is 2, scaling_list_dc_coef_minus8[sizeID-2][matrixID] can mean the coefficient value of a quantization matrix for a DC matrix coefficient in a quantization matrix having a 16×16 size or a transform size. When SizeID is 3, scaling_list_dc_coef_minus8[sizeID-2][matrixID] can mean the coefficient value of a quantization matrix for a DC matrix coefficient in a quantization matrix having a 32×32 size or a transform size.

Furthermore, the aforementioned default matrix can mean a default matrix corresponding to SizeID and MatrixID. As described above, if the coefficient value of a quantization matrix, nextcoef, is identical with 0 and is the first value of the quantization matrix, the coding of a difference value between the corresponding quantization matrix and the quantization matrix can be stopped.

If this method is used, whether or not to code scaling_list_dc_coef_minus8, that is, the coefficient value of a quantization matrix for a DC matrix coefficient, and the coding of information about whether a default matrix has been used or not can be differently performed accoridng to the size of a quantization matrix or a transform size.

Meanwhile, the coding/decoding methods of a quantization matrix for determining whether or not to use a default matrix by using the coefficient value of a quantization matrix are disadvantageous in that the degree of complexity in a process of coding/decoding the coefficient value of a quantization matrix is increased.

The following method provides a method of determining whether or not to use a default matrix by using a reference quantization matrix ID in image coding/decoding. Accordingly, if the following method is used, the degree of complexity of calculation can be reduced when coding/decoding a quantization matrix.

Tables 23 and 24 schematically examples of syntax structures that can be used when a reference quantization matrix ID is used.

TABLE 23

| | Descriptor |
|---|---|
| ```
scaling_list_param( ) {
  scaling_list_present_flag
  if( scaling_list_present_flag )
    for( sizeID = 0; sizeID < 4; sizeID++ )
      for( matrixID = 0; matrixID < (sizeID = = 3) ? 2 : 6;
      matrixID++ ) {
         scaling_list_pred_mode_flag
         if( !scaling_list_pred_mode_flag )
           scaling_list_pred_matrix_id_delta
         else
           scaling_list( ScalingList[ size ID ][ matrix ID ],
           sizeID , matrixID )
      }
}
``` | u(1)<br><br><br><br>u(1)<br><br>ue(v) |

TABLE 24

| | Descriptor |
|---|---|
| ```
scaling_list( scalingList, sizeID , matrixID) {
  nextCoef = 8
  coefNum = Min( 64, ( 1 << ( 4 + ( sizeID << 1) ) ) )
  if( sizeID > 1)
    scaling_list_dc_coef_minus8[ sizeID - 2 ][ matrixID ]
  for( i=0; i < coefNum; i++) {
    scaling_list_delta_coef
    nextCoef = ( nextCoef + scaling_list_delta_coef +
    256 ) % 256
    scalingList[ i ] = nextCoef
  }
}
``` | u(1)<br><br><br>se(v)<br><br>se(v) |

First, the coder can code information about whether a quantization matrix is present or not into a parameter set.

As in the example of Table 23, the coder can code scaling_list_present_flag, that is, information about whether a quantization matrix is present or not within a bit stream, into a parameter set. For example, if the quantization matrix is not present and quantization matrices are determined as a default quantization matrix, the coder can code a value of scaling_list_present_flag as 0. If a coded quantization matrix is present, the code can code a value of scaling_list_present_flag as 1.

The coder can determine the type of prediction coding method for a quantization matrix and code information about a determined method of predicting and coding a quantization matrix into a parameter set. Here, the parameter set into which the information about the method of predicting and coding a quantization matrix is coded can be an adaptation parameter set.

As in the example of Table 23, the coder can code scaling_list_pred_mode_flag, that is, information specifying a method of predicting and coding a quantization matrix, into a parameter set. For example, if the coefficient value of a quantization matrix is coded in accordance with the DPCM and exponential Golomb coding methods by scanning the quantization matrix in order to predict and code the quantization matrix, the coder codes a value of scaling_list_pred_mode_flag as 1. Furthermore, if a reference quantization matrix and a quantization matrix to be coded are determined to have the identical values or the coefficient values of a quantization matrix to be coded are determined to be identical with the coefficient values of a default matrix, the coder can code a value of scaling_list_pred_mode_flag as 0.

Here, to determine the matrices or the coefficient values so that they have the identical values can mean that a quantization matrix prediction method of copying the coefficient values of a specific quantization matrix to the coefficient values of a quantization matrix to be coded is used.

If a value of scaling_list_pred_mode_flag is 0, the coder can code the reference quantization matrix ID of a quantization matrix to be coded and information about whether a default matrix has been used or not into a parameter set. Here, the parameter set can be an adaptation parameter set.

As in the example of Table 23, if a value of scaling_list_pred_mode_flag is 0, the coder can code scaling_list_pred_matrix_id_delta, that is, the reference quantization matrix ID of a quantization matrix to be coded, into a parameter set.

Here, the coder can determine a value of scaling_list_pred_matrix_id_delta, that is, a quantization matrix ID, by using matrixID indicative of the quantization matrix to be coded, RefMatrixID indicative of the reference quantization matrix or the default matrix, and Equation 4.

scaling_list_pred_matrix_id_delta=matrixID−RefMatrixID    <Equation 4>

If the coefficient values of a quantization matrix to be coded are determined to be identical with the coefficient values of a default matrix defined in the coder and/or the decoder, the coder makes a value of RefMatrixID identical with a value of matrixID by coding a value of scaling_list_pred_matrix_id_delta as 0. Here, the default matrix can mean a default matrix corresponding to sizeID and matrixID.

If the coefficient values of a quantization matrix to be coded are determined to be identical with the coefficient values of a reference quantization matrix (i.e., determined to be identical with the coefficient values of a quantization matrix that has been previously coded), the coder can code a value of scaling_list_pred_matrix_id_delta as a value not 0 so that a value of RefMatrixID is not identical with a value of matrixID. Here, a value of scaling_list_pred_matrix_id_delta can be a positive integer.

If a method of predicting and coding a quantization matrix is a method of coding a quantization matrix in accordance with the DPCM and exponential Golomb coding methods in order to predict and code a coefficient within the quantization matrix, the coder can code a difference value between the coefficient value of a quantization matrix that has been previously coded within the quantization matrix and the coefficient value of a quantization matrix to be coded into a parameter set. Here, the parameter set into which the difference value is coded can be an adaptation parameter set.

As in the example of Table 24, if the size of a quantization matrix to be coded is 16×16 (sizeID=2) or 32×32 (sizeID=3), the coder can code scaling_list_dc_coef_minus8, that is, a DC matrix coefficient, into a parameter set.

As in the example of Table 24, the coder can code scaling_list_delta_coef, that is, a difference value between the coefficient value of a quantization matrix that has been previously coded within the quantization matrix and the coefficient value of a quantization matrix to be coded, into a parameter set. In Tables 23 and 24, examples in which information about a quantization matrix is coded into an adaptation parameter set have been illustrated, but the present invention is not limited thereto. For example, the coder can code information about a quantization matrix into another parameter set (i.e., a parameter set including at least one of a sequence parameter set and a picture parameter set).

As described above, conventional quantization matrix coding/decoding methods are disadvantageous in that coding efficiency is deteriorated because unnecessary information is coded/decoded when predicting the quantization matrix.

In the present invention, however, coding efficiency can be improved when coding/decoding a quantization matrix by differently performing the coding/decoding of the quantization matrix depending on whether a reference quantization matrix is present or not.

Tables 25 and 26 schematically show examples of syntax structures that can be used when the coding/decoding of a quantization matrix are differently performed depending on whether a reference quantization matrix is present or not.

TABLE 25

| | Descriptor |
|---|---|
| scaling_list_param( ) { | |
|   scaling_list_present_flag | u(1) |
|   if( scaling_list_present_flag ) | |
|     for( sizeID = 0; sizeID < 4; sizeID++ ) | |
|       for( matrixID = 0; matrixID < (sizeID = = 3) ? 2 : 6; matrixID++ ) { | |
|         scaling_list_pred_mode_flag = TRUE; | |
|         if ( matrixID > 0 ) | |
|           scaling_list_pred_mode_flag | u(1) |
|         if( !scaling_list_pred_mode_flag && matrixID > 0) | |
|           scaling_list_pred_matrix_id_delta | ue(v) |
|         else | |
|       scaling_list( ScalingList[ sizeID ][ matrixID ], sizeID, matrix ID ) | |
|       } | |
| } | |

TABLE 26

| | Descriptor |
|---|---|
| scaling_list( scalingList, sizeID , matrixID ) { | |
|   nextCoef = 8 | u(1) |
|   coefNum = Min( 64, ( 1 << ( 4 + ( sizeID << 1) ) ) ) | |
|   UseDefaultScalingMatrix = 0 | |
|   if( sizeID > 1 ) { | |
|     scaling_list_dc_coef_minus8[ sizeID − 2 ][ matrixID ] | se(v) |
|     if( scaling_list_dc_coef_minus8[ sizeID − 2 ] [ matrixID ] = = −8 ) | |
|       UseDefaultScalingMatrixFlag = 1 | |
|   } | |
|   if( UseDefaultScalingMatrixFlag = = 0) { | |
|     stopNow = 0 | |

TABLE 26-continued

| | Descriptor |
|---|---|
| ``` for( i=0; i < coefNum && !stopNow; i++) {     scaling_list_delta_coef     nextCoef = ( nextCoef + scaling_list_delta_coef +         256) %256     if( sizeID < 2 ) {        useDefaultScalingMatrixFlag = (i = = 0 &&            nextCoef = = 0 )        if( useDefaultScalingMatrixFlag )           stopNow = 1     }     if( !stopNow )        scalingList [ i ] = nextCoef   } } ``` | se(v) |

First, the coder can code information indicative of whether a quantization matrix is present or not into a parameter set.

As in the example of Table 25, the coder can code scaling_list_present_flag, that is, information indicating whether a quantization matrix is present or not within a bit stream, into a parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of method of predicting and coding a quantization matrix, if a value of matrixID is greater than 0, the coder can code information about the method of predicting and coding a quantization matrix into a parameter set. Here, the parameter set into which the information about the method of predicting and coding a quantization matrix is coded can be an adaptation parameter set.

As in the example of Table 25, the coder can code scaling_list_pred_mode_flag, that is, information specifying a method of predicting and coding a quantization matrix, into a parameter set only when a value of matrixID is greater than 0. If a quantization matrix is coded in accordance with the DPCM and exponential Golomb coding methods by scanning the quantization matrix in order to predict and code a coefficient within the quantization matrix, the coder codes a value of scaling_list_pred_mode_flag as 1. Furthermore, if a reference quantization matrix is determined to have the same values as a quantization matrix to be coded, the coder codes a value of scaling_list_pred_mode_flag as 0. Here, to determine the matrices so that they have the same values can mean that a quantization matrix prediction method of copying the coefficient values of the reference quantization matrix to the coefficient values of the quantization matrix to be coded is used.

If a value of matrixID is 0, a value of scaling_list_pred_mode_flag becomes TRUE as in the example of Table 23. Accordingly, the coder does not code a value of scaling_list_pred_mode_flag and can code a quantization matrix in accordance with the DPCM and exponential Golomb coding methods by scanning the quantization matrix.

If a value of scaling_list_pred_mode_flag is 0 and a value of matrixID is greater than 0, the coder can code the reference quantization matrix ID of a quantization matrix to be coded into a parameter set. Here, the parameter set into which the reference quantization matrix ID is coded can be an adaptation parameter set.

As in the example of Table 25, if a value of scaling_list_pred_mode_flag is 0, the coder can code scaling_list_pred_matrix_id_delta, that is, the reference quantization matrix ID of a quantization matrix to be coded, into a parameter set only when a value of matrixID is greater than 0. Here, the coder and the decoder can determine a value of scaling_list_pred_matrix_id_delta, that is, the quantization matrix ID, by using matrixID indicative of the quantization matrix to be coded, RefMatrixID indicative of the reference quantization matrix, and Equation 5.

$$\text{scaling\_list\_pred\_matrix\_id\_delta} = \text{matrixID} - (\text{RefMatrixID} + 1) \qquad \text{<Equation 5>}$$

When a value of matrixID is 0, the first quantization matrix is indicated for every sizeID. Since a quantization matrix can be predicted from only a quantization matrix having the same sizeID, which has been previously coded, a reference quantization matrix having the same sizeID value is not present for the first quantization matrix for every sizeID. Accordingly, the prediction of a quantization matrix, such as a matrix copy method, cannot be performed. As a result, only when a value of matrixID is greater than 0, the coder can code scaling_list_pred_matrix_id_delta that is a reference quantization matrix ID, determine RefMatrixID based on the coded reference quantization matrix ID, and determine the coefficient values of a quantization matrix to be coded so that they have the same values as the coefficient values of the reference quantization matrix.

To determine the coefficient values of a quantization matrix to be coded so that they have the same values as the coefficient values of a reference quantization matrix can mean a quantization matrix prediction method of determining a reference quantization matrix, corresponding RefMatrixID, as the reference quantization matrix of a quantization matrix to be coded and copying the coefficient values of the reference quantization matrix to the coefficient values of the quantization matrix to be coded.

If a method of predicting and coding a quantization matrix is a method of coding a quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into a parameter set. Here, the parameter set into which the difference value is coded can be an adaptation parameter set.

As in the example of Table 26, if the size of a quantization matrix to be coded is 16×16 (sizeID=2) or 32×32 (sizeID=3), the coder can code scaling_list_dc_coef_minus8, that is, a DC matrix coefficient, into a parameter set.

As in the example of Table 26, the coder can code scaling_list_delta_coef, that is, a difference value between the coefficient value of a quantization matrix that has been previously coded within the quantization matrix and the coefficient value of a quantization matrix to be coded into a parameter set.

Furthermore, the coder can code information about whether a default matrix has been used or not by using scaling_list_delta_coef that is used to calculate scaling_list_dc_coef_minus8 or nextCoef. That is, the coder can code a value of scaling_list_dc_coef_minus8 so that it becomes −8 in order to instruct the decoder to use a default matrix and can code scaling_list_delta_coef so that the first nextCoef value becomes 0 in order to instruct the decoder to use a default matrix.

Meanwhile, a method of coding/decoding a quantization matrix in which whether or not to use a default matrix by using the coefficient value of the quantization matrix has a disadvantage in that it increases the degree of complexity in a process of coding/decoding the coefficient value of the quantization matrix. Furthermore, there is a disadvantage in that coding efficiency is deteriorated because unnecessary information is coded/decoded when predicting the quantization matrix.

However, the present invention can reduce the degree of complexity of calculation when coding/decoding a quantization matrix because whether or not to use a default matrix is determined by using the ID of a reference quantization matrix in image coding/decoding. Furthermore, the present invention can improve coding efficiency when coding/decoding a quantization matrix by differently coding/decoding the quantization matrix depending on whether a reference quantization matrix is present or not.

Tables 27 and 28 schematically show examples of syntax structures that can be used when the ID of a reference quantization matrix is used.

TABLE 27

| | Descriptor |
|---|---|
| scaling_list_param( ) { | |
|     scaling_list_present_flag | u(1) |
|     if( scaling_list_present_flag ) | |
|         for( sizeID = 0; sizeID < 4; sizeID++ ) | |
|             for( matrixID = 0; matrixID < | |
|             (sizeID = = 3) ? 2 : 6; matrixID++ ) { | |
|                 scaling_list_pred_mode_flag | u(1) |
|                 if( !scaling_list_pred_mode_flag && | |
|                 matrixID > 0) | |
|                     scaling_list_pred_matrix_id_delta | ue(v) |
|                 else | |
|             scaling_list( ScalingList[ sizeID ][ matrixID ], | |
|             sizeID , matrixID ) | |
|         } | |
| } | |

TABLE 28

| | Descriptor |
|---|---|
| scaling_list( scalingList, sizeID , matrixID ) { | |
|   nextCoef = 8 | u(1) |
|   coefNum = Min( 64, ( 1 << ( 4 + ( sizeID << 1) ) ) ) | |
|   if( sizeID > 1 ) | |
|     scaling_list_dc_coef_minus8[ sizeID − 2 ][ matrixID ] | se(v) |
|   for( i=0; i < coefNum; i++) { | |
|     scaling_list_delta_coef | se(v) |
|     nextCoef = ( nextCoef + scaling_list_delta_coef + | |
|     256 ) % 256 | |
|     scalingList[ i ] = nextCoef | |
|   } | |
| } | |

First, the coder can code information indicative of whether a quantization matrix is present or not into a parameter set.

As in the example of Table 27, the coder can code scaling_list_present_flag, that is, information specifying whether a quantization matrix is present or not within a bit stream, into a parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of prediction coding method for the quantization matrix, the coder can code information about the method of predicting and coding a quantization matrix into a parameter set. Here, the parameter set into which the information about the method of predicting and coding a quantization matrix is coded can be an adaptation parameter set.

As in the example of Table 27, the coder can code scaling_list_pred_mode_flag, that is, information about the prediction coding method of a quantization matrix, into a parameter set. For example, if a quantization matrix is coded in accordance with the DPCM and exponential Golomb coding methods by scanning the quantization matrix in order to predict and code a coefficient within the quantization matrix, the coder can code a value of scaling_list_pred_mode_flag as 1. If a reference quantization matrix and a quantization matrix to be coded are determined to have the same values or the coefficient values of a quantization matrix to be coded are determined to be identical with the coefficient values of a default matrix, the coder can code a value of scaling_list_pred_mode_flag as 0. Here, to determine the values so that they have the same values can mean that a quantization matrix prediction method of copying the coefficient values of a specific quantization matrix to the coefficient values of a quantization matrix to be coded is used.

If a value of scaling_list_pred_mode_flag is 0 and a value of matrixID is greater than 0, the coder can code information about the reference quantization matrix ID of a quantization matrix to be coded and whether or not to use the default matrix into a parameter set. Here, the parameter set into which the information about the reference quantization matrix ID and whether or not to use the default matrix is coded can be an adaptation parameter set.

As in the example of Table 27, if a value of scaling_list_pred_mode_flag is 0, the coder can code scaling_list_pred_matrix_id_delta, that is, the reference quantization matrix ID of a quantization matrix to be coded, into the parameter set only when a value of matrixID is greater than 0.

Here, the coder can determine scaling_list_pred_matrix_id_delta, that is, the quantization matrix ID, by using matrixID indicating the quantization matrix to be coded, RefMatrixID indicating the reference quantization matrix or the default matrix, and Equation 6.

scaling_list_pred_matrix_id_delta=matrixID−RefMatrixID     <Equation 6>

If the coefficient values of a quantization matrix to be coded have been determined to be identical with the coefficient values of a default matrix defined in the coder and/or the decoder, the coder can code a value of scaling_list_pred_matrix_id_delta as 0 so that a value of RefMatrixID is identical with a value of matrixID. Here, the default matrix means a default matrix corresponding to sizeID and matrixID.

If the coefficient values of a quantization matrix to be coded are determined to be identical with the coefficient values of a reference quantization matrix, the coder can code a value of scaling_list_pred_matrix_id_delta as a value not 0 so that a value of RefMatrixID and a value of matrixID are not identical with each other.

Furthermore, when a value of scaling_list_pred_mode_flag is 0, it indicates that a method of predicting and coding a quantization matrix is performed to determine a quantization matrix to be the same reference quantization matrix or a default matrix. In this case, the quantization matrix can be predicted from a quantization matrix or a default matrix having the same sizeID, which has been previously coded.

When a value of matrixID is 0, it means the first quantization matrix for every sizeID. Thus, when a value of scaling_list_pred_mode_flag is 0 and a value of matrixID is 0, a reference quantization matrix having the same sizeID value for the first quantization matrix for every sizeID is not present. Accordingly, the prediction of a quantization matrix, such as a matrix copy method, cannot be performed on the first quantization matrix for every sizeID.

In this case, the coder can derive a value of scaling_list_pred_matrix_id_delta as 0 without coding scaling_list_pred_matrix_id_delta. When a value of scaling_list_pred_matrix_id_delta is 0, the coefficient values of a quantization matrix to be coded corresponding to sizeID and matrixID can be determined to be identical with the coefficient values of a default matrix that has been defined in the coder and/or the decoder because a value of RefMatrixID is identical with a value of matrixID. Here, the default matrix can mean a default matrix corresponding to sizeID and matrixID.

If a method of predicting and coding a quantization matrix is a method of coding a quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into a parameter set. Here, the parameter set into which the difference value is coded can be an adaptation parameter set.

As in the example of Table 28, if the size of the quantization matrix to be coded is 16×16 (sizeID=2) or 32×32 (sizeID=3), the coder can code scaling_list_dc_coef_minus8, that is, a DC matrix coefficient, into the parameter set.

scaling_list_delta_coef, that is, the difference value between the coefficient value of a quantization matrix that has been previously coded within the quantization matrix and the coefficient value of the quantization matrix to be coded, can be coded into the parameter set as in the example of Table 28.

In conventional quantization matrix coding/decoding methods, when sending a quantization matrix, all coefficients and a DC matrix coefficient within a matrix are coded/decoded. In this case, the improvement of coding efficiency is limited because prediction and coding/decoding are not performed on the DC matrix coefficient.

In contrast, if prediction and coding/decoding are performed on a DC matrix coefficient within a quantization matrix, coding efficiency can be improved.

Here, the present invention provides a method of predicting a DC matrix coefficient from neighboring AC coefficients by using a high correlation between neighboring coefficients without predicting the DC matrix coefficient from a constant 8. The present invention can improve coding efficiency through this method.

Tables 29 and 30 schematically show examples of syntax structures that can be used when predicting a DC matrix coefficient by using a correlation between neighboring coefficients.

TABLE 29

| | Descriptor |
|---|---|
| scaling_list_param( ) { | |
|   scaling_list_present_flag | u(l) |
|   if( scaling_list_present_flag ) | |
|     for( sizeID = 0; sizeID < 4; sizeID++ ) | |
|       for( matrixID = 0; matrixID < | |

TABLE 29-continued

| | Descriptor |
|---|---|
|       (sizeID = = 3) ? 2 : 6; matrixID++ ) { | |
|         scaling_list_pred_mode_flag | u(l) |
|         if( !scaling_list_pred_mode_flag ) | |
|           scaling_list_pred_matrix_id_delta | ue(v) |
|         else | |
|           scaling_list( ScalingList[ sizeID ] | |
|           [ matrixID ], sizeID , matrixID ) | |
|       } | |
| } | |

TABLE 30

| | Descriptor |
|---|---|
| scaling_list( scalingList, sizeID , matrixID ) { | |
|   nextCoef = 8 | u(l) |
|   coefNum = Min( 64, ( 1 << ( 4 + ( sizeID << 1) ) ) ) | |
|   UseDefaultScalingMatrix = 0 | |
|   stopNow = 0 | |
|   for( i=0; i < coefNum && !stopNow; i++) { | |
|     scaling_list_delta_coef | se(v) |
|     nextCoef = ( nextCoef + scaling_list_delta_coef + 256 ) % 256 | |
|     if( sizeID < 2 ) { | |
|       useDefaultScalingMatrixFlag = (i = = 0 && nextCoef = = 0 ) | |
|       if( useDefaultScalingMatrixFlag ) | |
|         stopNow = 1 | |
|     } | |
|     if( !stopNow ) | |
|       scalingList[ i ] = nextCoef | |
|   } | |
|   if( sizeID > 1 && !useDefaultScalingMatrixFlag ) | |
|     scaling_list_dc_coef_res[ sizeID − 2 ][ matrixID ] | se(v) |
| } | |

In the examples of Tables 29 and 30, the coding/decoding sequence of a quantization matrix is made identical with the restoration sequence of the quantization matrix. In this case, a memory space for storing DC matrix coefficients can be reduced. Furthermore, in the examples of Tables 29 and 30, when indicating whether or not to use a default matrix, only a syntax element 'scaling_list_delta_coef' can be used without using several syntax elements.

First, the coder can code information indicative of whether a quantization matrix is present or not into a parameter set.

As in the example of Table 28, the coder can code scaling_list_present_flag, that is, information indicating whether a quantization matrix is present or not within a bit stream, into the parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of method of predicting and coding a quantization matrix, the coder can code information about the method of predicting and coding a quantization matrix into the parameter set. Here, the parameter set into which the information about the method of predicting and coding a quantization matrix is coded can be an adaptation parameter set.

As in the example of Table 29, the coder can code scaling_list_pred_mode_flag, that is, information about a method of predicting and coding a quantization matrix, into the parameter set. For example, if a quantization matrix is coded in accordance with the DPCM and exponential Golomb coding methods by scanning the quantization matrix in order to predict and code a coefficient within the quantization matrix, the coder can code a value of scaling_list_pred_mode_flag as 1. If a reference quantization matrix is determined to have the same values as a quantization matrix to be coded, the coder can code a value of scaling_list_pred_mode_flag as 0. Here, to determine the values so that they have the same values can mean that a quantization matrix prediction method of copying the coefficient values of the reference quantization matrix to the coefficient values of the quantization matrix to be coded is used.

If a value of scaling_list_pred_mode_flag is 0, the coder can code the reference quantization matrix ID of a quantization matrix to be coded into the parameter set. Here, the parameter set into which the reference quantization matrix ID is coded can be an adaptation parameter set.

As in the example of Table 29, if a value of scaling_list_pred_mode_flag is 0, the coder can code scaling_list_pred_matrix_id_delta, that is, the reference quantization matrix ID of a quantization matrix to be coded, into the parameter set. Here, the coder can determine scaling_list_pred_matrix_id_delta, that is, the quantization matrix ID, by using matrixID indicating the quantization matrix to be coded, RefMatrixID indicating the reference quantization matrix, and Equation 7 below.

scaling_list_pred_matrix_id_delta=matrixID−(RefMatrixID+1)   <Equation 7>

To determine the coefficient values of the quantization matrix to be coded so that they have the same values as the coefficient values of the reference quantization matrix can mean that a quantization matrix prediction method of determining the reference quantization matrix, corresponding to RefMatrixID, as the reference quantization matrix of the quantization matrix to be coded and copying the coefficient values of the reference quantization matrix to the coefficient values of the quantization matrix to be coded is used.

If a method of predicting and coding a quantization matrix is a method of coding the quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into the parameter set Here, the parameter set into which the difference value is coded can be an adaptation parameter set.

As in the example of Table 30, the coder can code scaling_list_delta_coef, that is, the difference value between the coefficient value of the quantization matrix that has been previously coded within the quantization matrix and the coefficient value of the quantization matrix to be coded, into the parameter set.

Here, the coder can code information about whether or not to use a default matrix by using scaling_list_delta_coef that is used to calculate nextCoef. For example, the coder can code scaling_list_delta_coef so that the first nextCoef value becomes 0 in order to instruct the decoder to use the default matrix.

As in the example of Table 30, the coder can code scaling_list_dc_coef_res, that is, a difference value between the coefficient values of quantization matrices corresponding to a DC matrix coefficient, into the parameter set. Here, scaling_list_dc_coef_res can be coded into (useDefaultScalingMatrixFlag=0) if the size of a quantization matrix to be coded is a 16×16 (sizeID=2) or 32×32 (sizeID=3) quantization matrix and the default matrix is not used.

In the example of Table 30, a value of scaling_list_dc_coef_res for a 16×16-size or 32×32-size quantization matrix for coding a DC matrix coefficient separately can be calculated by using a difference between a value of the DC matrix coefficient and a matrix coefficient present at a DC location.

Meanwhile, a method of coding/decoding a quantization matrix for determining whether or not to use a default matrix by using the coefficient value of a quantization matrix has a disadvantage in that it increases the degree of complexity in a process of coding/decoding the coefficient value of the quantization matrix. Furthermore, conventionally, when sending a quantization matrix, all coefficients and a DC matrix coefficient within a matrix are coded/decoded. In this case, the improvement of coding efficiency is limited because prediction and coding/decoding are not performed on the DC matrix coefficient.

In the present invention, in image coding/decoding, whether or not to use a default matrix is determined by using the ID of a reference quantization matrix. Accordingly, the degree of complexity of calculation when coding/decoding a quantization matrix can be reduced. Furthermore, in the present invention, since prediction and coding/decoding are performed on a DC matrix coefficient within a quantization matrix, coding efficiency can be improved. Moreover, coding efficiency can be improved because a DC matrix coefficient is predicted from neighboring AC coefficients by using a high correlation between the neighboring AC coefficients without predicting a constant 8.

Tables 31 and 32 schematically show example of syntax structures that can be used when all the aforementioned characteristics are applied.

TABLE 31

|  | Descriptor |
|---|---|
| scaling_list_param( ) { |  |
|    scaling_list_present_flag | u(1) |
|    if( scaling_list_present_flag ) |  |
|      for( sizeID = 0; sizeID < 4; sizeID++ ) |  |
|         for( matrixID = 0; matrixID < |  |
|         (sizeID = = 3) ? 2 : 6; matrixID++ ) { |  |
|            scaling_list_pred_mode_flag | u(1) |
|            if( !scaling_list_pred_mode_flag ) |  |
|               scaling_list_pred_matrix_id_delta | ue(v) |
|            else |  |
|               scaling_list( ScalingList[ sizeID ] |  |
|               [ matrixID ], sizeID , matrixID ) |  |
|         } |  |
| } |  |

TABLE 32

|  | Descriptor |
|---|---|
| scaling_list( scalingList, sizeID , matrixID ) { |  |
|   nextCoef = 8 | u(1) |
|   coefNum = Min( 64, ( 1 << ( 4 + ( sizeID << 1) ) ) ) |  |
|   for( i=0; i < coefNum; i++) { |  |
|     scaling_list_delta_coef | se(v) |
|     nextCoef = ( nextCoef + scaling_list_delta_coef + 256 ) % 256 |  |
|     scalingList[ i ] = nextCoef |  |
|   } |  |

TABLE 32-continued

| | Descriptor |
|---|---|
| if( sizeID > 1 ) | |
|     scaling_list_dc_coef_res[ sizeID − 2 ][ matrixID ] | se(v) |
| } | |

In the examples of Tables 31 and 32, the coding/decoding sequence of a quantization matrix is made identical with the restoration sequence of the quantization matrix. Accordingly, a memory space for storing DC matrix coefficients can be reduced. Furthermore, in the examples of Tables 31 and 32, when indicating whether or not to use a default matrix, several syntax elements are not used, but only a syntax element scaling_list_delta_coef can be used.

First, the coder can code information indicative of whether a quantization matrix is present or not into a parameter set.

As in the example of Table 31, the coder can code scaling_list_present_flag, that is, information indicating whether a quantization matrix is present or not within a bit stream, into the parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of prediction coding method for the quantization matrix, the coder can code information about the method of predicting and coding a quantization matrix into the parameter set. Here, the parameter set into which the information about the method of predicting and coding a quantization matrix is coded can be an adaptation parameter set.

As in the example of Table 31, the coder can code scaling_list_pred_mode_flag, that is, information specifying a method of predicting and coding a quantization matrix, into the parameter set. For example, if a quantization matrix is coded in accordance with the DPCM and exponential Golomb coding methods by scanning the quantization matrix in order to predict and code a coefficient within the quantization matrix, the coder codes a value of scaling_list_pred_mode_flag as 1. Furthermore, if a reference quantization matrix and a quantization matrix to be coded are determined to have the same values or if the coefficient values of a quantization matrix to be coded are determined to be identical with the coefficient values of a default matrix, the coder codes a value of scaling_list_pred_mode_flag as 0. Here, to determine the values so that they have the same values can mean that a quantization matrix prediction method of copying the coefficient values of a specific quantization matrix to the coefficient values of a quantization matrix to be coded is used.

If a value of scaling_list_pred_mode_flag is 0, the coder can code the reference quantization matrix ID of a quantization matrix to be coded and information about whether or not to use a default matrix into a parameter set. Here, the parameter set on which coding is performed can be an adaptation parameter set.

As in the example of Table 31, if a value of scaling_list_pred_mode_flag is 0, the coder can code scaling_list_pred_matrix_id_delta, that is, the reference quantization matrix ID of a quantization matrix to be coded into the parameter set.

Here, the coder and the decoder can determine a value of scaling_list_pred_matrix_id_delta, that is, a quantization matrix ID, by using matrixID indicating the quantization matrix to be coded, RefMatrixID indicating the reference quantization matrix or the default matrix, and Equation 8.

$$\text{scaling\_list\_pred\_matrix\_id\_delta} = \text{matrixID} - \text{RefMatrixID} \qquad \text{<Equation 8>}$$

if the coefficient values of a quantization matrix to be coded are determined to be identical with the coefficient values of a default matrix defined in the coder and/or the decoder, the coder can code a value of scaling_list_pred_matrix_id_delta as 0 so that a value of RefMatrixID is identical with a value of matrixID. Here, the default matrix means a default matrix corresponding to sizeID and matrixID.

If a value of scaling_list_pred_matrix_id_delta is 0, the coder can code a value of scaling_list_pred_matrix_id_delta as a value not 0 so that a value of RefMatrixID is not identical with a value of matrixID.

If a method of predicting and coding a quantization matrix is a method of coding a quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of the quantization matrix to be coded into a parameter set. Here, the parameter set into which the difference value is coded can be an adaptation parameter set.

As in the example of Table 32, the coder can code scaling_list_delta_coef, that is, the difference value between the coefficient value of the quantization matrix that has been previously coded within the quantization matrix and the coefficient value of the quantization matrix to be coded, into the parameter set.

As in the example of Table 32, the coder can code scaling_list_dc_coef_res, that is, a difference value between the coefficient values of quantization matrices corresponding to a DC matrix coefficient, into the parameter set. Here, scaling_list_dc_coef_res can be coded into (useDefaultScalingMatrixFlag=0) if the size of a quantization matrix to be coded is 16×16 (sizeID=2) or 32×32 (sizeID=3) and a default matrix is not used.

A value of scaling_list_dc_coef_res for a 16×16-size quantization matrix or a 32×32-size quantization matrix for separately coding a DC matrix coefficient can be calculated by using a difference between a value of the DC matrix coefficient and a matrix coefficient present at a DC location.

Meanwhile, in conventional quantization matrix coding/decoding methods, a quantization matrix is copied by using the size of a quantization matrix when quantization and dequantization are performed not the size of a quantization matrix when coding/decoding are performed. Accordingly, a quantization matrix is copied from a limited number of quantization matrices. As a result, the improvement of coding efficiency is limited when the quantization matrix is coded/decoded.

In the present invention, however, coding efficiency can be improved and the degree of freedom in predicting a quantization matrix can be increased because a quantization matrix is predicted from a quantization matrix having the same size as a quantization matrix when coding/decoding are performed.

Tables 33 and 34 schematically show examples of syntax structures that can be used when a quantization matrix is predicted from a quantization matrix having the same size as a quantization matrix when coding/decoding are performed.

TABLE 33

| | Descriptor |
|---|---|
| scaling_list_param( ) { | |
|     scaling_list_present_flag | u(1) |
|     if( scaling_list_present_flag ) | |
|         for( sizeID = 0; sizeID < 4; sizeID++ ) | |
|             for( matrixID = 0; matrixID < | |
|             (sizeID = = 3) ? 2 : 6; matrixID++ ) { | |
|                 scaling_list_pred_mode_flag | u(1) |
|                 if( !scaling_list_pred_mode_flag ) { | |
|                     scaling_list_pred_size_matrix_id_delta | ue(v) |
|                 } | |
|                 else | |
|                   scaling_list( ScalingList[ sizeID ] | |
|                   [ matrixID ], sizeID , matrixID ) | |
|             } | |
| } | |

TABLE 34

| | Descriptor |
|---|---|
| scaling_list_param( ) { | |
|     scaling_list_present_flag | u(1) |
|     if( scaling_list_present_flag ) | |
|         for( sizeID = 0; sizeID < 4; sizeID++ ) | |
|             for( matrixID = 0; matrixID < | |
|             (sizeID = = 3) ? 2 : 6; matrixID++ ) { | |
|                 scaling_list_pred_mode_flag | u(1) |
|                 if( !scaling_list_pred_mode_flag ) { | |
|                   scaling_list_pred_size_id_delta | ue(v) |
|                   scaling_list_pred_matrix_id_delta | se(v) |
|                 } | |
|                 else | |
|                   scaling_list( ScalingList[ sizeID ] | |
|                   [ matrixID ], sizeID , matrixID ) | |
|             } | |
| } | |

First, the coder can code information indicative of whether a quantization matrix is present or not into a parameter set.

As in the example of Table 33 or 34, the coder can code scaling_list_present_flag, that is, information indicating whether a quantization matrix is present or not within a bit stream, into the parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of prediction coding method for the quantization matrix, the coder can code information about the method of predicting and coding a quantization matrix into the parameter set. Here, the parameter set into which the information about the method of predicting and coding a quantization matrix is coded can be an adaptation parameter set. For example, as in the example of Table 33 or Table 34, the coder can code scaling_list_pred_mode_flag, that is, the information about the method of predicting and coding a quantization matrix, into the parameter set. For a detailed example, if a quantization matrix is coded in accordance with the DPCM and exponential Golomb coding methods by scanning the quantization matrix in order to predict and code a coefficient within the quantization matrix, the coder can code a value of scaling_list_pred_mode_flag as 1. If a reference quantization matrix and a quantization matrix to be coded are determined to have the same values, the coder can code a value of scaling_list_pred_mode_flag as 0. Here, to determine the values so that they have the same values can mean that a quantization matrix prediction method of copying the coefficient values of the reference quantization matrix to the coefficient values of the quantization matrix to be coded is used.

Furthermore, if a value of scaling_list_pred_mode_flag is 0, the coder can code the reference quantization matrix ID of a quantization matrix to be coded into the parameter set. Here, at least one of information, specifying the size of the reference quantization matrix of the quantization matrix to be coded, and information, specifying the reference quantization matrix, may be coded into the parameter set as ID information (identifier) about the reference quantization matrix. The coded parameter set can be an adaptation parameter set.

For example, as in the example of Table 33, if the coefficient values of a quantization matrix to be coded are determined to be identical with the coefficient values of a reference quantization matrix, the coder can code scaling_list_pred_size_matrix_id_delta, that is, ID information about the reference quantization matrix of the quantization matrix to be coded, into the parameter set. Here, a value of scaling_list_pred_size_matrix_id_delta, that is. ID information about a quantization matrix, can be determined by using RefSizeID, that is, the size of the reference quantization matrix of the quantization matrix to be coded, RefMatrixID indicative of the reference quantization matrix, and Equation 9.

scaling_list_pred_size_matrix_id_delta=6*(RefSizeID-sizeID)+(RefMatrixID % 6)     <Equation 9>

For another example, as in the example of Table 34, if the coefficient values of a quantization matrix to be coded are determined to be identical with the coefficient values of a reference quantization matrix, the coder can code scaling_list_pred_size_id_delta and scaling_list_pred_size_matrix_id_delta, that is, ID information about the reference quantization matrix of the quantization matrix to be coded, into a parameter set. Here, a value of scaling_list_pred_size_id_delta can be determined by using RefSizeID and Equation 10, and a value of scaling_list_pred_matrix_id_delta can be determined by using RefMatrixID indicative of the reference quantization matrix of the quantization matrix to be coded and Equation 11.

scaling_list_pred_size_id_delta=sizeID−RefSizeID     <Equation 10> scaling_list_pred_matrix_id_delta=matrixID−RefMatrixID     <Equation 11>

To determine the coefficient values of a quantization matrix to be coded to be identical with the coefficient values of a reference quantization matrix can mean that copying the coefficient values of the reference quantization matrix to the coefficient values of the quantization matrix to be coded is used.

Accordingly, only the prediction of a quantization matrix from a quantization matrix having the same sizeID is not permitted, but a quantization matrix can be predicted from a quantization matrix having the same matrix size, but a different sizeID when coding/decoding are performed through the example of Table 33 or Table 34.

Furthermore, in the example of Table 33 or Table 34, a range of the values of the syntax elements may be limited to a specific value. For example, in the example of Table 33 or Table 34, scaling_list_pred_size_matrix_id_delta can be limited to a value ranging from 0 to 17, scaling_list_pred_ size_id_delta can be limited to a value ranging from 0 to 2, and scaling_list_pred_matrix_id_delta can be limited to a value ranging from 0 to 5.

Furthermore, in the example of Table 33 or Table 34, the coder may not predict a quantization matrix from a quantization matrix having a greater size than a quantization matrix to be coded.

Moreover, the coder may classify a quantization matrix into a DC matrix coefficient and an AC matrix coefficient according to the size of each quantization matrix and predict the quantization matrix for the DC matrix coefficient and the AC matrix coefficient. For example, a quantization matrix having an 8×8 size can be classified into a DC matrix coefficient and an AC matrix coefficient and then predicted, and both a DC matrix coefficient and an AC matrix coefficient can be predicted in relation to quantization matrices having the remaining sizes. In other words, when performing prediction from a quantization matrix having an 8×8 size, the coder can predict a value at a corresponding location by determining a value, corresponding to the location a DC matrix coefficient within the 8×8-size quantization matrix, as the DC matrix coefficient of a quantization matrix to be coded. If prediction is performed from a quantization matrix having a 16×16 or 32×32 size, the coder can also predict the DC matrix coefficient of the quantization matrix.

Meanwhile, if a method of predicting and coding a quantization matrix is a method of coding a quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into a parameter set Here, the parameter set can be an adaptation parameter set.

Table 35 shows an example of a syntax structure that can be used when a coefficient within a quantization matrix is predicted by using the coefficient value of a quantization matrix that has been previously coded within the quantization matrix.

TABLE 35

|  | Descriptor |
|---|---|
| scaling_list( scalingList, sizeID , matrixID ) { | |
|   nextCoef = 8 | u(1) |
|   coefNum = Min( 64, ( 1 << ( 4 + ( sizeID << 1 ) ) ) ) | |
|   UseDefaultScalingMatrix = 0 | |
|   if( sizeID > 1 ) { | |
|     scaling_list_dc_coef_minus8[ sizeID − 2 ][ matrixID ] | se(v) |
|     if( scaling_list_dc_coef_minus8[ sizeID − 2 ] | |
|     [ matrixID ] = = −8 ) | |
|       UseDefaultScalingMatrixFlag = 1 | |
|   } | |
|   if( UseDefaultScalingMatrixFlag = = 0 ) { | |
|     stopNow = 0 | |
|     for( i=0; i < coefNum && !stopNow; i++) { | |
|       scaling_list_delta_coef | se(v) |
|       nextCoef = ( nextCoef + scaling_list_delta_coef + 256 ) % 256 | |
|       if( sizeID < 2 ) { | |
|         useDefaultScalingMatrixFlag = (i = = 0 && nextCoef = = 0 ) | |
|         if( useDefaultScalingMatrixFlag ) | |
|           stopNow = 1 | |
|       } | |

TABLE 35-continued

|  | Descriptor |
|---|---|
|       if( !stopNow ) | |
|         scalingList[ i ] = nextCoef | |
|     } | |
|   } | |
| } | |

As in the example of Table 35, if the size of a quantization matrix to be coded is 16×16 (sizeID=2) or 32×32 (sizeID=3), the coder can code scaling_list_dc_coef_minus8, that is, information about a DC matrix coefficient, into the parameter set.

As in the example of Table 35, the coder can code scaling_list_delta_coef, that is, a difference value between the coefficient value of a quantization matrix that has been previously coded within the quantization matrix and the coefficient value of the quantization matrix to be coded, into the parameter set.

Furthermore, the coder can code information about whether or not to use a default matrix by using scaling_list_delta_coef that is used to derive a value of scaling_list_dc_coef_minus8 or nextCoef. For example, the coder can code a value of scaling_list_dc_coef_minus8 as −8 in order to instruct the decoder to use a default matrix and can code scaling_list_delta_coef so that the first nextCoef value is 0 in order to instruct the decoder to use a default matrix.

In other words, a method of coding/decoding a quantization matrix for determining whether or not to use a default matrix by using the coefficient value of a quantization matrix has is a disadvantage in that it increases the degree of complexity in a process of coding/decoding the coefficient value of the quantization matrix. Furthermore, there is a disadvantage in that coding efficiency is deteriorated because unnecessary information is coded/decoded when a quantization matrix is predicted. Furthermore, a quantization matrix is copied by using the size of a quantization matrix when quantization and dequantization are performed not the size of a quantization matrix when coding/decoding are performed. Since a quantization matrix is copied from a limited number of quantization matrices, the improvement of coding efficiency is limited when coding/decoding a quantization matrix.

In the present invention, in image coding/decoding, whether or not to use a default matrix can be determined by using the ID of a reference quantization matrix. Accordingly, the degree of complexity of calculation when coding/decoding a quantization matrix can be reduced. Furthermore, coding efficiency can be improved and the degree of freedom in predicting a quantization matrix can be increased because a quantization matrix is predicted from a quantization matrix having the same size as a quantization matrix when coding/decoding the quantization matrix.

Tables 36 and 37 schematically show examples of syntax structures that can be used when predicting a quantization matrix by using the ID of a reference quantization matrix and using a quantization matrix having the same size when coding/decoding the quantization matrix.

TABLE 36

| | Descriptor |
|---|---|
| scaling_list_param( ) {<br>    scaling_list_present_flag<br>    if( scaling_list_present_flag )<br>        for( sizeID = 0; sizeID < 4; sizeID++ )<br>            for( matrixID = 0; matrixID <<br>            (sizeID = = 3 ) ? 2 : 6; matrixID++ ) {<br>                scaling_list_pred_mode_flag<br>                if( !scaling_list_pred_mode_flag ) {<br>                    scaling_list_pred_size_matrix_id_delta<br>                }<br>                else<br>                    scaling_list( ScalingList[ sizeID ]<br>                    [ matrixID ], sizeID , matrixID )<br>            }<br>} | <br>u(1)<br><br><br><br><br>u(1)<br><br>ue(v) |

TABLE 37

| | Descriptor |
|---|---|
| scaling_list_param( ) {<br>    scaling_list_present_flag<br>    if( scaling_list_present_flag )<br>        for( sizeID = 0; sizeID < 4; sizeID++ )<br>            for( matrixID = 0; matrixID <<br>            (sizeID = = 3) ? 2 : 6; matrixID++ ) {<br>                scaling_list_pred_mode_flag<br>                if( !scaling_list_pred_mode_flag ) {<br>                  scaling_list_pred_size_id_delta<br>                  scaling_list_pred_matrix_id_delta<br>                }<br>                else<br>    scaling_list( ScalingList[ sizeID ]<br>    [ matrixID ], sizeID , matrixID )<br>        }<br>} | <br>u(1)<br><br><br><br><br>u(1)<br><br>ue(v)<br>se(v) |

First, the coder can code information indicative of whether a quantization matrix is present or not into a parameter set.

As in the example of Table 36 or 37, the coder can code scaling_list_present_flag, that is, information about whether the quantization matrix is present or not within a bit stream, into the parameter set. For example, if the quantization matrix is not present and all quantization matrices are determined as default quantization matrices, the coder codes a value of scaling_list_present_flag as 0. If a coded quantization matrix is present, the coder codes a value of scaling_list_present_flag as 1.

After determining the type of prediction coding method for the quantization matrix, the coder can code information about the method of predicting and coding a quantization matrix into the parameter set. Here, the parameter set into which the information about the method of predicting and coding a quantization matrix is coded can be an adaptation parameter set.

As in the example of Table 36 or Table 37, the coder can code scaling_list_pred_mode_flag, that is, information specifying the method of predicting and coding a quantization matrix, into the parameter set. For example, if a quantization matrix is coded in accordance with the DPCM and exponential Golomb coding methods by scanning the quantization matrix in order to predict and code a coefficient within the quantization matrix, the coder can code a value of scaling_list_pred_mode_flag as 1. Furthermore, if a reference quantization matrix and a quantization matrix to be coded are determined to have the same values or if the coefficient values of a quantization matrix to be coded are determined to be identical with the coefficient values of a default matrix, the coder can code a value of scaling_list_pred_mode_flag as 0. Here, to determine the values so that they have the same values can mean that a quantization matrix prediction method of copying the coefficient values of a specific quantization matrix to the coefficient values of a quantization matrix to be coded is used.

If a value of scaling_list_pred_mode_flag is 0, the coder can code the reference quantization matrix ID of a quantization matrix to be coded into the parameter set. Here, at least one of information, specifying the size of the reference quantization matrix of the quantization matrix to be coded, and information, specifying the reference quantization matrix, may be coded into the parameter set as ID information about the reference quantization matrix. The coded parameter set can be an adaptation parameter set. Furthermore, the parameter set into which the ID or the ID information is coded can be an adaptation parameter set.

For example, as in the example of Table 36, if a value of scaling_list_pred_mode_flag is 0, the coder can code scaling_list_pred_size_matrix_id_delta, that is, ID information about the reference quantization matrix of the quantization matrix to be coded, into the parameter set. Here, the coder can determine scaling_list_pred_size_matrix_id_delta, that is, ID information about the quantization matrix, by using RefSizeID and RefMatrixID indicating the reference quantization matrix or the default matrix and Equation 12.

scaling_list_pred_size_matrix_id_delta=6*(RefSizeID-sizeID)+(RefMatrixID % 6)     <Equation 12>

For another example, as in Table 37, if the coefficient values of a quantization matrix to be coded are determined to be identical with the coefficient values of a reference quantization matrix or if the coefficient values of a quantization matrix to be coded are determined to be identical with the coefficient values of a default matrix, the coder can code scaling_list_pred_size_id_delta and scaling_list_pred_size_matrix_id_delta, that is, ID information about the reference quantization matrix of the quantization matrix to be coded, into the parameter set. Here, the coder can derive a value of scaling_list_pred_size_id_delta by using RefSizeID and Equation 13 and can derive a value of scaling_list_pred_matrix_id_delta by using RefMatrixID indicative of the reference quantization matrix of the quantization matrix to be coded or the default matrix and Equation 14.

scaling_list_pred_size_id_delta=sizeID−RefSizeID    <Equation 13> scaling_list_pred_matrix_id_delta=matrixID−RefMatrixID    <Equation 14>

If the coefficient values of a quantization matrix to be coded are determined to be identical with the coefficient values of a default matrix defined in the coder and/or the decoder, the coder can code a value of scaling_list_pred_matrix_id_delta as 0 so that a value of RefMatrixID and a value of matrixID are identical with each other. Here, the default matrix means a default matrix corresponding to sizeID and matrixID.

If the coefficient values of a quantization matrix to be coded are determined to be identical with the coefficient values of a reference quantization matrix, the coder can code a value of scaling_list_pred_matrix_id_delta as a value not 0 so that a value of RefMatrixID and a value of matrixID are not identical with each other.

Accordingly, by way of the example of Table 36 or Table 37, a quantization matrix can be predicted from a quantization matrix having the same sizeID, and a quantization matrix can be predicted from a quantization matrix having the same size, but a different sizeID when coding/decoding are performed can be predicted.

Furthermore, in the example of Table 36 or Table 37, a range of the values of scaling_list_pred_size_matrix_id_delta and an caling_list_pred_size_id_delta, scaling_list_pred_matrix_id_delta may be limited. For example, scaling_list_pred_size_matrix_id_delta may be limited to a value ranging from 0 to 17, scaling_list_pred_size_id_delta may be limited to a value ranging from 0 to 2, and scaling_list_pred_matrix_id_delta may be limited to a value ranging from 0 to 5.

Moreover, the prediction of a quantization matrix may not be performed from a quantization matrix having a greater size than a quantization matrix to be coded.

In predicting a quantization matrix, a method of predicting a quantization matrix may be differently performed by taking the size of the matrix into consideration. For example, when preforming prediction from a quantization matrix having an 8×8 size, the coder can predict a value at a corresponding location by determining a value, corresponding to the location of a DC matrix coefficient within the 8×8-size quantization matrix, as the DC matrix coefficient. If prediction is performed from a quantization matrix having a 16×16 or 32×32 size, the coder can also predict a DC matrix coefficient.

Meanwhile, if a method of predicting and coding a quantization matrix is a method of coding the quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into a parameter set. Here, the parameter set into which the difference value is coded can be an adaptation parameter set.

Table 38 shows an example of a syntax structure that can be used when predicting a coefficient within a quantization matrix by using the coefficient value of a quantization matrix that has been previously coded within the quantization matrix.

TABLE 38

| | Descriptor |
|---|---|
| scaling_list( scalingList, sizeID , matrixID ) { | |
|   nextCoef = 8 | u(l) |
|   coefNum = Min( 64, ( 1 << ( 4 + ( sizeID << 1) ) ) ) | |
|   if( sizeID > 1 ) | |
|     scaling_list_dc_coef_minus8[ sizeID − 2 ][ matrixID ] | se(v) |
|   for( i=0; i < coefNum; i++) { | |
|     scaling_list_delta_coef | se(v) |
|     nextCoef = ( nextCoef + scaling_list_delta_coef + 256 ) % 256 | |
|     scalingList[ i ] = nextCoef | |
|   } | |
| } | |

As in the example of Table 38, if the size of a quantization matrix to be coded is 16×16 (sizeID=2) or 32×32 (sizeID=3), the coder can code scaling_list_dc_coef_minus8, that is, information specifying a DC matrix coefficient, into the parameter set.

As in the example of Table 38, the coder can code scaling_list_delta_coef, that is, a difference value between the coefficient value of a quantization matrix that has been previously coded within the quantization matrix and the coefficient value of a quantization matrix to be coded, into the parameter set.

In conventional quantization matrix coding/decoding methods, the coefficient value of a quantization matrix is coded by not taking a coefficient value, frequently occurring when coding/decoding a first coefficient within the quantization matrix, into consideration. Accordingly, in the conventional quantization matrix coding/decoding methods, the improvement of coding efficiency is limited.

In the present invention, a first coefficient within a quantization matrix can be predicted and coded/decoded by using a coefficient value that frequently occurs. Furthermore, in the present invention, if the first coefficient value or DC matrix coefficient value of a default matrix is defined to be 16 or the first coefficient value or DC matrix coefficient value of a non-default matrix is distributed around 16, a first coefficient value or a DC matrix coefficient value within a quantization matrix to be coded/decoded can be predicted from the constant 16 and then coded/decoded. In this case, the present invention can improve coding efficiency.

Tables 39 and 40 schematically show examples of syntax structures that can be used when a first coefficient within a quantization matrix is taken into consideration.

TABLE 39

| | Descriptor |
|---|---|
| scaling_list_param( ) { | |
|   scaling_list_present_flag | u(l) |
|   if( scaling_list_present_flag ) | |
|     for( sizeID = 0; sizeID < 4; sizeID++ ) | |
|       for( matrixID = 0; matrixID < (sizeID = = 3) ? 2 : 6; matrixID++ ) { | |
|         scaling_list_pred_mode_flag | u(l) |
|         if( !scaling_list_pred_mode_flag ) | |
|           scaling_list_pred_matrix_id_delta | ue(v) |
|         else | |
|           scaling_list( ScalingList[ sizeID ] [ matrixID ], sizeID , matrixID ) | |
|       } | |
| } | |

TABLE 40

| | Descriptor |
|---|---|
| scaling_list( scalingList, sizeID , matrixID ) { | |
|   nextCoef = 16 | u(l) |
|   coefNum = Min( 64, ( 1 << ( 4 + ( sizeID << 1) ) ) ) | |
|   UseDefaultScalingMatrix = 0 | |
|   if( sizeID > 1 ) { | |
|     scaling_list_dc_coef_minus16[ sizeID − 2 ][ matrixID ] | |
|     if( scaling_list_dc_coef_minus16[ sizeID − 2 ] [ matrixID ] = = −16 ) | |
|       UseDefaultScalingMatrixFlag = 1 | |
|   } | |
|   if( UseDefaultScalingMatrixFlag = = 0 ) { | |
|     stopNow = 0 | |
|     for( i=0; i < coefNum && !stopNow; i++) { | |
|       scaling_list_delta_coef | se(v) |
|       nextCoef = ( nextCoef + scaling_list_delta_coef + 256 ) % 256 | |
|       if( sizeID < 2 ) { | |
|         useDefaultScalingMatrixFlag = (i = = 0 && nextCoef = = 0 ) | |
|         if( useDefaultScalingMatrixFlag ) | |
|           stopNow = 1 | |
|       } | |

TABLE 40-continued

| Descriptor |
|---|
|      if( !stopNow ) |
|        scalingList[ i ] = nextCoef |
|    } |
|  } |
| } |

First, the coder can code information indicative of whether a quantization matrix is present or not into a parameter set.

As in the example of Table 39, the coder can code scaling_list_present_flag, that is, information indicating whether a quantization matrix is present or not within a bit stream, into the parameter set. For example, if the quantization matrix is not present and all quantization matrices are determined as default quantization matrices, the coder can code a value of scaling_list_present_flag as 0. If a coded quantization matrix is present, the coder can code a value of scaling_list_present_flag as 1.

After determining the type of prediction coding method for the quantization matrix, the coder can code information about the method of predicting and coding a quantization matrix into the parameter set. Here, the parameter set into which the information about the method of predicting and coding a quantization matrix is coded can be an adaptation parameter set.

As in the example of Table 39, the coder can code scaling_list_pred_mode_flag, that is, the information information about the method of predicting and coding a quantization matrix, into the parameter set. For example, if a quantization matrix is coded in accordance with the DPCM and exponential Golomb coding methods by scanning the quantization matrix in order to predict and code a coefficient within the quantization matrix, the coder can code a value of scaling_list_pred_mode_flag as 1. Furthermore, if a reference quantization matrix and a quantization matrix to be coded are determined to have the same values, the coder can code a value of scaling_list_pred_mode_flag as 0. Here, to determine the values so that they have the same values can mean that a quantization matrix prediction method of copying the coefficient values of the reference quantization matrix to the coefficient values of the quantization matrix to be coded is used.

If a value of scaling_list_pred_mode_flag is 0, the coder can code the reference quantization matrix ID of a quantization matrix to be coded into the parameter set. Here, the parameter set into which the reference quantization matrix ID is coded can be an adaptation parameter set.

As in the example of Table 39, if a value of scaling_list_pred_mode_flag is 0, the coder can code scaling_list_pred_matrix_id_delta, that is, the reference quantization matrix ID of a quantization matrix to be coded, into the parameter set. Here, the coder can determine scaling_list_pred_matrix_id_delta, that is, the quantization matrix ID, by using matrixID indicating the quantization matrix to be coded, RefMatrixID indicating the reference quantization matrix, and Equation 15.

scaling_list_pred_matrix_id_delta=matrixID−(RefMatrixID+1)  <Equation 15>

To determine the coefficient values of a quantization matrix to be coded so that they have the same values as the coefficient values of a reference quantization matrix can mean that copying the coefficient values of the reference quantization matrix to the coefficient values of the quantization matrix to be coded is used.

If a method of predicting and coding a quantization matrix is a method of coding the quantization matrix in accordance with the DPCM and exponential Golomb coding methods through scanning in order to predict and code a coefficient within the quantization matrix, the coder can code a difference value between the coefficient value of a quantization matrix that has been previously coded within the quantization matrix and the coefficient value of a quantization matrix to be coded into the parameter set. Here, the parameter set into which the difference value is coded can be an adaptation parameter set.

As in the example of Table 40, if the size of the quantization matrix to be coded is 16×16 (sizeID=2) or 32×32 (sizeID=3), the coder can code scaling_list_dc_coef_minus16, that is, the coefficient value of a quantization matrix corresponding to a DC matrix coefficient, into the parameter set. Here, a value of scaling_list_dc_coef_minus16 indicates a DC matrix coefficient calculated assuming that a prediction value is 16.

As in the example of Table 40, the coder can code scaling_list_delta_coef, that is, a difference value between the coefficient value of a quantization matrix that has been previously coded within the quantization matrix and the coefficient value of a quantization matrix to be coded, into the parameter set. As in the example of Table 40, the coder can set 'nextCoef=16', that is, sets a prediction value for the first coefficient value as 16.

Furthermore, the coder can determine whether or not to use a default matrix by using scaling_list_delta_coef that is used to calculated scaling_list_dc_coef_minus16 or nextCoef. That is, the coder can code a value of scaling_list_dc_coef_minus16 as −16 in order to instructe the decoder to use a default matrix and can code scaling_list_delta_coef so that a value of the first nextCoef becomes 0 in order to instruct the decoder to use a default matrix.

In the embodiments of the above tables and the following tables as well as the examples of Tables 39 and 40, the coder can set nextCoef to 16, and a value of scaling_list_dc_coef_minus16 can mean a DC matrix coefficient calculated assuming that a prediction value is 16. Furthermore, in the embodiments of the above tables and the following tables, the coder can code a value of scaling_list_dc_coef_minus16 as −16 in order to instruct the decoder to use a default matrix.

The examples regarding the operations of the coder for coding information about a quantization matrix and signaling the coded information have been described so far. Hereinafter, examples in which the decoder decodes information about a quantization matrix and obtains a quantization matrix are described by using the examples of the aforementioned tables.

Figure 5:
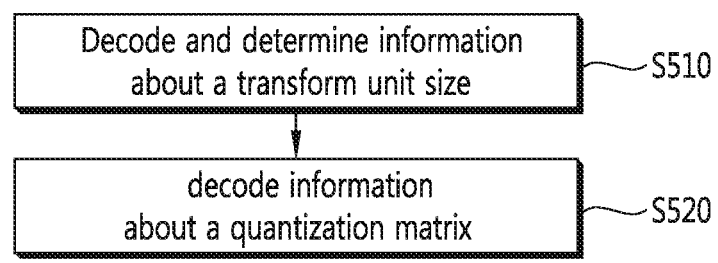
FIG. 5 is a flowchart schematically illustrating an example of an operation of a decoder for decoding information about a quantization matrix and performing decoding by using the decoded information.

FIG. 5 is a flowchart schematically illustrating an example of an operation of the decoder for decoding information about a quantization matrix and performing decoding by using the decoded information.

Referring to FIG. 5, the decoder decodes information about the size of a transform unit and determines the size of the transform unit based on the decoded information at step S510.

The decoder performs entropy decoding on information about the size of a transform unit from a received bit stream. The decoder can decode information about the size of the transform unit from a parameter set within the bit stream.

For example, the decoder can decode information about a minimum size and a maximum size of the transform unit from the bit stream.

As in the example of Table 1, the decoder can decode a minimum size in the horizontal or vertical direction of a square transform unit to which a Log 2 function has been applied by using the syntax element 'log 2_min_transform_block_size_minus2' within the bit stream. Furthermore, the decoder may decode a difference value between a maximum size in the horizontal or vertical direction of a square transform unit to which a Log 2 function has been applied and a minimum size in the horizontal or vertical direction of the square transform unit by using the syntax element 'log 2_diff_max_min_transform_block_size' within the bit stream.

The decoder can determine a minimum size and a maximum size of of the decoded transform unit Here, the maximum size of the transform unit may be determined by the decoded difference value between a maximum size and a minimum value and the decoded minimum size.

For example, the decoder can calculate Log 2MinTrafoSize by adding 2 to decoded log 2_min_transform_block_size_minus2 and determine a value, calculated using 1<<Log 2MinTrafoSize, as a minimum size in the horizontal or vertical direction of the square transform unit. The decoder can calculate Log 2MaxTrafoSize based on a value of decoded log 2_diff_max_min_transform_block_size and a value obtained by adding 2 to decoded log 2_min_transform_block_size_minus2 and determine a value, calculated using 1<<Log 2MaxTrafoSize, as a maximum size in the horizontal or vertical direction of the square transform unit.

Here, the minimum size of the transform unit can mean a value calculated using Log 2MinTrafoSize or 1<<Log 2MinTrafoSize, and the maximum size of the transform unit can mean a value calculated using Log 2MaxTrafoSize or 1<<Log 2MaxTrafoSize.

The decoder decodes information about a quantization matrix at step S520. The decoder can decode information about the quantization matrix, including one or more of (1) information about whether the quantization matrix has been used or not, (2) information about whether the quantization matrix is present or not, (3) information about whether the quantization matrix has been decoded or not and whether a default matrix has been used or not, (4) information about the type of method of predicting and decoding the quantization matrix, (5) information about a reference quantization matrix ID, and (6) information about a difference value between the coefficient value of a quantization matrix that has been previously decoded within the quantization matrix and the coefficient value of a quantization matrix to be decoded. Here, the information about the quantization matrix can be dependent on the size of a transform unit.

First, the decoder can determine whether a quantization matrix has been used or not by decoding information about whether the quantization matrix has been used or not from the parameter set. As in the example of Table 2, the decoder can decode scaling_list_enabled_flag, that is, information about whether a quantization matrix has been used or not, from a sequence parameter set. Here, when a value of scaling_list_enabled_flag is 1, the decoder can use the quantization matrix in the dequantization/scaling of a transform coefficient for the entire sequence. When a value of scaling_list_enabled_flag is 0, the decoder may not use the quantization matrix in the dequantization/scaling of the transform coefficient.

The decoder can determine whether a quantization matrix is present or not by decoding information about whether a quantization matrix is present or not from the parameter set. As in the example of Table 3, the decoder can decode aps_scaling_list_data_present_flag, that is, information about whether a quantization matrix is present or not, from an adaptation parameter set. For example, when a value of aps_scaling_list_data_present_flag is 1, it means that a quantization matrix is present in the adaptation parameter set. When a value of aps_scaling_list_data_present_flag is 0, it means that a quantization matrix is not present in the adaptation parameter set. If scaling_list_enabled_flag is 1 and aps_scaling_list_data_present_flag is 0, it can mean that a default matrix is used when dequantization is performed. Furthermore, the examples in which information about whether a quantization matrix is present or not is decoded from an adaptation parameter set have been illustrated, but the present invention is not limited thereto. The decoder may decode information about whether a quantization matrix is present or not from another parameter set.

The decoder can determine whether a quantization matrix has been decoded or not and whether a default matrix has been used or not by decoding information about whether the quantization matrix has been decoded or not and whether the default matrix has been used or not from the parameter set. As in the example of Table 4, the decoder can decode use_default_scaling_list_flag, that is, information about whether a quantization matrix has been decoded or not and whether a default matrix has been used or not, from an adaptation parameter set. For example, when a value of use_default_scaling_list_flag is 1, the quantization matrix is not decoded and the coefficient values of all quantization matrix can be determined to be the same as the coefficient values of a default quantization matrix defined in the coder and/or the decoder. When a value of use_default_scaling_list_flag is 0, the quantization matrix is decoded and a default matrix defined in the coder and/or the decoder may not be used.

The decoder can determine one or more of whether or not to decode a quantization matrix, whether or not to use a default matrix, and whether or not to perform prediction decoding by using SizeID and MatrixID.

As in the examples of Tables 5 and 6, a value of SizeID can specify a quantization matrix according to the size of a transform unit or the size of a quantization matrix by using the tables, and a value of MatrixID can specify coding mode in which a quantization matrix is used and the type of quantization matrix corresponding to a color component.

Meanwhile, a default quantization matrix can be indicated using Tables 7 and 8.

If a minimum size and a maximum size of a transform unit that are available are not taken into consideration, a quantization matrix for a transform unit having all sizes must be decoded. In this case, coding efficiency is deteriorated, and the degree of complexity of calculation is increased.

In accordance with the present invention, information about a quantization matrix can be decoded by taking the size of a transform unit into consideration.

In the example of Table 9, SizeID corresponding to the size of each transform unit is restricted based on a minimum size and a maximum size of a transform unit, from among pieces of information about the transform unit, and one or more of the decoding of a quantization matrix, the decoding of information about whether a default matrix has been used or not, and the decoding of information about the type of prediction and decoding method are performed based on the restricted SizeID.

As in the example of Table 9, SizeID can be restricted based on a minimum size and a maximum size of a transform unit, from among pieces of information about the transform unit, and one or more of information about whether a quantization matrix or a default matrix has been used or not and information about the type of prediction decoding method can be decoded in relation to only transform units having a specific size.

For example, if a value of Log 2MinTrafoSize that specifies a minimum size of a transform unit is 3 and a value of Log 2MaxTrafoSize that specifies a maximum size of a transform unit is 4, the decoder can perform one or more of the decoding of a quantization matrix corresponding to transform units from an 8×8 size to a 16×16 size, the decoding of information about whether a default matrix has been used or not, and the decoding of information about the type of prediction decoding method.

In the example of Table 9, use_default_scaling_list_flag may not be decoded.

Furthermore, unlike in the example, the decoder may restrict SizeID based on a difference value between a maximum size and a minimum value of a transform unit and perform one or more of the decoding of a quantization matrix, the decoding of information about whether a default matrix has been used or not, and the decoding of information about the type of prediction decoding method based on the restrict SizeID.

As in the example of Table 10, the decoder can restrict SizeID based on a difference value between a maximum size and a minimum value of a transform unit and perform one or more of the decoding of a quantization matrix, the decoding of information about whether a default matrix has been used or not, and the decoding of information about the type of prediction decoding method on only transform units having a specific size (i.e., only specific sizes of a transform unit).

For example, if a value of Log 2MinTrafoSize that specifies a minimum size of a transform unit is 3 and a value of Log 2MaxTrafoSize that specifies a maximum size of a transform unit is 4, the decoder can perform one or more of the decoding of a quantization matrix corresponding to transform units from an 8×8 size to a 16×16 size, the decoding of information about whether a default matrix has been used or not, and the decoding of information about the type of prediction decoding method.

Here, a difference value between Log 2MaxTrafoSize and Log 2MinTrafoSize is a difference value between a maximum size and a minimum value of a transform unit and can be specified by log 2_diff_max_min_transform_block_size. Furthermore, Log 2MinTrafoSize-2 is the same as log 2_min_transform_block_size_minus2.

In the example of Table 10, use_default_scaling_list_flag may not be decoded.

Meanwhile, if a default matrix and a non-default matrix are not mixed and used according to the size of each transform block or the type of quantization matrix within a sequence, a picture, or a slice, the degree of freedom is lowered when the coder selects a quantization matrix. For example, in order to use a default matrix for a specific transform size within a slice and to use a non-default matrix for another specific transform size within the slice, coding efficiency can be deteriorated because the default matrix must be coded and transmitted.

In the present invention, a default matrix and a non-default matrix can be mixed and used according to the size of each transform block or the type of quantization matrix within a sequence, a picture, or a slice.

For example, the decoder can decode information about whether a quantization matrix has been decoded or not and whether a default matrix has been used or not from the parameter set based on SizeID. As in the example of Table 11, the decoder can decode sid_use_default_scaling_list_flag[SizeID][MatrixID], that is, information specifying whether a quantization matrix has been decoded or not and whether a default matrix has been used or not, from an adaptation parameter set based on SizeID. For example, when a value of sid_use_default_scaling_list_flag[SizeID][MatrixID] is 1, the decoder does not decode a quantization matrix corresponding to SizeID, and the coefficient values of a quantization matrix corresponding to SizeID can be determined to be identical with the coefficient values of a default matrix defined in the coder and/or the decoder. When a value of sid_use_default_scaling_list_flag[SizeID][MatrixID] is 0, the decoder decodes a quantization matrix corresponding to SizeID, but does not use a default matrix, defined in the coder and/or the decoder, as a quantization matrix corresponding to SizeID.

Meanwhile, in the example of Table 11, use_default_scaling_list_flag may not be decoded.

Furthermore, the decoder may decode information about whether a quantization matrix has been decoded or not and whether a default matrix has been used or not from the parameter set based on MatrixID instead of SizeID.

As in the example of Table 12, the decoder can decode mid_use_default_scaling_list_flag[SizeID][MatrixID], that is, information specifying whether a quantization matrix has been decoded or not and whether a default matrix has been used or not, from an adaptation parameter set based on based on MatrixID. For example, when a value of mid_use_default_scaling_list_flag[SizeID][MatrixID] is 1, the decoder does not decode a quantization matrix corresponding to MatrixID, and the coefficient values of a quantization matrix corresponding to MatrixID can be determined to be identical with the coefficient values of a default matrix defined in the coder and/or the decoder. When a value of mid_use_default_scaling_list_flag[SizeID][MatrixID] is 0, the decoder decodes a quantization matrix corresponding to MatrixID, but does not use a default matrix defined in the coder and/or the decoder as a quantization matrix corresponding to MatrixID.

In the example of Table 12, use_default_scaling_list_flag may not be decoded.

Furthermore, the decoder may decode information about whether a quantization matrix has been decoded or not and whether a default matrix has been used or not from the parameter set based on SizeID and MatrixID by taking both SizeID and MatrixID into consideration, instead of taking only SizeID or only MatrixID into consideration.

As in the example of Table 13, the decoder can decode sid_mid_use_default_scaling_list_flag[SizeID][MatrixID], that is, information specifying whether a quantization matrix has been decoded or not and whether a default matrix has been used or not, from an adaptation parameter set based on SizeID and MatrixID. For example, when a value of sid_mid_use_default_scaling_list_flag[SizeID][MatrixID] is 1, the decoder does not decode a quantization matrix corresponding to SizeID and MatrixID, and the coefficient values of a quantization matrix corresponding to SizeID and MatrixID can be determined to be identical with the coefficient values of a default matrix defined in the coder and/or the decoder. When a value of sid_mid_use_default_scaling_list_flag[SizeID][MatrixID] is 0, the decoder decodes a quantization matrix corresponding to SizeID and MatrixID and does not use a default matrix, defined in the coder and/or the decoder, as a quantization matrix corresponding to SizeID and MatrixID.

In the example of Table 13, use_default_scaling_list_flag may not be decoded.

Meanwhile, as in the example of Table 14, the decoder restricts SizeID according to a minimum size and a maximum size of a transform unit and performs one or more of the decoding of a quantization matrix, the decoding of information about whether a default matrix has been used or not, and the decoding of information about the type of prediction decoding method based on the restricted SizeID. Furthermore, the decoder can decode information about whether a quantization matrix has been decoded or not and information about whether a default matrix has been used or not from the parameter set based on SizeID and MatrixID.

In the example of Table 14, use_default_scaling_list_flag may not be decoded.

As in the example of Table 15, the decoder can restrict SizeID based on a difference value between a maximum size and a minimum value of a transform unit, from among pieces of information about the transform unit, and perform one or more of the decoding of a quantization matrix, the decoding of information about whether a default matrix has been used or not, and the decoding of information about the type of prediction decoding method based on the restricted SizeID. For example, a difference value between Log 2MaxTrafoSize and Log 2MinTrafoSize is a difference value between a maximum size and a minimum value of a transform unit and identical with log 2_diff_max_min_transform_block_size, and Log 2MinTrafoSize-2 is identical with log 2_min_transform_block_size_minus2. Furthermore, the decoder can decode information about whether a quantization matrix has been decoded or not and whether a default matrix has been used or not from the parameter set based on SizeID and MatrixID.

In the example of Table 15, use_default_scaling_list_flag may not be decoded.

Furthermore, as in the example of Table 16, the decoder can determine whether information about a quantization matrix is present or not in a parameter set to be decoded or whether or not to update the quantization matrix based on scaling_list_update_flag[SizeID][MatrixID] within the parameter set. For example, scaling_list_update_flag[SizeID][MatrixID] having a value of 1 indicates that information about a quantization matrix specified by SizeID and MatrixID is present in a parameter set to be decoded or indicates that information about a quantization matrix, corresponding to SizeID and MatrixID and previously decoded, should be updated into information about a quantization matrix corresponding to SizeID and MatrixID within a parameter set to be decoded. Here, to update information about a quantization matrix can mean that information about a quantization matrix that has been previously decoded is replaced with information about a quantization matrix within a parameter set to be decoded. Furthermore, scaling_list_update_flag[SizeID][MatrixID] having a value of 0 indicates that a quantization matrix corresponding to SizeID and MatrixID is not present in a parameter set to be decoded or that information about a quantization matrix that has been previously decoded is not updated. For example, when a value of scaling_list_update_flag[SizeID][MatrixID] is 0, the decoder does not know that information about what quantization matrix should be used in dequantization for the coefficient of a quantization matrix specified by SizeID and MatrixID because a quantization matrix corresponding to SizeID and MatrixID is not present in the parameter set and information about the quantization matrix has not been decoded. Accordingly, when a value of scaling_list_update_flag[SizeID][MatrixID] is 0, it can be instructed that a default matrix be used as a quantization matrix corresponding to SizeID and MatrixID or the quantization matrix be not used because information about a quantization matrix corresponding to SizeID and MatrixID is not present in a parameter set to be decoded.

Here, scaling_list_update_flag[SizeID][MatrixID] is decoded based on SizeID and MatrixID corresponding to the size of each transform unit. Accordingly, when a value of scaling_list_update_flag[SizeID][MatrixID] is 1, the decoder can perform one or more of the decoding of a quantization matrix, the decoding of information about whether a default matrix has been used or not, and the decoding of information about the type of prediction decoding method. When a value of scaling_list_update_flag[SizeID][MatrixID] is 0, the decoder does not perform one or more of the decoding of a quantization matrix, the decoding of information about whether a default matrix has been used or not, and the decoding of information about the type of prediction decoding method. That is, the decoder may not decode an unnecessary quantization matrix based on an indication of scaling_list_update_flag[SizeID][MatrixID].

Meanwhile, there is a disadvantage in that the degree of freedom in selecting a quantization matrix is low because a default matrix and a non-default matrix are not mixed and used according to the size of each transform block or the type of quantization matrix within a sequence, a picture, or a slice by using only scaling_list_update_flag[SizeID][MatrixID]. Accordingly, the decoder can decode sid_mid_use_default_scaling_list_flag[SizeID][MatrixID], that is, information about whether a quantization matrix has been decoded or not and whether a default matrix has been used or not, from the parameter set based on SizeID and MatrixID. For example, when a value of sid_mid_use_default_scaling_list_flag[SizeID][MatrixID] is 1, the decoder does not decode a quantization matrix specified by SizeID and MatrixID, and the coefficient values of a quantization matrix corresponding to SizeID and MatrixID are determined to be identical with the coefficient values of a default matrix defined in the coder and/or the decoder. When a value of sid_mid_use_default_scaling_list_flag[SizeID][MatrixID] is 0, the decoder decodes a quantization matrix specified by SizeID and MatrixID and does not use a default matrix, defined in the coder and/or the decoder, as the quantization matrix corresponding to SizeID and MatrixID.

In the example of Table 16, use_default_scaling_list_flag may not be decoded.

Furthermore, as in the example of Table 17, the decoder can decode information about whether a quantization matrix has been decoded or not and whether a default matrix has been used or not from the parameter set based on SizeID and MatrixID. Furthermore, scaling_list_update_flag[SizeID][MatrixID] regarding updating into information about a quantization matrix corresponding to SizeID and MatrixID can be used within a parameter to be decoded.

For example, when a value of sid_mid_use_default_scaling_list_flag[SizeID][MatrixID] is 0 and a value of scaling_list_update_flag[SizeID][MatrixID] is 0, the decoder decodes a quantization matrix corresponding to SizeID and MatrixID, does not update a quantization matrix, corresponding to SizeID and MatrixID previously decoded, into a quantization matrix corresponding to SizeID and MatrixID within a parameter to be decoded, and uses the quantization matrix corresponding to SizeID and MatrixID that has been previously decoded.

Furthermore, when a value of sid_mid_use_default_scaling_list_flag[SizeID][MatrixID] is 0 and a value of scaling_ list_update_flag[SizeID][MatrixID] is 1, the decoder decodes a quantization matrix corresponding to SizeID and MatrixID and updates a quantization matrix, corresponding to SizeID and MatrixID and previously decoded, into a quantization matrix corresponding to SizeID and MatrixID within a parameter to be decoded.

Furthermore, when a value of sid_mid_use_default_scaling_list_flag[SizeID][MatrixID] is 1 and a value of scaling_list_update_flag[SizeID][MatrixID] is 0, the decoder does not decode a quantization matrix corresponding to SizeID and MatrixID, determines the coefficient values of a quantization matrix to be the same as the coefficient values of a default matrix defined in the coder and/or the decoder, does not update a quantization matrix, corresponding to SizeID and MatrixID and previously decoded, into a quantization matrix corresponding to SizeID and MatrixID within a parameter to be decoded, and uses the quantization matrix corresponding to SizeID and MatrixID that has been previously decoded.

Furthermore, when a value of sid_mid_use_default_scaling_list_flag[SizeID][MatrixID] is 1 and a value of scaling_list_update_flag[SizeID][MatrixID] is 1, the decoder does not decode a quantization matrix corresponding to SizeID and MatrixID, determines the coefficient values of a quantization matrix to be the same as the coefficient values of a default matrix defined in the coder and/or the decoder, and updates a quantization matrix, corresponding to SizeID and MatrixID and previously decoded, into a quantization matrix corresponding to SizeID and MatrixID within a parameter to be decoded.

In the example of Table 17, use_default_scaling_list_flag may not be decoded.

Furthermore, the decoder can decode information about a method of predicting and decoding a quantization matrix from the parameter set and can determine the type of prediction decoding method for a quantization matrix based on the decoded information. As in the example of Table 18, the decoder can decode pred_mode_flag, that is, information about a method of predicting and decoding a quantization matrix, from an adaptation parameter set. For example, when a value of pred_mode_flag is 1, the decoder can decode the quantization matrix in accordance with exponential Golomb coding and Inverse-Differential Pulse Code Modulation (DPCM) methods. When a value of pred_mode_flag is 0, the decoder determines the coefficient values of the quantization matrix to be the same as the coefficient values of a quantization matrix that has been previously decoded. Here, the coefficient values of the quantization matrix and the coefficient values of the quantization matrix that have been previously decoded can be values within different quantization matrices, and the previously decoded quantization matrix can mean a reference quantization matrix.

If a value of pred_mode_flag is 0, the decoder can decode the reference quantization matrix ID of a quantization matrix to be decoded from a parameter set. As in the example of Table 18, the decoder can decode pred_matrix_id_delta, that is, the reference quantization matrix ID of a quantization matrix to be decoded, from an adaptation parameter set. Here, the decoder can determine RefMatrixID indicative of the reference quantization matrix of the quantization matrix to be decoded by using pred_matrix_id_delta and Equation 16.

$$\text{RefMatrixID} = \text{MatrixID} - (1 + \text{pred\_matrix\_id\_delta}) \qquad \text{<Equation 16>}$$

If a method of predicting and decoding a quantization matrix is a method of decoding the quantization matrix in accordance with the exponential Golomb coding and inverse-DPCM methods, the decoder can decode a difference value between the coefficient value of a quantization matrix that has been previously decoded and the coefficient value of a quantization matrix to be decoded from a parameter set. Here, the coefficient value of the quantization matrix that has been previously decoded can be a coefficient value within the quantization matrix to be decoded. As in the example of Table 19, the decoder can decode delta_coef, that is, a difference value between the coefficient value of the quantization matrix that has been previously decoded and the coefficient value of the quantization matrix to be decoded, from an adaptation parameter set.

Meanwhile, a default quantization matrix and a non-default quantization matrix can be mixed and used within a sequence, a picture, or a slice by using the following method, and the reception of an unnecessary quantization matrix can be prevented.

For example, if a method of predicting and decoding a quantization matrix is a method of determining the quantization matrix to be the same as a quantization matrix that has already been included in the decoder and has been previously decoded (pred_mode_flag=0), the decoder can decode information about whether a default matrix has been used or not by using the reference quantization matrix ID of a quantization matrix to be decoded from a parameter set.

As in the example of Table 18, the decoder can decode pred_matrix_id_delta, that is, the reference quantization matrix ID of a quantization matrix to be decoded, from a parameter set. Here, the decoder can determine RefMatrixID, that is, information specifying the reference quantization matrix or default matrix of the quantization matrix to be decoded and information about whether a default matrix has been used or not, by using pred_matrix_id_delta and Equation 17.

$$\text{RefMatrixID} = \text{MatrixID} - \text{pred\_matrix\_id\_delta} \qquad \text{<Equation 17>}$$

For example, when a value of RefMatrixID is identical with a value of MatrixID, the coefficient values of a quantization matrix corresponding to SizeID and RefMatrixID are determined to be identical with the coefficient values of a default matrix defined in the coder and/or the decoder. Here, the default matrix means a default matrix corresponding to SizeID and RefMatrixID. Furthermore, when a value of pred_matrix_id_delta is 0, a value of RefMatrixID becomes identical with a value of MatrixID. If a value of RefMatrixID is not identical with a value of MatrixID, a quantization matrix corresponding to RefMatrixID is determined as the reference quantization matrix of a quantization matrix to be decoded and the coefficient values of the quantization matrix to be decoded are determined to be identical with the coefficient values of the reference quantization matrix.

If the size of a quantization matrix corresponding to SizeID is included in a minimum size and a maximum size of a transform unit that are available to the decoder, the reference quantization matrix of the quantization matrix to be decoded and whether a default matrix has been used or not can be determined by using the above method. If the size of a quantization matrix corresponding to SizeID is not included in a minimum size and a maximum size of a transform unit that are available to the decoder, the quantization matrix corresponding to SizeID may not be determined to be the same as a default matrix. The above determination process for SizeID can be performed if one or more of the decoding of the quantization matrix, the decoding of information about whether a default matrix has been used or not, and the decoding of information about the type of prediction decoding method are performed based on a difference value between a maximum size and a minimum value of a transform unit, from among pieces of information about the transform unit.

After determining whether the quantization matrix has been used or not, the decoder can decode information about whether the quantization matrix has been used or not from the parameter set.

As in the example of Table 20, the decoder can decode scaling_list_enable_flag, that is, information about whether the quantization matrix has been used or not, from a parameter set. Here, when a value of scaling_list_enable_flag is 1, the decoder can use a quantization matrix, such as a default matrix or a non-default matrix, in dequantization. When a value of scaling_list_enable_flag is 0, the decoder does not use the quantization matrix or can use a quantization matrix having all the same coefficient values in dequantization. Here, all the coefficient values can be 16.

Furthermore, if a method of predicting and decoding a quantization matrix is a method of decoding the quantization matrix in accordance with the inverse-DPCM and exponential Golomb coding methods, the decoder can decode a difference value between the coefficient value of a quantization matrix that has been previously decoded and the coefficient value of a quantization matrix to be decoded from a parameter set. The coefficient value of the quantization matrix that has been previously decoded can be a coefficient value within the quantization matrix to be decoded. That is, the coefficient value of the quantization matrix that has been previously decoded and the coefficient value of the quantization matrix to be decoded can be values within the same quantization matrix.

As in the example of Table 21, the decoder can decode delta_coef, that is, a difference value between the coefficient value of the quantization matrix that has been previously decoded and the coefficient value of the quantization matrix to be decoded, from a parameter set. As in the example of Table 21, if the coefficient value 'nextcoef' of a quantization matrix is (1) identical with a specific value and is (2) the first value of the quantization matrix, the coefficient values of the corresponding quantization matrix can be determined to be identical with the coefficient values of a default matrix defined in the coder and/or the decoder by using Equation 18.

nextcoef=(nextcoef+delta_coef+256)% 256    <Equation 18>

That is, if the coefficient value 'nextcoef' of the quantization matrix is (1) identical with a specific value and is (2) the first value of the quantization matrix, the decoder can use the corresponding quantization matrix as a default matrix. Here, the specific value can be 0. Furthermore, the default matrix can mean a default matrix specified by SizeID and MatrixID. Accordingly, if the coefficient value 'nextcoef' of the quantization matrix is identical with 0 and is the first value of the quantization matrix, the decoder can stop the decoding of a difference value between the corresponding quantization matrix and the quantization matrix.

Meanwhile, if a method of predicting and decoding a quantization matrix is a method of decoding the quantization matrix in accordance with the inverse-DPCM and exponential Golomb coding methods, the decoder can decode a difference value between the coefficient value of a quantization matrix that has been previously decoded and the coefficient value of a quantization matrix to be decoded from a parameter set. The coefficient value of the quantization matrix that has been previously decoded can be a coefficient value within the quantization matrix to be decoded. That is, the coefficient value of the quantization matrix that has been previously decoded and the coefficient value of the quantization matrix to be decoded can be values within the same quantization matrix.

As in the example of Table 22, the decoder can decode delta_coef, that is, a difference value between the coefficient value of the quantization matrix that has been previously decoded and the coefficient value of the quantization matrix to be decoded, from a parameter set. For example, as in the example of Table 22, if the coefficient value 'nextcoef' of a quantization matrix calculated using Equation 18, that is, (nextcoef+delta_coef+256) % 256, is identical with a specific value and is the first value of the quantization matrix, the decoder can determine the coefficient values of the corresponding quantization matrix to be the same as the coefficient values of a default matrix defined in the coder and/or the decoder. That is, if nextcoef is (1) identical with the specific value and is (2) the first value of the quantization matrix, the decoder can use the corresponding quantization matrix as a default matrix. Here, the specific value can be 0, and the coefficient value of the quantization matrix calculated using (nextcoef+delta_coef+256) % 256 can be the coefficient value of a quantization matrix having a 4×4 or 8×8 size.

Furthermore, the first value of the quantization matrix can be a value using scaling_list_dc_coef_minus8, and the specific value can be a value corresponding to scaling_list_dc_coef_minus8+8.

scaling_list_dc_coef_minus8 can mean the first value of a quantization matrix having a 16×16 or a 32×32 size, which can mean a DC matrix coefficient value.

When a value of sizeID is 2, scaling_list_dc_coef_minus8[sizeID-2][matrixID] can correspond to a DC matrix coefficient value having a 16×16 size. Here, 16×16 can be the size of a transform block corresponding to a quantization matrix. When a value of SizeID is 3, scaling_list_dc_coef_minus8[sizeID-2][matrixID] can correspond to a DC matrix coefficient value in a quantization matrix having a 32×32 size. Here, the 32×32 size may be the size of a transform block corresponding to a quantization matrix. In each case, the default matrix can mean a default matrix corresponding to SizeID and MatrixID. Accordingly, if the coefficient value 'nextcoef' of a quantization matrix is identical with 0 and is the first value of the quantization matrix, the decoder can stop the decoding of a difference value between (i.e., a difference between the coefficient values) between the corresponding quantization matrix and the quantization matrix.

The decoder can differently perform whether or not to decode scaling_list_dc_coef_minus8, that is, a DC matrix coefficient value, and the decoding of information about whether a default matrix has been used or not according to the size of a quantization matrix or a transform size by using the method.

Meanwhile, a method of coding/decoding a quantization matrix for determining whether or not to use a default matrix by using the coefficient value of a quantization matrix is a disadvantage in that the degree of complexity in a process of coding/decoding the coefficient value of a quantization matrix is increased. In contrast, in the present invention, in image coding/decoding, whether or not to use a default matrix can be determined by using a reference quantization matrix ID. Accordingly, the degree of complexity of calculation in a process of coding/decoding a quantization matrix can be reduced.

First, the decoder can decode information indicative of whether a quantization matrix is present or not from the parameter set. As in the example of Table 23, the decoder can decode scaling_list_present_flag, that is, information indicating whether a quantization matrix is present or not within a bit stream, from a parameter set. For example, when a value of scaling_list_present_flag is 0, it means that the quantization matrix is not present and the quantization matrix is determined as a default quantization matrix. When a value of scaling_list_present_flag is 1, it means that a coded quantization matrix is present.

The decoder can decode information about a method of predicting and decoding the quantization matrix from the parameter set and can determine the type of prediction decoding method for the quantization matrix based on the decoded information. Here, the parameter set from which the information about the prediction decoding method is decoded can be an adaptation parameter set. As in the example of Table 23, the decoder can decode scaling_list_pred_mode_flag, that is, information about a method of predicting and decoding the quantization matrix, from a parameter set. For example, when a value of scaling_list_pred_mode_flag is 1, the decoder predicts and decodes a coefficient within the quantization matrix by decoding the quantization matrix in accordance with the exponential Golomb coding and inverse-DPCM methods through scanning. When a value of scaling_list_pred_mode_flag is 0, the decoder determines the coefficient values of a quantization matrix to be decoded so that they have same values as the coefficient values of a reference quantization matrix or determines the coefficient values of a quantization matrix to be decoded so that they have same values as the coefficient values of a default matrix. Here, to determine the values so that they have the same values can mean that a quantization matrix prediction method of copying the coefficient values of a specific quantization matrix to the coefficient values of a quantization matrix to be decoded is used.

If a value of scaling_list_pred_mode_flag is 0, the decoder can decode the reference quantization matrix ID of a quantization matrix to be decoded and information about whether a default matrix has been used or not from a parameter set. Here, the parameter set from which the reference quantization matrix ID and the information are decoded can be an adaptation parameter set.

That is, as in the example of Table 23, the decoder can decode scaling_list_pred_matrix_id_delta, that is, information specifying the reference quantization matrix ID of a quantization matrix to be decoded and information about whether a default matrix has been used or not, from a parameter set. Here, the decoder can determine RefMatrixID indicative of the reference quantization matrix or the default matrix of the quantization matrix to be decoded by using scaling_list_pred_matrix_id_delta and Equation 19.

RefMatrixID=matrixID-scaling_list_pred_matrix_id_delta   <Equation 19>

If a value of RefMatrixID is identical with a value of matrixID, the coefficient values of a quantization matrix to be decoded, corresponding to sizeID and matrixID, can be determined to be identical with the coefficient values of a default matrix defined in the coder and/or the decoder. Here, the default matrix can be a default matrix corresponding to sizeID and matrixID. Referring to Equation 19, when a value of scaling_list_pred_matrix_id_delta is 0, it means that a value of RefMatrixID is identical with a value of matrixID.

If a value of RefMatrixID is not identical with a value of matrixID, the decoder can determine a quantization matrix corresponding to RefMatrixID as the reference quantization matrix of a quantization matrix to be decoded and determine the coefficient values of the quantization matrix to be decoded so that they have the same values as the coefficient values of the reference quantization matrix. To determine the coefficient values of a quantization matrix to be decoded so that they have the same values as the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used. Here, a value of scaling_list_pred_matrix_id_delta can be a positive integer value.

If a method of predicting and decoding a quantization matrix is a method of predicting and decoding a coefficient within the quantization matrix in accordance with the exponential Golomb coding and inverse-DPCM methods through scanning, the decoder can decode a difference value between the coefficient value of a quantization matrix that has been previously decoded within the quantization matrix and the coefficient value of a quantization matrix to be decoded from a parameter set Here, the parameter set from which the difference value is decoded by the decoder can be an adaptation parameter set.

As in the example of Table 24, if the size of a quantization matrix to be decoded is 16×16 (sizeID=2) or 32×32 (sizeID=3), the decoder can decode scaling_list_dc_coef_minus8, that is, a DC matrix coefficient, from a parameter set. Furthermore, as in the example of Table 24, the decoder can decode scaling_list_delta_coef, that is, a difference value between the coefficient value of a quantization matrix that has been previously decoded within the quantization matrix and the coefficient value of the quantization matrix to be decoded, from a parameter set. In the examples of Tables 23 and 24, the examples in which information about the quantization matrix is decoded from the adaptation parameter set has been illustrated, but the present invention is not limited thereto. The decoder may decode information about the quantization matrix from another parameter set (i.e., a parameter set including at least one of a sequence parameter set and a picture parameter set).

As described above in the example of the coder, in conventional quantization matrix coding/decoding methods, coding efficiency is deteriorated because unnecessary information is coded/decoded when predicting a quantization matrix. In the present invention, however, coding efficiency can be improved when coding/decoding a quantization matrix because the coding/decoding of the quantization matrix can be differently performed depending on whether a reference quantization matrix is present or not.

More particularly, the decoder can decode information indicative of whether a quantization matrix is present or not from the parameter set. As in the example of Table 25, the decoder can decode scaling_list_present_flag, that is, information about whether a quantization matrix is present or not within a bit stream, from a parameter set. For example, when a value of scaling_list_present_flag is 0, it means that the quantization matrix is not present and all quantization matrices are determined as default quantization matrices. When a value of scaling_list_present_flag is 1, it means that a coded quantization matrix is present.

Furthermore, when a value of matrixID is greater than 0, the decoder can decode information about a method of predicting and decoding a quantization matrix from the parameter set and determine the type of prediction decoding method for the quantization matrix based on the decoded information. Here, the parameter set from which the information about a prediction decoding method is decoded can be an adaptation parameter set.

For example, as in the example of Table 25, when a value of matrixID is greater than 0, the decoder can decode scaling_list_pred_mode_flag, that is, information about a method of predicting and decoding a quantization matrix, from a parameter set. In the example of Table 25, when a value of scaling_list_pred_mode_flag is 1, the decoder can predict and decode a coefficient within the quantization matrix by decoding the quantization matrix in accordance with the exponential Golomb coding and inverse-DPCM methods through scanning. When a value of scaling_list_pred_mode_flag is 0, the decoder can determine the coefficient values of a quantization matrix to be decoded so that they have the same values as the coefficient values of a reference quantization matrix. Here, to determine the values so that they have the same values can mean that a quantization matrix prediction method of copying the coefficient values of the reference quantization matrix to the coefficient values of the quantization matrix to be decoded is used.

Furthermore, in the example of Table 25, when a value of matrixID is 0, a value of scaling_list_pred_mode_flag becomes TRUE. Accordingly, the decoder does not decode scaling_list_pred_mode_flag and can decode the quantization matrix by scanning the quantization matrix in accordance with the inverse-DPCM and exponential Golomb coding methods.

If a value of scaling_list_pred_mode_flag is 0 and a value of matrixID is greater than 0, the decoder can decode the reference quantization matrix ID of a quantization matrix to be decoded from a parameter set. Here, the parameter set from which the reference quantization matrix ID is decoded can be an adaptation parameter set.

For example, as in the example of Table 25, the decoder can decode scaling_list_pred_matrix_id_delta, that is, the reference quantization matrix ID of a quantization matrix to be decoded, from the parameter set when a value of matrixID is greater than 0. Here, RefMatrixID indicating the reference quantization matrix of the quantization matrix to be decoded can be determined by using scaling_list_pred_matrix_id_delta and Equation 20.

RefMatrixID=matrixID−(1+scaling_list_pred_matrix_id_delta) <Equation 20>

In the example of Table 25, matrixID having a value of 0 indicates the first quantization matrix for each sizeID. The quantization matrix can be predicted from only a previously decoded quantization matrix having the same sizeID, and the prediction of a quantization matrix using a method, such as matrix copying, cannot be performed on the first quantization matrix for each sizeID because a reference quantization matrix having the same sizeID value is not present. Accordingly, when a value of matrixID is greater than 0, the decoder can decode scaling_list_pred_matrix_id_delta, that is, the reference quantization matrix ID, determine a quantization matrix corresponding to RefMatrixID as the reference quantization matrix of a quantization matrix to be decoded based on the decoded reference quantization matrix ID, and determine the coefficient values of the quantization matrix to be decoded so that they have the same values as the coefficient values of the reference quantization matrix. To determine the coefficient values of a quantization matrix to be decoded so that they have the same values as the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used.

If a method of predicting and decoding the decoded quantization matrix is a method of predicting and decoding a coefficient within the quantization matrix in accordance with the exponential Golomb coding and inverse-DPCM methods through scanning, the decoder can decode a difference value between the coefficient value of a quantization matrix that has been previously decoded within the quantization matrix and the coefficient value of the quantization matrix to be decoded from a parameter set. Here, the parameter set from which the difference value is decoded can be an adaptation parameter set.

For example, as in the example of Table 26, when the size of a quantization matrix to be decoded is 16×16 (sizeID=2) or 32×32 (sizeID=3), the decoder can decode scaling_list_dc_coef_minus8, that is, a DC matrix coefficient, from a parameter set. Furthermore, as in the example of Table 26, the decoder can decode scaling_list_delta_coef, that is, a difference value between the coefficient value of a quantization matrix that has been previously decoded within the quantization matrix and the coefficient value of the quantization matrix to be decoded, from a parameter set.

Furthermore, the decoder can determine whether a default matrix has been used or not by using scaling_list_delta_coef that is used to calculate scaling_list_dc_coef_minus8 or nextCoef. For example, a value of scaling_list_dc_coef_minus8 is decoded as −8, the decoder can determine the corresponding quantization matrix as a default matrix. When a value of the first nextCoef value calculated by decoding scaling_list_delta_coef is 0, the decoder can determine the corresponding quantization matrix as a default matrix.

As described above in the example of the coder, a method of coding/decoding a quantization matrix for determining whether a default matrix has been used or not by using the coefficient value of a quantization matrix has a disadvantage in that it increases the degree of complexity in a process of coding/decoding the coefficient value of the quantization matrix. Furthermore, coding efficiency is deteriorated because unnecessary information is coded/decoded when predicting the quantization matrix. In the present invention, however, in image coding/decoding, the degree of complexity of calculation in coding/decoding a quantization matrix can be reduced because whether a default matrix has been used or not can be determined based on a reference quantization matrix ID, and coding efficiency in coding/decoding a quantization matrix can be improved because the quantization matrix is differently coded/decoded depending on whether a reference quantization matrix is present or not.

More particularly, first, the decoder can decode information indicative of whether a quantization matrix is present or not from the parameter set. As in the example of Table 27, the decoder can decode scaling_list_present_flag, that is, information indicating whether a quantization matrix is present or not within a bit stream, from a parameter set. For example, when a value of scaling_list_present_flag is 0, it indicates that the quantization matrix is not present and thus all quantization matrices are determined as default quantization matrices. When a value of scaling_list_present_flag is 1, it indicates that a coded quantization matrix.

Furthermore, the decoder can decode information about a method of predicting and decoding a quantization matrix from the parameter set and can determine the type of prediction decoding method for the quantization matrix based on the decoded information. Here, the parameter set from which the information about the prediction decoding method is decoded can be an adaptation parameter set.

More particularly, as in the example of Table 27, the decoder can decode scaling_list_pred_mode_flag, that is, information about a method of predicting and decoding a quantization matrix, from a parameter set. For example, when a value of scaling_list_pred_mode_flag is 1, the decoder can predict and decode a coefficient within the quantization matrix by decoding the quantization matrix in accordance with the exponential Golomb coding and inverse-DPCM methods through scanning. When a value of scaling_list_pred_mode_flag is 0, the decoder can determine the coefficient values of a quantization matrix to be decoded so that they have the same values as the coefficient values of a reference quantization matrix or determine the coefficient values of a quantization matrix to be decoded so that they have the same values as the coefficient values of a default matrix. Here, to determine the values so that they have the same values can mean that a quantization matrix prediction method of copying the coefficient values of a specific quantization matrix to the coefficient values of a quantization matrix to be decoded is used.

If a value of scaling_list_pred_mode_flag is 0 and a value of matrixID is greater than 0, the decoder can decode the reference quantization matrix ID of a quantization matrix to be decoded and information about whether the default matrix has been used or not from the parameter set. Here, the parameter set from which the reference quantization matrix ID and the information about whether the default matrix has been used or not are decoded can be an adaptation parameter set.

In this case, as in the example of Table 27, when a value of scaling_list_pred_mode_flag is 0 and a value of matrixID is greater than 0, the decoder can decode scaling_list_pred_matrix_id_delta, that is, indicating the reference quantization matrix ID of the quantization matrix to be decoded and the information about whether the default matrix has been used or not, from a parameter set. Here, RefMatrixID indicating the reference quantization matrix or default matrix of the quantization matrix to be decoded can be determined by using scaling_list_pred_matrix_id_delta and Equation 21.

RefMatrixID=matrixID-scaling_list_pred_matrix_id_delta        <Equation 21>

If a value of RefMatrixID is identical with a value of matrixID, the coefficient values of a quantization matrix to be decoded, corresponding to sizeID and matrixID, are determined to be identical with the coefficient values of a default matrix defined in the coder and/or the decoder. Here, the default matrix means a default matrix corresponding to sizeID and matrixID. In accordance with Equation 21, when a value of scaling_list_pred_matrix_id_delta is 0, it means that a value of RefMatrixID is identical with a value of matrixID.

If a value of RefMatrixID is not identical with a value of matrixID, a quantization matrix corresponding to RefMatrixID is determined as the reference quantization matrix of the quantization matrix to be decoded and the coefficient values of the quantization matrix to be decoded are determined to be identical with the coefficient values of the reference quantization matrix. To determine the coefficient values of a quantization matrix to be decoded to be identical with the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used.

Here, when a value of scaling_list_pred_mode_flag is 0, it indicates that the method of predicting and decoding a quantization matrix is a method of determining a quantization matrix to be identical with as a previously decoded quantization matrix. In this case, the quantization matrix can be predicted from a previously decoded quantization matrix having the same sizeID.

When a value of matrixID is 0, the first quantization matrix is indicated for each sizeID. If a value of scaling_list_pred_mode_flag is 0 and a value of matrixID is 0, the prediction of a quantization matrix using a method, such as matrix copying, cannot be performed on the first quantization matrix for each sizeID because a reference quantization matrix having the same sizeID value is not present. In this case, the decoder does not decode scaling_list_pred_matrix_id_delta and derives a value of scaling_list_pred_matrix_id_delta as 0. When a value of scaling_list_pred_matrix_id_delta is 0, the coefficient values of a quantization matrix to be decoded, corresponding to sizeID and matrixID, are determined to be identical with the coefficient values of a default matrix defined in the coder and/or the decoder because a value of RefMatrixID is identical with a value of matrixID. Here, the default matrix means a default matrix corresponding to sizeID and matrixID.

If a method of predicting and decoding the decoded quantization matrix is a method of predicting and decoding a coefficient within the quantization matrix in accordance with the exponential Golomb coding and inverse-DPCM methods through scanning, the decoder can decode a difference value between the coefficient value of a quantization matrix that has been previously decoded within the quantization matrix and the coefficient value of a quantization matrix to be decoded from a parameter set. Here, the parameter set from which the difference value is decoded can be an adaptation parameter set.

For example, as in the example of Table 28, if the size of a quantization matrix to be decoded is 16×16 (sizeID=2) or 32×32 (sizeID=3), the decoder can decode scaling_list_dc_coef_minus8, that is, a DC matrix coefficient, from a parameter set. As in the example of Table 28, the decoder can decode scaling_list_delta_coef, that is, a difference value between the coefficient value of a quantization matrix that has been previously decoded within the quantization matrix and the coefficient value of the quantization matrix to be decoded, from a parameter set.

As described above in the example of the coder, in conventional quantization matrix coding/decoding methods, when sending a quantization matrix, the total number of coefficients and a DC matrix coefficient within the matrix are coded/decoded. In this case, the improvement of coding efficiency is limited because the DC matrix coefficient is not predicted and cxoded/decoded. In the present invention, a DC matrix coefficient within a quantization matrix can be predicted and coded/decoded, and thus coding efficiency can be improved. For example, in the examples of Tables 29 and 30, coding efficiency can be improved because a DC matrix coefficient is not predicted from a constant 8, but is predicted neighboring AC coefficients by using high correlation between the neighboring coefficients. Furthermore, in the examples of Tables 29 and 30, a memory space for storing DC matrix coefficients can be reduced because the coding/decoding sequence of a quantization matrix is made identical with the restoration sequence of the quantization matrix. Furthermore, in the examples of Tables 29 and 30, whether a default matrix has been used or not can be indicated by the syntax element 'scaling_list_delta_coef' without using several syntax elements.

More particularly, the decoder can decode information indicative of whether a quantization matrix is present or not from a parameter set. For example, as in the example of Table 29, the decoder can decode scaling_list_present_flag, that is, information indicating whether a quantization matrix is present or not within a bit stream, from a parameter set. Here, when a value of scaling_list_present_flag is 0, it indicates that the quantization matrix is not present and thus all quantization matrices are determined as default quantization matrices. When a value of scaling_list_present_flag is 1, it indicates that a coded quantization matrix is present.

The decoder can decode information about a method of predicting and decoding the quantization matrix from the parameter set and can determine the type of prediction decoding method for the quantization matrix based on the decoded information. Here, the parameter set from which the information about the method of predicting and decoding the quantization matrix is decoded can be an adaptation parameter set.

More particularly, as in the example of Table 29, the decoder can decode scaling_list_pred_mode_flag, that is, information about a method of predicting and decoding the quantization matrix, from a parameter set. For example, when a value of scaling_list_pred_mode_flag is 1, the decoder can predict and decode a coefficient within the quantization matrix in accordance with the exponential Golomb coding and inverse-DPCM methods through scanning. When a value of scaling_list_pred_mode_flag is 0, the decoder can determine the coefficient values of a quantization matrix to be decoded so that they have the same values as the coefficient values of a reference quantization matrix. Here, to determine the values so that they have the same values can mean that a quantization matrix prediction method of copying the coefficient values of the reference quantization matrix to the coefficient values of the quantization matrix to be decoded is used.

If a value of scaling_list_pred_mode_flag is 0, the decoder can decode the reference quantization matrix ID of the quantization matrix to be decoded from a parameter set. Here, the parameter set from which the reference quantization matrix ID is decoded can be an adaptation parameter set.

More particularly, as in the example of Table 29, the decoder can decode scaling_list_pred_matrix_id_delta, that is, the reference quantization matrix ID of a quantization matrix to be decoded, from a parameter set. Here, RefMatrixID indicating the reference quantization matrix of the quantization matrix to be decoded can be determined by using scaling_list_pred_matrix_id_delta and Equation 22.

RefMatrixID=matrixID−(1+scaling_list_pred_matrix_id_delta) <Equation 22>

The decoder can determine a quantization matrix, corresponding to RefMatrixID, as the reference quantization matrix of the quantization matrix to be decoded and determine the coefficient values of the quantization matrix to be decoded so that they have the same values as the coefficient values of the reference quantization matrix. To determine the coefficient values of a quantization matrix to be decoded so that they have the same values as the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used.

If a method of predicting and decoding the decoded quantization matrix is a method of predicting and decoding a coefficient within the quantization matrix in accordance with the exponential Golomb coding and inverse-DPCM methods through scanning, the decoder can decode a difference value between the coefficient value of a quantization matrix that has been previously decoded within the quantization matrix and the coefficient value of the quantization matrix to be decoded from a parameter set. Here, the parameter set from which the difference value is decoded can be an adaptation parameter set.

For example, as in the example of Table 30, the decoder can decode scaling_list_delta_coef, that is, a difference value between the coefficient value of a quantization matrix that has been previously decoded within the quantization matrix and the coefficient value of the quantization matrix to be decoded, from a parameter set. Here, the decoder can determine whether a default matrix has been used or not by using scaling_list_delta_coef that is used to calculate nextCoef. That is, when a value of the first nextCoef calculated by decoding scaling_list_delta_coef is 0, the decoder can determine the corresponding quantization matrix as a default matrix.

Furthermore, as in the example of Table 30, the decoder can decode scaling_list_dc_coef_res, that is, a difference value between the coefficient values of quantization matrices corresponding to a DC matrix coefficient, from a parameter set. Here, scaling_list_dc_coef_res can be decoded from (useDefaultScalingMatrixFlag=0) when the size of the quantization matrix to be decoded is 16×16 (sizeID=2) or 32×32 (sizeID=3) and a default matrix is not used.

In relation to a quantization matrix having a 16×16 or 32×32 size whose DC matrix coefficient is separately decoded, the DC matrix coefficient can be calculated by using the sum of a value of scaling_list_dc_coef_res and a matrix coefficient present at a DC location in accordance with Equation 23.

ScalingFactor[2][matrixID][0][0]=scaling_list_dc_coef_res[0][matrixID]+ScalingFactor[2][matrixID][0][0] with matrixID=0 . . . 5

ScalingFactor[3][matrixID][0][0]=scaling_list_dc_coef_res[1][matrixID]+ScalingFactor[3][matrixID][0][0] with matrixID=0 . . . 1 <Equation 23>

In Equation 23, ScalingFactor[2] refers to a quantization matrix having a 16×16 size, and ScalingFactor[3] refers to a quantization matrix having a 32×32 size. Furthermore, ScalingFactor[2][matrixID][0][0] refers to a DC matrix coefficient within the quantization matrix having a 16×16 size, corresponding to matrixID. ScalingFactor[3][matrixID][0][0] refers to a DC matrix coefficient within the quantization matrix having a 32×32 size, corresponding to matrixID.

Meanwhile, a method of coding/decoding a quantization matrix for determining whether a default matrix has been used or not by using the coefficient value of a quantization matrix has a disadvantage in that it increases the degree of complexity in a process of coding/decoding the coefficient value of the quantization matrix. Furthermore, all coefficients and a DC matrix coefficient within a quantization matrix are coded/decoded when sending the quantization matrix. In this case, the improvement of coding efficiency is limited because the DC matrix coefficient is not predicted and coded/decoded.

In the present invention, in image coding/decoding, the degree of complexity when coding/decoding a quantization matrix can be reduced by determining whether a default matrix has been used or not based on a reference quantization matrix ID. Furthermore, coding efficiency can be improved by predicting and coding/decoding a DC matrix coefficient within a quantization matrix. For example, in the examples of Tables 31 and 32, coding efficiency can be improved by predicting a DC matrix coefficient within a quantization matrix from neighboring AC coefficients based on a high correlation between the neighboring coefficients without predicting the DC matrix coefficient from a constant 8. Furthermore, in the examples of Tables 31 and 32, a memory space for storing DC matrix coefficients can be reduced because the coding/decoding sequence of a quantization matrix can be made identical with the restoration sequence of the quantization matrix. Furthermore, in the example of Tables 31 and 32, whether a default matrix has been used or not can be indicated by the syntax element 'scaling_list_delta_coef' without using several syntax elements.

More particularly, the decoder can decode information indicative of whether a quantization matrix is present or not from a parameter set. As in the example of Table 31, the decoder can decode scaling_list_present_flag, that is, information indicating whether a quantization matrix is present or not within a bit stream, from a parameter set. Here, when a value of scaling_list_present_flag is 0, it indicates that the quantization matrix is not present and thus all quantization matrices are determined as default quantization matrices. When a value of scaling_list_present_flag is 1, it indicates that a coded quantization matrix is present.

The decoder can decode information about a method of predicting and decoding a quantization matrix from a parameter set and can determine the type of prediction decoding method for the quantization matrix based on the decoded information. Here, the parameter set from which the information about the prediction decoding method is decoded can be an adaptation parameter set.

For example, as in the example of Table 31, the decoder can decode scaling_list_pred_mode_flag, that is, information about a method of predicting and decoding a quantization matrix, from a parameter set. In the example of Table 31, when a value of scaling_list_pred_mode_flag is 1, the decoder can predict and decode a coefficient within the quantization matrix by decoding the quantization matrix in accordance with the exponential Golomb coding and inverse-DPCM methods through scanning. When a value of scaling_list_pred_mode_flag is 0, the coefficient values of a quantization matrix to be decoded can be determined to be identical with the coefficient values of a reference quantization matrix or the coefficient values of a quantization matrix to be decoded can be determined to be identical with the coefficient values of a default matrix. Here, to determine the values so that they have the identical values can mean that a quantization matrix prediction method of copying the coefficient values of a specific quantization matrix to the coefficient values of a quantization matrix to be decoded is used.

If a value of scaling_list_pred_mode_flag is 0, the decoder can decode the reference quantization matrix ID of a quantization matrix to be decoded and information about whether a default matrix has been used or not from a parameter set. Here, the decoded parameter set can be an adaptation parameter set.

More particularly, as in the example of Table 31, the decoder can decode scaling_list_pred_matrix_id_delta, that is, information about the reference quantization matrix ID of the quantization matrix to be decoded and whether a default matrix has been used or not, from a parameter set. Here, RefMatrixID indicating the reference quantization matrix or default matrix of the quantization matrix to be decoded is determined by using scaling_list_pred_matrix_id_delta and Equation 24.

$$\text{RefMatrixID=matrixID-scaling\_list\_pred\_matrix\_id\_delta} \qquad \text{<Equation 24>}$$

If a value of RefMatrixID is identical with a value of matrixID, the coefficient values of a quantization matrix to be decoded, corresponding to sizeID and matrixID, can be determined to be identical with the coefficient values of a default matrix defined in the coder and/or the decoder. Here, the default matrix refers to a default matrix corresponding to sizeID and matrixID. Furthermore, in Equation 24, when a value of scaling_list_pred_matrix_id_delta is 0, it means that a value of RefMatrixID is identical with a value of matrixID. When a value of RefMatrixID is not identical with a value of matrixID, a quantization matrix corresponding to RefMatrixID can be determined as the reference quantization matrix of the quantization matrix to be decoded and the coefficient values of the quantization matrix to be decoded can be determined to be identical with the coefficient values of the reference quantization matrix. To determine the coefficient values of a quantization matrix to be decoded to be indentical with the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used.

If a method of predicting and decoding the decoded quantization matrix is a method of decoding the quantization matrix in accordance with the exponential Golomb coding and inverse-DPCM methods in order to predict and decode a coefficient within the quantization matrix through scanning, the decoder can decode a difference value between the coefficient value of a quantization matrix that has been previously decoded within the quantization matrix and the coefficient value of a quantization matrix to be decoded from a parameter set. Here, the parameter set from which the difference value is decoded can be an adaptation parameter set.

Furthermore, as in the example of Table 32, the decoder can decode scaling_list_delta_coef, that is, a difference value between the coefficient value of a quantization matrix that has been previously decoded within the quantization matrix and the coefficient value of a quantization matrix to be decoded, from a parameter set. As in the example of Table 32, the decoder can decode scaling_list_dc_coef_res, that is, a difference value between the coefficient values of quantization matrices corresponding to a DC matrix coefficient, from a parameter set. Here, scaling_list_dc_coef_res can be decoded from (useDefaultScalingMatrixFlag=0) if the size of a quantization matrix to be decoded is a 16×16 (sizeID=2) or 32×32 (sizeID=3) quantization matrix and a default matrix is not used.

In relation to a quantization matrix having a 16×16 size or a quantization matrix having a 32×32 size whose DC matrix coefficient is separately decoded, the DC matrix coefficient can be calculated by using the sum of a value of scaling_list_dc_coef_res and the coefficient of a matrix present at a DC location as in Equation 25.

ScalingFactor[2][matrixID][0][0]=scaling_list_dc_coef_res[0][matrixID]+ScalingFactor[2][matrixID][0][0] with matrixID=0 . . . 5

ScalingFactor[3][matrixID][0][0]=scaling_list_dc_coef_res[1][matrixID]+ScalingFactor[3][matrixID][0][0] with matrixID=–0 . . . 1  <Equation 25>

In Equation 25, ScalingFactor[2] refers to a 16×16-size quantization matrix, and ScalingFactor[3] refers to a 32×32-size quantization matrix. Furthermore, ScalingFactor[2][matrixID][0][0] refers to a DC matrix coefficient within the 16×16-size quantization matrix corresponding to a corresponding matrixID, and ScalingFactor[3][matrixID][0][0] refers to a DC matrix coefficient within the 32×32-size quantization matrix corresponding to a corresponding matrixID.

As described above in an example related to the coder, in conventional quantization matrix coding/decoding methods, a quantization matrix is copied by using the size of the quantization matrix when quantization and dequantization are performed not using the size of the quantization matrix when coding/decoding are performed. Accordingly, the coding efficiency of a quantization matrix is limited because the quantization matrix must be copied from a limited number of quantization matrices. In the present invention, however, coding efficiency can be improved and the degree of freedom in predicting a quantization matrix can be increased because the quantization matrix can be predicted from a quantization matrix having the same size as a quantization matrix when coding/decoding are performed.

More particularly, the decoder can decode information indicative of whether a quantization matrix is present or not from a parameter set. As in the examples of Tables 33 and 34, the decoder can decode scaling_list_present_flag, that is, information indicating whether a quantization matrix is present or not within a bit stream, from a parameter set. For example, when a value of scaling_list_present_flag is 0, it indicates that the quantization matrix is not present and thus all quantization matrices are determined as default quantization matrices. When a value of scaling_list_present_flag is 1, it indicates that a coded quantization matrix is present.

Furthermore, the decoder can decode information about a method of predicting and decoding the quantization matrix from the parameter set and can determine the type of prediction decoding method for the quantization matrix based on the decoded information. Here, the parameter set from which the information about the prediction decoding method is decoded can be an adaptation parameter set.

More particularly, as in the examples of Tables 33 and 34, the decoder can decode scaling_list_pred_mode_flag, that is, information about a method of predicting and decoding the quantization matrix, from a parameter set. For example, when a value of scaling_list_pred_mode_flag is 1, the decoder can predict and decode a coefficient within the quantization matrix by decoding the quantization matrix in accordance with the exponential Golomb coding and inverse-DPCM methods through scanning. When a value of scaling_list_pred_mode_flag is 0, the decoder can determine the coefficient values of a quantization matrix to be decoded so that they have the same values as the coefficient values of a reference quantization matrix. Here, to determine the values so that they have the same values can mean that a quantization matrix prediction method of copying the coefficient values of the reference quantization matrix to the coefficient values of the quantization matrix to be decoded is used.

If a value of scaling_list_pred_mode_flag is 0, the decoder can decode the reference quantization matrix ID of a quantization matrix to be decoded from a parameter set. Here, ID information (identifier) about the reference quantization matrix can include one or more of the size of the reference quantization matrix of a quantization matrix to be decoded and the reference quantization matrix. Furthermore, the parameter set from which the reference quantization matrix ID is decoded can be an adaptation parameter set.

For example, as in the example of Table 33, the decoder can decode scaling_list_pred_size_matrix_id_delta, that is, ID information about the reference quantization matrix of the quantization matrix to be decoded, from a parameter set. Here, RefSizeID, that is, the size of the reference quantization matrix of the quantization matrix to be decoded, and RefMatrixID indicating the reference quantization matrix can be determined by using scaling_list_pred_size_matrix_id_delta and Equation 26.

RetSizeID=sizeID–(scaling_list_pred_size_matrix_id_delta/6)

RefMatrixID=scaling_list_pred_size_matrix_id_delta % 6  <Equation 26>

Furthermore, as in the example of Table 34, the decoder can decode scaling_list_pred_size_id_delta and scaling_list_pred_size_matrix_id_delta, that is, ID information about the reference quantization matrix of the quantization matrix to be decoded, from a parameter set Here, RelSizeID can be determined by using a value of scaling_list_pred_size_id_delta and Equation 27, and RefMatrixID indicating the reference quantization matrix of the quantization matrix to be decoded can be determined by using scaling_list_pred_matrix_id_delta and Equation 28.

RefSizeID=sizeID–scaling_list_pred_size_id_delta  <Equation 27>

RefMatrixID=matrixID–scaling_list_pred_matrix_id_delta  <Equation 28>

The coefficient values of a quantization matrix to be decoded can be likewise determined from the coefficient values of a reference quantization matrix whose sizeID is equal to RefSizeID and matrixID is equal to RefMatrixID. That is, the decoder can copy the reference quantization matrix to the quantization matrix to be decoded. To determine the coefficient values of a quantization matrix to be decoded so that they have the same values as the coefficient values of a reference quantization matrix can mean that a quantization matrix prediction method of determining a reference quantization matrix, corresponding to RefSizeID and RefMatrixID, as the reference quantization matrix of the quantization matrix to be decoded and copying the coefficient values of the reference quantization matrix to the coefficient values of the quantization matrix to be decoded is used.

Through the examples of Tables 33 and 34, a quantization matrix can be predicted from a quantization matrix having the same sizeID, and the quantization matrix can also be predicted from a quantization matrix having the same matrix size when coding/decoding are performed, but having a different sizeID.

Furthermore, in the examples of Tables 33 and 34, a value of scaling_list_pred_size_matrix_id_delta, a value of scaling_list_pred_size_id_delta, and a value of scaling_list_pred_matrix_id_delta may be limited to a value of a specific range. For example, scaling_list_pred_size_matrix_id_delta may be limited to a value ranging from 0 to 17, scaling_list_pred_size_id_delta may be limited to a value ranging from 0 to 2, and scaling_list_pred_matrix_id_delta may be limited to a value ranging from 0 to 5.

Furthermore, in the examples of Tables 33 and 34, the decoder may not predict a quantization matrix to be decoded from a quantization matrix having a greater size than the quantization matrix to be decoded.

Furthermore, in the examples of Tables 33 and 34, when predicting a quantization matrix to be decoded from a quantization matrix having an 8×8 size, the decoder can predict a value at a corresponding location by determining a value, corresponding to the location of a DC matrix coefficient within the 8×8-size quantization matrix, as the DC matrix coefficient. Furthermore, when predicting a quantization matrix to be decoded from a quantization matrix having a 16×16 or 32×32 size, the decoder can also predict a DC matrix coefficient.

Meanwhile, if a method of predicting and decoding a quantization matrix is a method of decoding the quantization matrix in accordance with the exponential Golomb coding and inverse-DPCM methods through scanning in order to predict and decode a coefficient within the quantization matrix, the decoder can decode a difference value between the coefficient value of a quantization matrix that has been previously decoded within a quantization matrix and the coefficient value of a quantization matrix to be decoded from a parameter set. Here, the parameter set from which the difference value is decoded can be an adaptation parameter set.

More particularly, as in the example of Table 35, if the size of a quantization matrix to be decoded is 16×16 (sizeID=2) or 32×32 (sizeID=3), the decoder can decode scaling_list_dc_coef_minus8, that is, a DC matrix coefficient, from a parameter set.

Furthermore, as in the example of Table 35, the decoder can decode scaling_list_delta_coef, that is, a difference value between the coefficient value of a quantization matrix that has been previously decoded within the quantization matrix and the coefficient value of the quantization matrix to be decoded, from a parameter set.

Furthermore, the decoder can determine whether a default matrix has been used or not by using scaling_list_delta_coef that is used to calculate scaling_list_dc_coef_minus8 or nextCoef. That is, if a value of scaling_list_dc_coef_minus8 is decoded as −8, a corresponding quantization matrix can be determined as a default matrix. If a value of the first nextCoef calculated by decoding scaling_list_delta_coef is 0, a corresponding quantization matrix can be determined as a default matrix.

As described above in an example of the coder, in conventional quantization matrix coding/decoding methods, the degree of complexity in a process of coding/decoding the coefficient value of a quantization matrix is increased because whether a default matrix has been used or not is determined using the coefficient value of the quantization matrix. Furthermore, a quantization matrix is copied from a limited number of quantization matrices because the quantization matrix is copied using the size of the quantization matrix when quantization and dequantization are performed not the size of the quantization matrix when coding/decoding are performed. In the present invention, however, the degree of complexity of calculation when coding/decoding a quantization matrix can be reduced by determining whether a default matrix has been used or not based on a reference quantization matrix ID. Furthermore, in the present invention, coding efficiency can be improved and the degree of freedom in predicting a quantization matrix can be increased by predicting a quantization matrix from a quantization matrix having the same size as a quantization matrix when coding/decoding are performed.

More particularly, the decoder can decode information indicative of whether a quantization matrix is present or not from a parameter set. As in the examples Tables 36 and 37, the decoder can decode scaling_list_present_flag, that is, information indicating whether a quantization matrix is present or not within a bit stream, from a parameter set. For example, when a value of scaling_list_present_flag is 0, it indicates that the quantization matrix is not present and thus all quantization matrices can be determined as default quantization matrices. When a value of scaling_list_present_flag is 1, it indicates that a coded quantization matrix is present.

The decoder can decode information about a method of predicting and decoding a quantization matrix from a parameter set and can determine the type of method of predicting and decoding a quantization matrix based on the decoded information. Here, the decoded parameter set can be an adaptation parameter set.

As in the examples of Tables 36 and 37, the decoder can decode scaling_list_pred_mode_flag, that is, information about a method of predicting and decoding a quantization matrix, from a parameter set Here, when a value of scaling_list_pred_mode_flag is 1, the decoder can decode a quantization matrix in accordance with the exponential Golomb coding and inverse-DPCM methods through scanning in order to predict and decode a coefficient within the quantization matrix. When a value of scaling_list_pred_mode_flag is 0, the decoder can determine the coefficient values of a quantization matrix to be decoded so that they have the same values as the coefficient values of a reference quantization matrix or determine the coefficient values of a quantization matrix to be decoded so that they have the same values as the coefficient values of a default matrix. Here, to determine the values so that they have the same values can mean that a quantization matrix prediction method of copying the coefficient values of a specific quantization matrix to the coefficient values of a quantization matrix to be decoded is used.

If a value of scaling_list_pred_mode_flag is 0, the decoder can decode the reference quantization matrix ID of a quantization matrix to be decoded and information about whether a default matrix has been used or not from a parameter set. Here, ID information (identifier) about the reference quantization matrix can include one or more of the size of the reference quantization matrix of the quantization matrix to be decoded and the reference quantization matrix. Furthermore, the decoded parameter set can be an adaptation parameter set.

For example, as in the example of Table 36, the decoder can decode scaling_list_pred_size_matrix_id_delta, that is, the reference quantization matrix ID of a quantization matrix to be decoded and information about whether a default matrix has been used or not, from a parameter set. Here, RefSizeID and RefMatrixID indicating the reference quantization matrix can be determined by using scaling_list_pred_size_matrix_id_delta and Equation 29.

RefSizeID=sizeID−(scaling_list_pred_size_matrix_id_delta/6)

RefMatrixID=scaling_list_pred_size_matrix_id_delta % 6     <Equation 29>

Furthermore, as in the example of Table 37, the decoder may decode scaling_list_pred_size_id_delta and scaling_list_pred_size_matrix_id_delta, that is, the reference quantization matrix ID of a quantization matrix to be decoded and information about whether a default matrix has been used or not, from a parameter set. Here, RefSizeID can be determined using a value of scaling_list_pred_size_id_delta and Equation 30, and RefMatrixID indicating the reference quantization matrix or default matrix of a quantization matrix to be decoded can be determined using a value of scaling_list_pred_matrix_id_delta and Equation 31.

RefSizeID=sizeID−scaling_list_pred_size_id_delta     <Equation 30>

RefMatrixID=matrixID−scaling_list_pred_matrix_id_delta     <Equation 31>

If a value of RefMatrixID is identical with a value of matrixID, the coefficient values of a quantization matrix to be decoded, corresponding to sizeID and matrixID, can be determined to be identical with the coefficient values of a default matrix defined in the coder and/or the decoder. Here, the default matrix refers to a default matrix corresponding to sizeID and matrixID. Furthermore, in Equation 31, when a value of scaling_list_pred_matrix_id_delta is 0, it means that a value of RefMatrixID is equal to a value of matrixID.

If a value of RefMatrixID is not identical with a value of matrixID, a quantization matrix corresponding to RefSizeID and RefMatrixID is determined as the reference quantization matrix of a quantization matrix to be decoded and the coefficient values of the quantization matrix to be decoded can be determined to be identical with the coefficient values of the reference quantization matrix. To determine the coefficient values of a quantization matrix to be decoded to be identical with the coefficient values of a reference quantization matrix can mean that a quantization matrix prediction method of determining a reference quantization matrix, corresponding to RefSizeID and RefMatrixID, as the reference quantization matrix of the quantization matrix to be decoded and copying the coefficient values of the reference quantization matrix to the coefficient values of the quantization matrix to be decoded is used.

In accordance with the example of Table 36 or 37, a quantization matrix can be predicted from a quantization matrix having the same sizeID, and a quantization matrix can also be predicted from a quantization matrix having the same matrix size when coding/decoding are performed, but having a different sizeID.

Furthermore, in the example of Table 36 or 37, a value of scaling_list_pred_size_matrix_id_delta, a value of scaling_list_pred_size_id_delta, and a value of scaling_list_pred_matrix_id_delta can be limited to a measurable range. For example, scaling_list_pred_size_matrix_id_delta can be limited to a value ranging from 0 to 17, scaling_list_pred_size_id_delta can be limited to a value ranging from 0 to 2, and scaling_list_pred_matrix_id_delta can be limited to a value ranging from 0 to 5.

Furthermore, in the example of Table 36 or 37, the decoder may not predict a quantization matrix from a quantization matrix having a greater size than a quantization matrix to be decoded.

Furthermore, when performing prediction from a quantization matrix having an 8×8 size, the decoder can predict a value at a corresponding location by determining a value, corresponding to the location of a DC matrix coefficient within the 8×8-size quantization matrix, as the DC matrix coefficient. Furthermore, when performing prediction from a 16×16-size quantization matrix or a 32×32-size quantization matrix, the decoder can also predict a DC matrix coefficient.

Meanwhile, if a method of predicting and decoding a quantization matrix is a method of decoding the quantization matrix in accordance with the exponential Golomb coding and inverse-DPCM methods through scanning in order to predict and decode a coefficient within the quantization matrix, the decoder can decode a difference value between the coefficient value of a quantization matrix that has been previously decoded within the quantization matrix and the coefficient value of a quantization matrix to be decoded from a parameter set. Here, the parameter set from which the difference value is decoded can be an adaptation parameter set.

As in the example of Table 38, if the size of a quantization matrix to be decoded is 16×16 (sizeID=2) or 32×32 (sizeID=3), the decoder can decode scaling_list_dc_coef_minus8, that is, a DC matrix coefficient, from a parameter set.

As in the example of Table 38, the decoder can decode scaling_list_delta_coef, that is, a difference value between the coefficient value of a quantization matrix that has been previously decoded within the quantization matrix and the coefficient value of the quantization matrix to be decoded, from a parameter set.

As described above in an example related to the coder, in conventional quantization matrix coding/decoding methods, the improvement of coding efficiency is limited because the coefficient value of a quantization matrix is coded by not taking a coefficient value that frequently occurs into consideration when coding/decoding a first coefficient within the quantization matrix. In the present invention, however, coding efficiency can be improved because a first coefficient within a quantization matrix can be predicted and coded/decoded using a coefficient value that frequently occurs. If the first coefficient value or DC matrix coefficient value of a default matrix is defined as 16 and the first coefficient value or DC matrix coefficient value of a non-default matrix is distributed on the basis of 16, coding efficiency can be improved if a first coefficient value or a DC matrix coefficient value within a quantization matrix to be coded/decoded is coded/decoded by predicting the first coefficient value or the DC matrix coefficient value from the constant 16.

More particularly, the decoder can decode information indicative of whether a quantization matrix is present or not from a parameter set. As in the example of Table 39, the decoder can decode scaling_list_present_flag, that is, information indicating whether a quantization matrix is present or not within a bit stream, from a parameter set. For example, when a value of scaling_list_present_flag is 0, it indicates that the quantization matrix is not present and thus all quantization matrices can be determined as default quantization matrices. When a value of scaling_list_present_flag is 1, it indicates that a coded quantization matrix is present.

Furthermore, the decoder can decode information about a method of predicting and decoding a quantization matrix from a parameter set and can determine the type of prediction decoding method for the quantization matrix based on the decoded information. Here, the parameter set from which the information about the prediction coding method is decoded can be an adaptation parameter set.

As in the example of Table 39, the decoder can decode scaling_list_pred_mode_flag, that is, information about a method of predicting and decoding a quantization matrix, from a parameter set. Here, when a value of scaling_list_pred_mode_flag is 1, the decoder decodes the quantization matrix in accordance with the exponential Golomb coding and inverse-DPCM methods through scanning in order to predict and decode a coefficient within the quantization matrix. When a value of scaling_list_pred_mode_flag is 0, the decoder determines the coefficient values of a quantization matrix to be decoded so that they have the same values as the coefficient values of a reference quantization matrix. Here, to determine the values so that they have the same values can mean that a quantization matrix prediction method of copying the coefficient values of the reference quantization matrix to the coefficient values of the quantization matrix to be decoded is used.

If a value of scaling_list_pred_mode_flag is 0, the decoder can decode the reference quantization matrix ID of a quantization matrix to be decoded from a parameter set. Here, the parameter set from which the reference quantization matrix ID is decoded can be an adaptation parameter set.

Furthermore, as in the example of Table 39, the decoder may decode scaling_list_pred_matrix_id_delta, that is, the reference quantization matrix ID of a quantization matrix to be decoded, from a parameter set. Here, RefMatrixID indicating the reference quantization matrix of a quantization matrix to be decoded can be determined by using scaling_list_pred_matrix_id_delta and Equation 32.

$$\text{RefMatrixID} = \text{matrixID} - (1 + \text{scaling\_list\_pred\_matrix\_id\_delta}) \qquad \text{<Equation 32>}$$

The decoder can determine a quantization matrix, corresponding to RefMatrixID, as the reference quantization matrix of a quantization matrix to be decoded and determine the coefficient values of the quantization matrix to be decoded so that they have the same values as the coefficient values of the reference quantization matrix. To determine the coefficient values of a quantization matrix to be decoded so that they have the same values as the coefficient values of a reference quantization matrix can mean that a quantization matrix prediction method of determining a reference quantization matrix, corresponding to RefMatrixID, as the reference quantization matrix of the quantization matrix to be decoded and copying the coefficient values of the reference quantization matrix to the coefficient values of the quantization matrix to be decoded is used. Here, a value of scaling_list_pred_matrix_id_delta can be a positive interger value.

If a method of predicting and decoding the decoded quantization matrix is a method of decoding the quantization matrix in accordance with the exponential Golomb coding and inverse-DPCM methods through scanning in order to predict and decode a coefficient within the quantization matrix, the decoder can decode a difference value between the coefficient value of a quantization matrix that has been previously decoded within the quantization matrix and the coefficient value of a quantization matrix to be decoded from a parameter set. Here, the parameter set from which the difference value is decoded can be an adaptation parameter set.

As in the example of Table 40, the decoder can decode scaling_list_delta_coef, that is, a difference value between the coefficient value of a quantization matrix that has been previously decoded within the quantization matrix and the coefficient value of the quantization matrix to be decoded, from a parameter set. Here, the decoder may set a prediction value for the first coefficient value to 16 as in nextCoef=16.

Furthermore, as in the example of Table 40, if the size of the quantization matrix to be decoded is 16×16 (sizeID=2) or 32×32 (sizeID=3), the decoder can decode scaling_list_dc_coef_minus16, that is, the coefficient value of a quantization matrix corresponding to a DC matrix coefficient, from a parameter set. A value of scaling_list_dc_coef_minus16 means a DC matrix coefficient calculated assuming that a prediction value is 16.

Furthermore, the decoder can determine whether a default matrix has been used or not by using scaling_list_delta_coef that is used to calculate scaling_list_dc_coef_minus16 or nextCoef. For example, if a value of scaling_list_dc_coef_minus16 is decoded as −16, a corresponding quantization matrix can be determined as a default matrix. If a value of the first nextCoef value calculated by decoding scaling_list_delta_coef is 0, a corresponding quantization matrix can be determined as a default matrix.

In the examples of the tables as well as the examples of Tables 39 and 40, nextCoef can be set to 16 and a value of scaling_list_dc_coef_minus16 can mean a DC matrix coefficient calculated assuming that a prediction value is 16. If a value of scaling_list_dc_coef_minus16 is decoded as −16, the decoder can determine a corresponding quantization matrix as a default matrix.

The embodiments regarding the coding/decoding and transmission/reception of information about a quantization matrix in accordance with the present invention have been described so far with reference to the tables and figures.

In the examples of Tables 18 and 19, the examples of Tables 20 and 21, the examples of Tables 23 and 24, the examples of Tables 25 and 26, the examples of Tables 27 and 28, the examples of Tables 29 and 30, the examples of Tables 31 and 32, the examples of Tables 33 and 34, the examples of Tables 36 and 38, the examples of Tables 37 and 38, and the examples of Tables 39 and 40, the examples of the syntax structures in accordance with the present invention have been described with reference to two tables, but this is only for convenience of description and the present invention is not limited to the examples.

For example, in the examples of the syntax structures, scaling_list_pred_mode_flag is illustrated to indicate a method of predicting a quantization matrix. When a value of scaling_list_pred_mode_flag is 0, the quantization matrix is obtained through matrix copying and when a value of scaling_list_pred_mode_flag is 1, the quantization matrix is obtained by predicting a matrix coefficient from a previous matrix coefficient within the quantization matrix.

For example, in the examples of Tables 23 and 24, when a value of scaling_list_pred_mode_flag is 1, a quantization matrix is obtained by fetching the syntax of the quantization matrix, that is, the syntax of a scaling list 'scaling_list', but this can be solved in a single syntax structure. It is to be noted that to construct two or more syntax structures by using one syntax structure having the same meaning does not change the contents of the invention, but falls within the scope of the present invention.

Table 41 shows an example in which the two syntax structures of Tables 23 and 24 are formed into one syntax structure. Like in the examples of Tables 23 and 24, the coder can code information about the quantization matrix of Table 41 into a parameter set including at least one of a sequence parameter set and a picture parameter set, and the decoder can decode information about the quantization matrix of Table 41 from a parameter set including at least one of a sequence parameter set and a picture parameter set

TABLE 41

| | Descriptor |
|---|---|
| scaling_list_param ( ) { | |
|   for( sizeId = 0; sizeId < 4; sizeId++ ) | |
|     for( matrixId = 0; matrixId < ( sizeId = = 3 ) ? 2 : 6; matrixId++ ) { | |
|       scaling_list_pred_mode_flag[ sizeId ][ matrixId ] | u(1) |
|       if( !scaling_list_pred_mode_flag[ sizeId ][ matrixId ] ) | |
|         scaling_list_pred_matrix_id_delta[ sizeId ][ matrixId ] | ue(v) |
|       else { | |
|         nextCoef = 8 | |
|         coefNum = Min( 64, ( 1 << ( 4 + ( sizeId << 1) ) ) ) | |
|         if( sizeId > 1 ) { | |
|           scaling_list_dc_coef_minus8[ sizeId − 2 ][ matrixId ] | se(v) |
|           nextCoef = | |
|             scaling_list_dc_coef_minus8[ sizeId − 2 ][ matrixId ] + 8 | |
|         } | |
|         for( i = 0; i < coefNum; i++) { | |
|           scaling_list_delta_coef | se(v) |
|           nextCoef = | |
|             ( nextCoef + scaling_list_delta_coef + 256 ) % 256 | |
|           ScalingList[ sizeId ][ matrixId ][ i ] = nextCoef | |
|         } | |
|       } | |
|     } | |
| } | |

As described above, the examples of Tables 23 and 24 and the example of Table 41 are the same except that the number of syntax structures is two or one.

As in the example of Table 41, the coder can indicate prediction mode of a matrix through scaling_list_pred_mode_flag. For example, when copying between quantization matrices is performed, a value of scaling_list_pred_mode_flag is determined as 0 and coded. When the coefficient of a matrix is predicted and coded within a quantization matrix, a value of scaling_list_pred_mode_flag is determined as 1 and coded. The copying of a quantization matrix, as described above, means that a default quantization matrix is used as a quantization matrix to be coded or a reference quantization matrix is used as a quantization matrix to be coded. A method of predicting the coefficient of a matrix, as described above, means a method of predicting and coding a coefficient within a quantization matrix.

If the copying of a quantization matrix is performed (scaling_list_pred_mode_flag==0), scaling_list_pred_matrix_id_delta is transmitted. As described above, scaling_list_pred_matrix_id_delta specifies a reference quantization matrix or a default quantization matrix that is used to derive a quantization matrix to be currently coded.

For example, if a quantization matrix to be coded is determined as a default quantization matrix, a value of scaling_list_pred_matrix_id_delta can be determined as 0 and coded. That is, this corresponds to a case where a quantization matrix to be currently coded is inferred from among default quantization matrices. A default quantization matrix can be specified by Tables 7 and 8.

If a quantization matrix to be currently coded is determined from a reference quantization matrix, a value of scaling_list_pred_matrix_id_delta can be determined as a value not 0 and coded. That is, this corresponds to a case where a quantization matrix to be currently coded, that is, ScalingList, is determined from a reference quantization matrix as in Equation 33.

RefMatrixID=matrixID−scaling_list_pred_matrix_id_delta[sizeID][matrixID]

ScalingList[sizeID][matrixID][i]=ScalingList[sizeID][RefMatrixId][i]  <Equation 33>

In Equation 33, a value of scaling_list_pred_matrix_id_delta is specified by sizeID and matrixID, and an index 'i' specifies the location of a coefficient within a quantization matrix.

If prediction and coding are performed within a quantization matrix (scaling_list_pred_mode_flag=1), matrix coefficients for a quantization matrix having a 4×4 size, matrix coefficients for a quantization matrix having an 8×8 size, matrix coefficients for a quantization matrix having a 16×16 size including a DC matrix coefficient, and matrix coefficients for a quantization matrix having a 32×32 size including a DC matrix coefficient can be coded. Here, the total number of coded matrix coefficients can be calculated using coefNum=Min(64, (1<<(4+(sizeId<<1)))). Furthermore, each of the 16×16-size quantization matrix and the 32×32-size quantization matrix can be down-sampled to an 8×8-size quantization matrix and coded.

The decoder can decode the syntax elements of Table 41 from a bit stream, perform dequantization on the decoded syntax elements, and reconstruct an image using the results.

As in the example of Table 41, the decoder can determine prediction mode of a matrix as indicated by received scaling_list_pred_mode_flag. For example, when a value of scaling_list_pred_mode_flag is 0, the decoder can perform copying between quantization matrices. When a value of scaling_list_pred_mode_flag is 1, the decoder can predict a matrix coefficient within a quantization matrix. Accordingly, the decoder can obtain an (inverse) quantization matrix to be used in dequantization. It is to be noted that in this specification, both a quantization matrix to be coded that is applied in the case of quantization and a quantization matrix to be decoded that is applied in the case of dequantization are called quantization matrices, but this is only for convenience of description. A matrix applied to quantization and a matrix applied to dequantization can have an inverse relation, and a quantization matrix used in dequantization may be called a scaling list.

The copying of a quantization matrix, as described above, means that a default quantization matrix is determined as a quantization matrix to be decoded or a reference quantization matrix is determined as a quantization matrix to be decoded. A method of predicting the coefficient of a matrix, as described above, means a method of predicting and decoding a coefficient within a quantization matrix.

If the copying of a quantization matrix is performed (scaling_list_pred_mode_flag=), the decoder specifies a reference quantization matrix or a default quantization matrix that is used to derive a quantization matrix to be currently decoded.

For example, when a value of scaling_list_pred_matrix_id_delta is 0, the decoder can determine a quantization matrix to be decoded as a default quantization matrix. That is, a quantization matrix to be currently decoded can be inferred from among default quantization matrices. A default quantization matrix can be specified by Tables 7 and 8.

When a value of scaling_list_pred_matrix_id_delta is not 0, the decoder can determine a quantization matrix to be currently decoded from a reference quantization matrix. That is, a quantization matrix to be currently decoded, that is, ScalingList, can be determined from a reference quantization matrix as in Equation 34.

RefMatrixID=matrixID−scaling_list_pred_matrix_id_delta[sizeID][matrixID]

ScalingList[sizeID][matrixID][i]=ScalingList[sizeID][RefMatrixId][i]     <Equation 34>

In Equation 34, a value of scaling_list_pred_matrix_id_delta is specified by sizeID and matrixID, and an index 'i' specifies the location of a coefficient within a quantization matrix.

If prediction and decoding within a quantization matrix are performed (scaling_list_pred_mode_flag=1), the decoder can decode matrix coefficients for a quantization matrix having a 4×4 size, matrix coefficients for a quantization matrix having an 8×8 size, matrix coefficients for a quantization matrix having a 16×16 size including a DC matrix coefficient, and matrix coefficients for a quantization matrix having a 32×32 size including a DC matrix coefficient. Here, the total number of decoded matrix coefficients can be calculated using coefNum=Min(64, (1<<(4+(sizeId<<1)))). Here, since each of the 16×16-size quantization matrix and the 32×32-size quantization matrix is down-sampled to an 8×8-size quantization matrix when the 16×16-size quantization matrix and the 32×32-size quantization matrix are coded, the 8×8-size quantization matrix can be restored to the 16×16-size quantization matrix and the 32×32-size quantization matrix by upsampling or interpolating the 8×8-size quantization matrix. Furthermore, if upsampling or interpolation is used, a DC matrix coefficient does not use an interpolated value, but can be replaced with a value derived from an additionally signaled value, such as scaling_list_dc_coef_minus8.

The examples of the syntax structures and the examples of coding and decoding using the syntax structures have been described so far with reference to the tables. In the aforementioned examples, the examples of coding and the examples of decoding have been described using the syntax structures, but the present invention is not limited thereto. For example, the tables of the syntax structures may be used only in coding or decoding.

Figure 6:
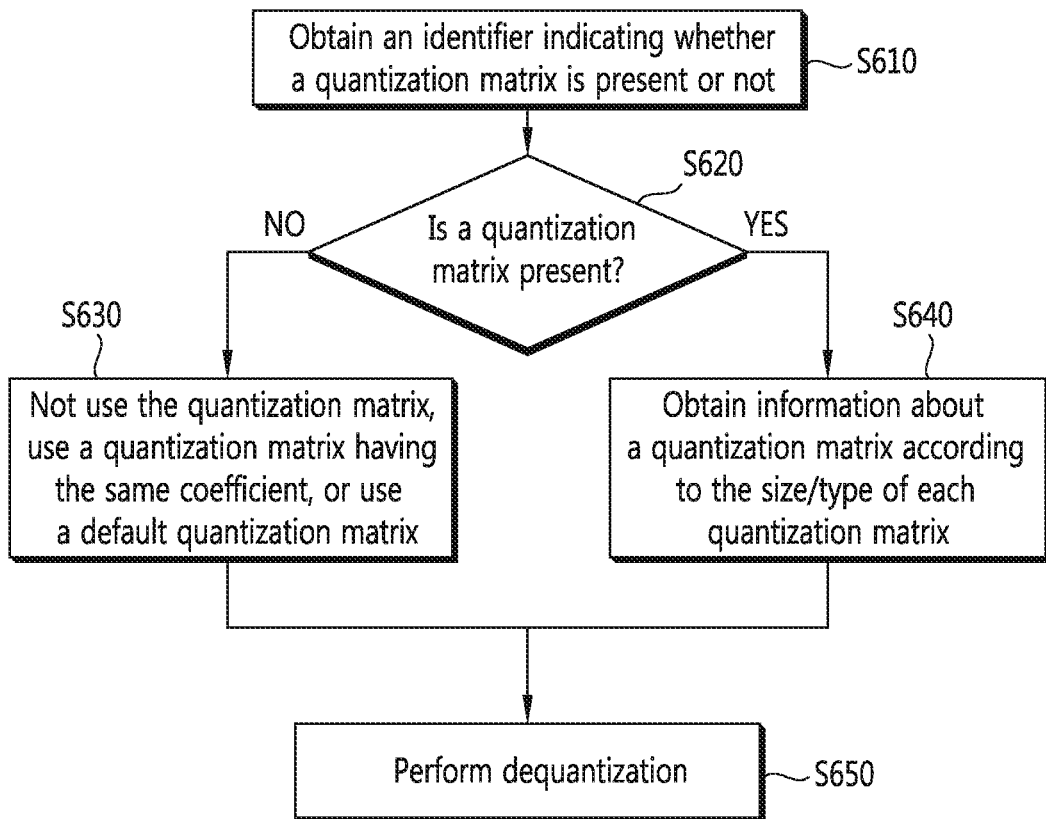
FIG. 6 is a flowchart schematically illustrating an example of a method of performing dequantization in accordance with the present invention.

FIG. 6 is a flowchart schematically illustrating an example of a method of performing dequantization in accordance with the present invention.

Referring to FIG. 6, the decoder can obtain an identifier indicating whether a quantization matrix is present or not in a parameter set at step S610. Information indicating whether the quantization matrix is present or not in the parameter set can be scaling_list_present_flag in the examples of the aforementioned tables.

Here, the presence of the quantization matrix in the parameter set includes that information (e.g., scaling_list_pred_mode_flag, scaling_list_pred_matrix_id_delta, scaling_list_dc_coef_minus8, and scaling_list_delta_coef) about the quantization matrix is present in the parameter set. Furthermore, before obtaining the identifier indicating whether the quantization matrix is present or not, scaling_list_enable_flag, that is, an identifier indicating whether the quantization matrix is used or not, can be obtained. If a quantization matrix is used by obtaining scaling_list_enable_flag, an identifier indicating whether the quantization matrix is present or not can be obtained.

Here, the parameter set can be a sequence parameter set or a picture parameter set through which the information about the quantization matrix is transmitted.

The decoder can determine whether the quantization matrix is present or not in the parameter set based on the identifier at step S620. For example, when a value of scaling_list_present_flag is 1, the decoder can determine that the quantization matrix is present in the parameter set.

When a value of scaling_list_present_flag is 0, the decoder can determine that the quantization matrix is not present in the parameter set.

If, as a result of the determination, the quantization matrix is not present in the parameter set (i.e., if the quantization matrix is determined not to be present in the parameter set), the decoder may not use the quantization matrix in dequantization, may use a quantization matrix (i.e., a flat matrix) having the same matrix coefficients of 16 in dequantization, or may determine all quantization matrices as default quantization matrices in dequantization at step S630.

If, as a result of the determination, the quantization matrix is present in the parameter set (i.e., if the quantization matrix is determined to be present in the parameter set), the decoder can obtain information about the quantization matrix according to the size of each quantization matrix or the type of quantization matrix at step S640. Here, the type of quantization matrix can include at least one of a quantization matrix for the dequantization of a transform coefficient for an intra residual block, a quantization matrix for the dequantization of a transform coefficient for an inter residual block, a quantization matrix for the dequantization of a transform coefficient for a luma residual block, and a quantization matrix for the dequantization of a transform coefficient for a chroma residual block or a combination of them.

The decoder can perform dequantization by using the obtained quantization matrix at step S650. If the quantization matrix is not present in the parameter set, the decoder can perform dequantization without using the quantization matrix as determined at the step S630 or can perform dequantization so that a quantization matrix (i.e., a flat matrix) having the same matrix coefficients of 16 is performed in dequantization or all quantization matrices are used as default quantization matrices in dequantization. The prediction of the coefficient of a quantization matrix and the use of a default quantization matrix have been described above in connection with the aforementioned embodiments. If the quantization matrix is present in the parameter set, the decoder can obtain the corresponding quantization matrix and use the obtained quantization matrix in dequantization. The decoder can reconstruct an image based on an inversely quantized signal as described above with reference to FIG. 2.

Meanwhile, in FIG. 6, an example in which an identifier indicating whether a quantization matrix is present or not is transmitted by a coder has been illustrated, but this is only an example of the invention. As described above, if information about a quantization matrix is transmitted, information indicating whether the quantization matrix is present or not may not be additionally transmitted.

Figure 7:
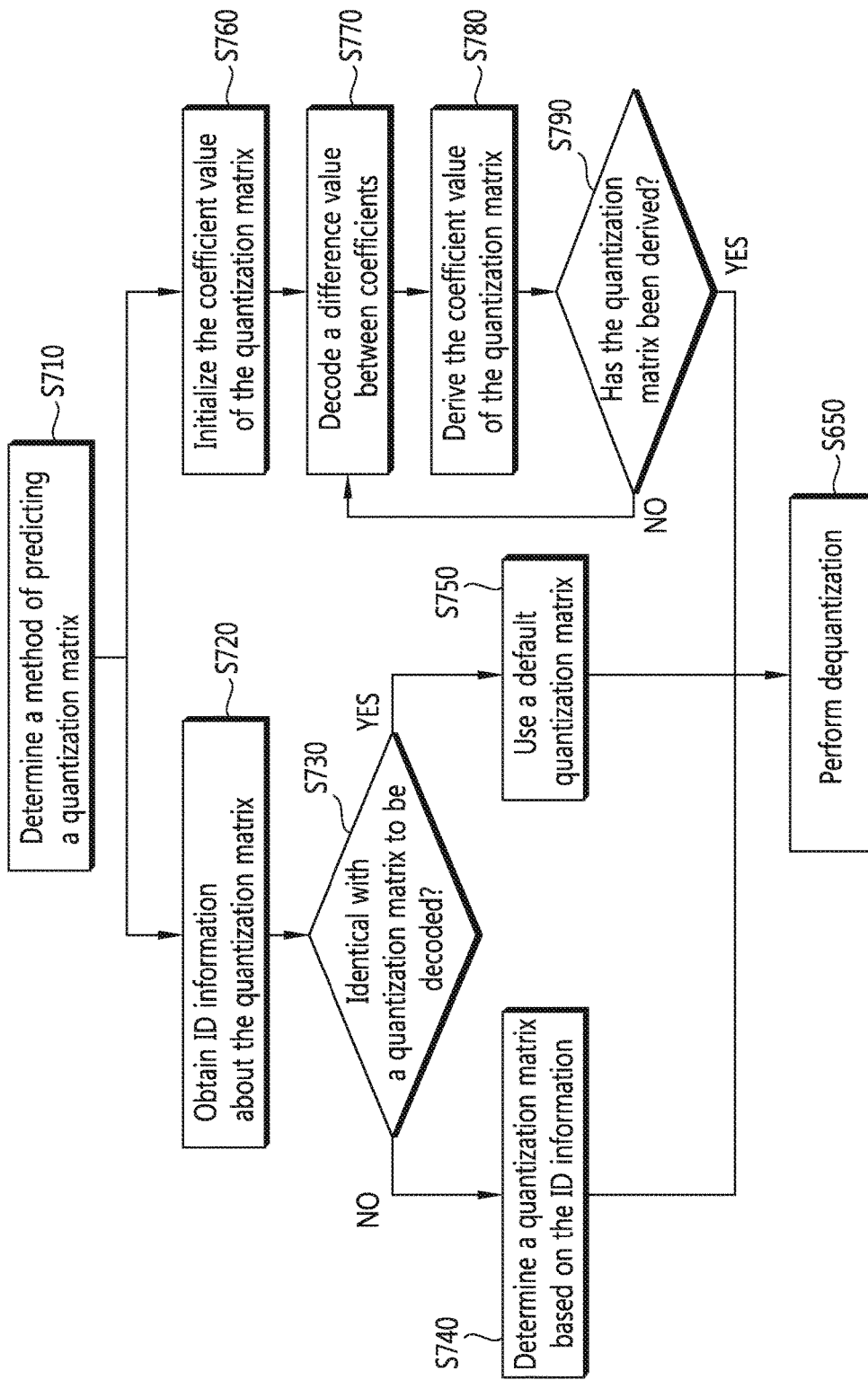
FIG. 7 is a diagram schematically illustrating an example of a method of obtaining information about a quantization matrix when a quantization matrix is present in a parameter set and performing dequantization by using the information.

FIG. 7 is a diagram schematically illustrating an example of a method of obtaining information about a quantization matrix when a quantization matrix is present in a parameter set and performing dequantization by using the information. The method of FIG. 7 may correspond to (1) a method including the steps S640 and S650 of FIG. 6 and (2) a method of obtaining a quantization matrix and performing dequantization using the obtained quantization matrix although an additional identifier indicating whether a quantization matrix is present or not is not transmitted, but the quantization matrix is present in a parameter set and information about the quantization matrix is transmitted by the coder. The method (I) is the same as the method (2) other than information about whether the quantization matrix is present or not is transmitted through the additional identifier or not. In FIG. 7, the decoder can decode information about a quantization matrix from a parameter set including at least one of a sequence parameter set and a picture parameter set.

In the example of FIG. 7, in order to reduce the degree of complexity when coding/decoding a quantization matrix, if an ID value of a reference quantization matrix for predicting a quantization matrix to be decoded is identical with an ID value of the quantization matrix to be decoded, the decoder does not decode the quantization matrix to be decoded, but can use a quantization matrix already included in the decoder when performing dequantization. Here, the quantization matrix already included in the decoder can be a default quantization matrix.

More particularly, referring to FIG. 7, if a quantization matrix is present in a parameter set, the decoder can determine a method of predicting the quantization matrix at step S710. The presence of the quantization matrix in the parameter set includes the presence of information (e.g., scaling_list_pred_mode_flag, scaling_list_pred_matrix_id_delta, scaling_list_dc_coef_minus8, and scaling_list_delta_coef) about the quantization matrix in the parameter set.

Referring to the aforementioned examples, the method of predicting the quantization matrix can be determined based on a value of the syntax element 'pred_mode_flag' received from the coder. In order to clarify that the prediction method is for the quantization matrix, pred_mode_flag may be represented as scaling_list_pred_mode_flag like in the aforementioned examples. A method of predicting the quantization matrix, indicated by pred_mode_flag, can be any one of (1) a method of using a quantization matrix already included in the decoder without change and (2) a method of receiving a value of the quantization matrix and performing inverse DPCM between the coefficient values of quantization matrix within the quantization matrix.

For example, when a value of pred_mode_flag is 0, the decoder can use a quantization matrix (i.e., an already decoded quantization matrix (or reference matrix) or default matrix) already included therein. When a value of pred_mode_flag is 1, the decoder can predict and decode a coefficient within the quantization matrix based on received information.

If a method of predicting the quantization matrix is a method of using a quantization matrix already included in the decoder without change, the decoder can obtain ID information about the quantization matrix at step S720. The ID information of the quantization matrix is information on which the quantization matrix already included in the decoder can be identified, and the ID information can correspond to scaling_list_pred_matrix_id_delta, pred_matrix_id_delta, etc. which have been described in the aforementioned examples.

The decoder can determine whether the quantization matrix specified by the ID information is identical with a quantization matrix to be currently decoded or not at step S730, pred_matrix_id_delta specifies a reference quantization matrix that is used to derive the quantization matrix. In order to clarify that pred_matrix_id_delta is for the quantization matrix, pred_matrix_id_delta may be represented as scaling_list_pred_matrix_id_delta as in the aforementioned examples.

When a value of scaling_list_pred_matrix_id_delta is 0, the decoder can use a default quantization matrix, specified by information (SizeID and/or MatrixID) about the quantization matrix, as the quantization matrix to be decoded.

When a value of scaling_list_pred_matrix_id_delta is not 0, the decoder can derive the quantization matrix to be decoded from an already decoded reference quantization matrix because matrixID specifying the quantization matrix to be decoded (or the type of quantization matrix) and RefMatrixID specifying the reference quantization matrix have a relation 'scaling_list_pred_matrix_id_delta=matrixID-RefMatrixID' with reference to the aforementioned examples.

If, as a result of the determination at step S730, the quantization matrix specified by the ID information of the quantization matrix is determined not to be identical with the quantization matrix to be decoded (i.e., !scaling_list_pred_matrix_id_delta=0 or matrixID!=RefMatrixID), the decoder can determine a quantization matrix that will be used when dequantization is performed by using the ID information of the quantization matrix at step S740. In this case, the decoder can determine a quantization matrix to be used when dequantization is performed as in the aforementioned tables based on the ID information 'scaling_list_pred_matrix_id_delta' of the quantization matrix.

If, as a result of the determination at step S730, the quantization matrix specified by the ID information of the quantization matrix is determined to be identical with the quantization matrix to be decoded (i.e., scaling_list_pred_matrix_id_delta==0 or matrixID==RefMatrixID), the decoder can use a default quantization matrix already included therein at the step S750. Here, the default quantization matrix can be determined by using Tables 7 and 8.

If a method of predicting the quantization matrix is a method of using an inverse-DPCM method between the coefficient values of quantization matrix at S710, the decoder can initialize the coefficient value of the quantization matrix at step S760. For example, the decoder can initialize the coefficient value 'nextcoef' of the quantization matrix by setting the coefficient value to a constant. The constant set when initializing the coefficient value 'nextcoef' can be any one of 8 and 16 as in the examples of the aforementioned tables.

The decoder can decode a difference value between coefficients within the quantization matrix received from the coder at step S770. The difference value between the coefficients within the quantization matrix can be specified by a syntax element, such as delta_coef. In order to clarify that the syntax element is for the quantization matrix, delta_coef may be called scaling_list_delta_coef as in the examples of the aforementioned tables.

The decoder can derive the coefficient value of the quantization matrix at step S780. The decoder can derive the coefficient value of a quantization matrix to be decoded (i.e., a current quantization matrix) by adding the difference value between coefficients within the quantization matrix to the coefficient value of a quantization matrix that has been previously decoded. For example, the decoder can derive the coefficient value of the current quantization matrix by using a relation 'nextcoef=(nextcoef=delta_coef+256) % 256' as in the aforementioned equations.

The decoder can determine whether the quantization matrix has been derived or not at step S790. If, as a result of the determination, the quantization matrix is determined not to have been derived (i.e., if all the coefficient values within the quantization matrix have not been decoded), the decoder returns to the step S770 and performs subsequent steps.

The decoder can perform dequantization by using the obtained quantization matrix at step S650.

Meanwhile, although it is not clearly described in the example of FIG. 7 when deriving the coefficient value of the quantization matrix, DC matrix coefficient for a quantization matrix having a specific size may be first derived as in the aforementioned embodiments.

Figure 8:
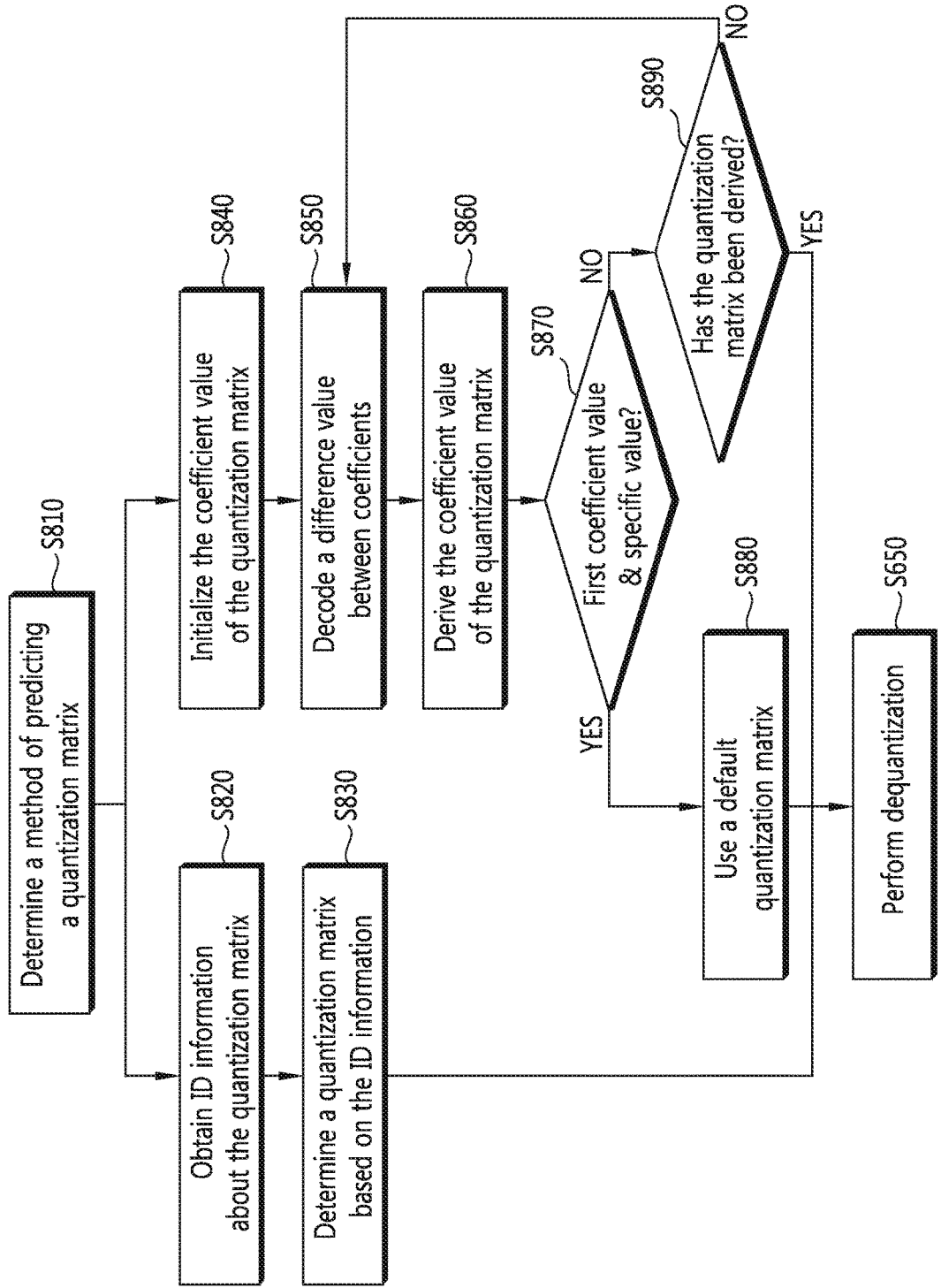
FIG. 8 is a diagram schematically illustrating another example of a method of obtaining information about a quantization matrix when a quantization matrix is present in a parameter set and performing dequantization by using the information.

FIG. 8 is a diagram schematically illustrating another example of a method of obtaining information about a quantization matrix when a quantization matrix is present in a parameter set and performing dequantization by using the information. The method of FIG. 8 may correspond to (1) a method including the steps S640 and S650 of FIG. 6 and (2) a method of obtaining a quantization matrix and performing dequantization using the obtained quantization matrix although an additional identifier indicating whether a quantization matrix is present or not is not transmitted, but the quantization matrix is present in a parameter set and information about the quantization matrix is transmitted by the coder. The method (1) is the same as the method (2) other than information about whether the quantization matrix is present or not is transmitted through the additional identifier or not.

In the example of FIG. 8, in order to prevent an unnecessary quantization matrix from being transmitted, if the first value of a quantization matrix to be decoded is a specific value, the decoder does not decode the quantization matrix to be decoded and can use a default quantization matrix already included therein when performing dequantization.

More particularly, referring to FIG. 8, if a quantization matrix is present in a parameter set, the decoder can determine a method of predicting the quantization matrix at step S810. The presence of the quantization matrix in the parameter set includes the presence of information about the quantization matrix in the parameter set.

If a method of predicting the quantization matrix is a method of using a quantization matrix already included in the decoder without change, the decoder can obtain ID information about the quantization matrix at step S820.

The ID information of the quantization matrix is information on which the quantization matrix already included in the decoder can be identified, and the ID information can correspond to scaling_list_pred_matrix_id_delta, pred_matrix_id_delta, etc. which have been described in the aforementioned examples.

The decoder can determine a quantization matrix to be used when performing dequantization by using the ID information of the quantization matrix at step S830. The decoder can determine the quantization matrix as indicated by ID information, such as scaling_list_pred_matrix_id_delta or pred_matrix_id_delta.

If a method of predicting the quantization matrix is a method of using an inverse-DPCM method between the coefficient values of quantization matrix at S810, the decoder can initialize the coefficient value of the quantization matrix at step S840. For example, the decoder can initialize the coefficient value 'nextcoef' of the quantization matrix by setting the coefficient value to a constant. The constant set when initializing the coefficient value 'nextcoef' can be any one of 8 and 16 as in the examples of the aforementioned tables.

The decoder can decode a difference value between coefficients within the quantization matrix received from the coder at step S850. The difference value between the coefficients within the quantization matrix can be specified by a syntax element, such as delta_coef.

The decoder can derive the coefficient value of the quantization matrix at step S860. The decoder can derive the coefficient value of a quantization matrix to be decoded (i.e., a current quantization matrix) by adding the difference value between coefficients within the quantization matrix to the coefficient value of a quantization matrix that has been previously decoded. For example, the decoder can derive the coefficient value of the current quantization matrix by using a relation 'nextcoef=(nextcoef=delta_coef+256) % 256' as in the aforementioned equations.

The decoder can determine whether the derived coefficient is the first coefficient value of the quantization matrix or not or whether the derived coefficient is identical with a specific value or not at step S870. Here, the specific value can be 0.

If, as a result of the determination at step S870, the derived coefficient is determined to be the first coefficient value of the quantization matrix and to be identical with the specific value, the decoder can determine to use a default quantization matrix, already included therein, in dequantization at step S880.

If, as a result of the determination at step S870, the derived coefficient is determined not to be the first coefficient value of the quantization matrix and not to be identical with the specific value, the decoder checks whether all difference values for the coefficients within the quantization matrix have been decoded or not at step S890. If, as a result of the check, all the difference values are determined not to have been decoded, the decoder can return to the step S850 and perform subsequent steps.

The decoder can perform dequantization by using the obtained quantization matrix at step S650.

In the aforementioned embodiments, information about a quantization matrix means a quantization matrix or information on which a quantization matrix can be derived. Here, the information on which a quantization matrix can be derived can mean information about whether a default matrix has been used or not, the type of prediction coding/decoding method, a reference quantization matrix ID, a reference quantization matrix, etc.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The invention claimed is:

1. A video decoding method in a decoder, comprising:
determining a prediction method of a quantization matrix used in an inverse quantization;
decoding the quantization matrix in accordance with the prediction method of the quantization matrix; and
performing the inverse quantization using the quantization matrix,
wherein the prediction method of the quantization matrix is determined to be any one of a first prediction method or a second prediction method based on a prediction mode flag,
wherein the first prediction method specifies a method of deriving the quantization matrix by using information on a difference between the coefficient values of the quantization matrix, and the second prediction method specifies a method of using a reference quantization matrix in the decoder,
wherein the decoding of the quantization matrix in accordance with the first prediction method includes initializing the coefficient values of the quantization matrix by setting to a constant value, and deriving the coefficient values of the quantization matrix based on the information on the difference between the coefficient values of the quantization matrix and the constant value, wherein in the decoding of the quantization matrix in response to the second prediction method, identifying information is decoded, the identifying information indicating whether, as the quantization matrix, the reference quantization matrix is used or a default quantization matrix is used, and wherein the identifying information is used for a first function, as a value indicator, for indicating a difference value between a value for specifying a decoding target quantization matrix and a value for specifying the reference quantization matrix, and a second function, as a flag, for indicating that the quantization matrix is derived from the default quantization matrix if a value of the identifying information is 0.

2. The video decoding method of claim 1, wherein the constant value is 8.

3. The video decoding method of claim 1, wherein in the decoding of the quantization matrix in accordance with the first prediction method, when a size of the quantization matrix is equal to or larger than 16×16, a DC matrix coefficient of the quantization matrix is derived from a decoded syntax element, whereby the coefficient value of the quantization matrix is derived based on the information on the difference between the coefficient values of the quantization matrix and the DC matrix coefficient.

4. A video encoding method in an encoder, comprising:

determining a quantization matrix to be used in a quantization and performing the quantization;

determining a prediction method of the quantization matrix;

encoding information about the quantization matrix in accordance with the prediction method of the quantization matrix; and outputting an encoded bitstream including the information about the quantization matrix, wherein the information about the quantization matrix is encoded in accordance with the prediction method of the quantization matrix, the prediction method of the quantization matrix being any one of a first prediction method or a second prediction method, wherein the information about the quantization matrix includes a prediction mode flag indicating one of the first prediction method or the second prediction method, the first prediction method specifying a method of deriving the quantization matrix by using information on a difference between the coefficient values of the quantization matrix and the second prediction method specifying a method of using a reference quantization matrix in the encoder, wherein in the encoding of the information about the quantization matrix in accordance with the first prediction method, the information about the quantization matrix is encoded to include the information on the difference between the coefficient values of the quantization matrix, whereby the coefficient values of the quantization matrix are derived based on the information on the difference between the coefficient values of the quantization matrix and an initial constant value, wherein in the encoding of the information about the quantization matrix in accordance with the second prediction method, the information about the quantization matrix is encoded to include identifying information indicating whether, as the quantization matrix, the reference quantization matrix is used or a default quantization matrix is used, and wherein the identifying information is used for a first function, as a value indicator, for indicating a difference value between a value for specifying a decoding target quantization matrix and a value for specifying the reference quantization matrix, and a second function, as a flag, for indicating that the quantization matrix is decoded from a default quantization matrix if a value of the identifying information is 0.

5. The video encoding method of claim 4, wherein in the encoding of the information about the quantization matrix in accordance with the first prediction method, when a size of the quantization matrix is equal to or larger than 16×16, the information about the quantization matrix is encoded to include information about a DC matrix coefficient for the quantization matrix, whereby the coefficient value of the quantization matrix is derived based on the information on the difference between the coefficient values of the quantization matrix and the information about the DC matrix coefficient.

6. A non-transitory computer-readable storage medium storing a bitstream, the bitstream comprising:

information about a quantization matrix, the quantization matrix being for reconstructing an encoded video, wherein the information about the quantization matrix is encoded in accordance with a prediction method of the quantization matrix, the prediction method of the quantization matrix being any one of a first prediction method or a second prediction method, wherein the information about the quantization matrix includes a prediction mode flag indicating one of the first prediction method or the second prediction method, the first prediction method specifying a method of deriving the quantization matrix by using information on a difference between the coefficient values of the quantization matrix and the second prediction method specifying a method of using a reference quantization matrix in a decoder, wherein in the encoding of the information about the quantization matrix in accordance with the first prediction method, the information about the quantization matrix is encoded to include the information on the difference between the coefficient values of the quantization matrix, whereby the coefficient values of the quantization matrix are derived based on the information on the difference between the coefficient values of the quantization matrix and an initial constant value, wherein in the encoding of the information about the quantization matrix in accordance with the second prediction method, the information about the quantization matrix is encoded to include identifying information indicating whether as the quantization matrix, the reference quantization matrix is used or a default quantization matrix is used, and wherein the identifying information is used for a first function, as a value indicator, for indicating a difference value between a value for specifying a decoding target quantization matrix and a value for specifying the reference quantization matrix, and a second function, as a flag, for indicating that the quantization matrix is decoded from a default quantization matrix if a value of the identifying information is 0.

7. The non-transitory computer-readable storage medium of claim 6, wherein in the encoding of the information about the quantization matrix in accordance with the first prediction method, when a size of the quantization matrix is equal to or larger than 16×16, the information about the quantization matrix is encoded to include information about a DC matrix coefficient for the quantization matrix, whereby the coefficient value of the quantization matrix is derived based on the information on the difference between the coefficient values of the quantization matrix and the information about the DC matrix coefficient.

* * * * *